United States Patent
Jang et al.

(10) Patent No.: US 12,550,130 B2
(45) Date of Patent: Feb. 10, 2026

(54) METHOD AND APPARATUS FOR TRANSMISSION AND RECEPTION BASED ON PREDICTED TRANSMISSION CONFIGURATION INFORMATION IN WIRELESS COMMUNICATION SYSTEMS

(71) Applicant: Samsung Electronics Co., Ltd., Gyeonggi-do (KR)

(72) Inventors: Youngrok Jang, Gyeonggi-do (KR); Hyoungju Ji, Gyeonggi-do (KR); Kyungjun Choi, Gyeonggi-do (KR); Ameha Tsegaye Abebe, Gyeonggi-do (KR); Seongmok Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 447 days.

(21) Appl. No.: 18/087,253

(22) Filed: Dec. 22, 2022

(65) Prior Publication Data
US 2023/0209527 A1    Jun. 29, 2023

(30) Foreign Application Priority Data

Dec. 23, 2021  (KR) .......... 10-2021-0186107
Aug. 1, 2022   (KR) .......... 10-2022-0095675

(51) Int. Cl.
*H04W 72/044*     (2023.01)
*H04W 72/232*     (2023.01)

(52) U.S. Cl.
CPC ....... *H04W 72/046* (2013.01); *H04W 72/232* (2023.01)

(58) Field of Classification Search
None
See application file for complete search history.

(56) References Cited

U.S. PATENT DOCUMENTS

| 11,196,471 | B2* | 12/2021 | Zhou ............. H04B 7/0634 |
| 2020/0314857 | A1 | 10/2020 | Pezeshki et al. | |
| 2020/0351892 | A1* | 11/2020 | Yi ............. H04L 5/0092 |
| 2021/0153175 | A1 | 5/2021 | Chande et al. | |
| 2021/0184733 | A1* | 6/2021 | Cao ............. H04W 72/53 |

(Continued)

FOREIGN PATENT DOCUMENTS

| KR | 10-2020-0130050 | 11/2020 |
| KR | 10-2021-0055555 | 5/2021 |

(Continued)

OTHER PUBLICATIONS

Sony, "Further Enhancement on Multi-beam Operation", R1-2105151, 3GPP TSG RAN WG1#105e, May 10-27, 2021, 19 pages.

(Continued)

*Primary Examiner* — Clemence S Han
(74) *Attorney, Agent, or Firm* — The Farrell Law Firm, P.C.

(57) ABSTRACT

The disclosure relates to a 5G or 6G communication system for supporting upper data rates. Provided are a beam control method performed by a terminal in a wireless communication system. The method includes receiving, from a base station, configuration information including a time interval and transmission configuration information (TCI) state information corresponding to the time interval; and performing beam control, based on the TCI state information during the time interval.

18 Claims, 31 Drawing Sheets

TCI state #0 (700)          TCI state #1 (705)          TCI state #2 (710)

(56) References Cited

U.S. PATENT DOCUMENTS

| | | | | |
|---|---|---|---|---|
| 2021/0282114 A1* | 9/2021 | Liu | ............... | H04L 1/1896 |
| 2021/0409989 A1* | 12/2021 | Raghavan | ............ | H04W 72/044 |
| 2022/0150745 A1* | 5/2022 | Matsumura | .......... | H04B 7/0632 |
| 2022/0311577 A1* | 9/2022 | Matsumura | ............ | H04B 7/088 |
| 2022/0376856 A1* | 11/2022 | Li | ............... | H04L 5/0048 |
| 2023/0084028 A1* | 3/2023 | Karimidehkordi | | H04B 7/06964 370/216 |
| 2023/0345570 A1* | 10/2023 | Fan | ............... | H04B 7/06964 |
| 2023/0397197 A1* | 12/2023 | Liu | ............... | H04L 5/0044 |
| 2024/0188128 A1* | 6/2024 | Cao | ............... | H04W 74/0816 |

FOREIGN PATENT DOCUMENTS

| | | |
|---|---|---|
| KR | 10-2021-0064008 | 6/2021 |
| KR | 10-2021-0125877 | 10/2021 |

OTHER PUBLICATIONS

Vivo, "Further Discussion on Multi Beam Enhancement", R1-2106571, 3GPP TSG RAN WG1 #106-e, Aug. 16-27, 2021, 30 pages.
International Search Report dated Mar. 31, 2023 issued in counterpart application No. PCT/KR2022/021132, 7 pages.

* cited by examiner

METHOD AND APPARATUS FOR TRANSMISSION AND RECEPTION BASED ON PREDICTED TRANSMISSION CONFIGURATION INFORMATION IN WIRELESS COMMUNICATION SYSTEMS

CROSS-REFERENCE TO RELATED APPLICATION(S)

This application is based on and claims priority under 35 U.S.C. § 119 to Korean Patent Application Nos. 10-2021-0186107 and 10-2022-0095675, which were filed in the Korean Intellectual Property Office on Dec. 23, 2021 and Aug. 1, 2022, respectively, the entire disclosure of each of which is incorporated herein by reference.

BACKGROUND

1. Field

The disclosure relates generally to the operation of a terminal and a base station in a wireless communication system and, more specifically, to a transmission/reception method based on predicted transmission configuration information in a wireless communication system and an apparatus capable of performing the same.

2. Description of Related Art $5^{th}$ generation (5G) mobile communication technologies define broad frequency bands such that high transmission rates and new services are possible, and can be implemented in sub 6 GHz" bands such as 3.5 GHz, and also in above 6 GHz bands referred to as mmWave including 28 GHz and 39 GHz. In addition, it has been considered to implement $6^{th}$ generation (6G) mobile communication technologies (referred to as beyond 5G systems) in terahertz bands (e.g., 95 GHz to 3 THz bands) in order to accomplish transmission rates up to fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

There has also been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (e.g., service based architecture or service based interface) for combining network functions virtualization (NFV) and software-defined 2) networking (SDN) technologies, and mobile edge computing (MEC) for receiving services based on UE positions.

As 5G mobile communication systems are commercialized, connected devices that have been exponentially increasing will be connected to communication networks. Thus, it is expected that enhanced functions and performances of 5G mobile communication systems and integrated operations of connected devices will be necessary. To this end, new research is scheduled in connection with eXtended Reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Further, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

An aspect of the disclosure is to provide a method and apparatus for previously configuring a beam or beam candidate set to be applied to a specific channel.

According to an aspect of the disclosure, provided is a beam control method is performed by a terminal in a wireless communication system. The method includes receiving, from a base station, configuration information including a time interval and transmission configuration information (TCI) state information corresponding to the time interval; and performing beam control, based on the TCI state information during the time interval.

According to another aspect of the disclosure, provided is a beam control method performed by a base station in a wireless communication system. The method includes generating configuration information including a time interval and transmission configuration information (TCI) state information corresponding to the time interval; and transmitting the configuration information to a terminal. During the time interval, beam control is performed based on the TCI state information.

According to a further aspect of the disclosure, provided is a terminal configured to perform beam control in a wireless communication system. The terminal includes a transceiver and a controller configured to receive, from a base station, configuration information including a time interval and transmission configuration information (TCI) state information corresponding to the time interval, and perform the beam control, based on the TCI state information during the time interval.

According to another aspect of the disclosure, provided is a base station configured to perform beam control in a wireless communication system. The base station includes a transceiver and a controller configured to generate configuration information including a time interval and transmission configuration information (TCI) state information corresponding to the time interval, and transmit the configuration information to a terminal. During the time interval, beam control is performed based on the TCI state information.

In addition, the disclosure provides a method and apparatus for reporting CSI for a plurality of points in time on a time axis.

A control signal processing method in a wireless communication system according to the disclosure for solving the above problems is characterized by including receiving a first control signal transmitted from a base station, processing the received first control signal, and transmitting a second control signal generated based on the processing to the base station.

An embodiment effectively provides a service in a mobile communication system.

In addition, an embodiment reduces the number of times of unnecessary physical downlink control channel (PDCCH) decoding of a terminal by previously configuring a beam or a beam candidate set to be applied to a specific channel.

In addition, an embodiment reduces downlink control information (DCI) overhead by previously configuring a beam or beam candidate set to be applied to a specific channel.

In addition, embodiments reduce the number of unnecessary beam switching of a base station and a terminal by configuring a beam or a beam candidate set to be applied to a specific channel in advance.

In addition, embodiments efficiently check and use a channel state by predicting and/or reporting CSI for a plurality of points in time on the time axis.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
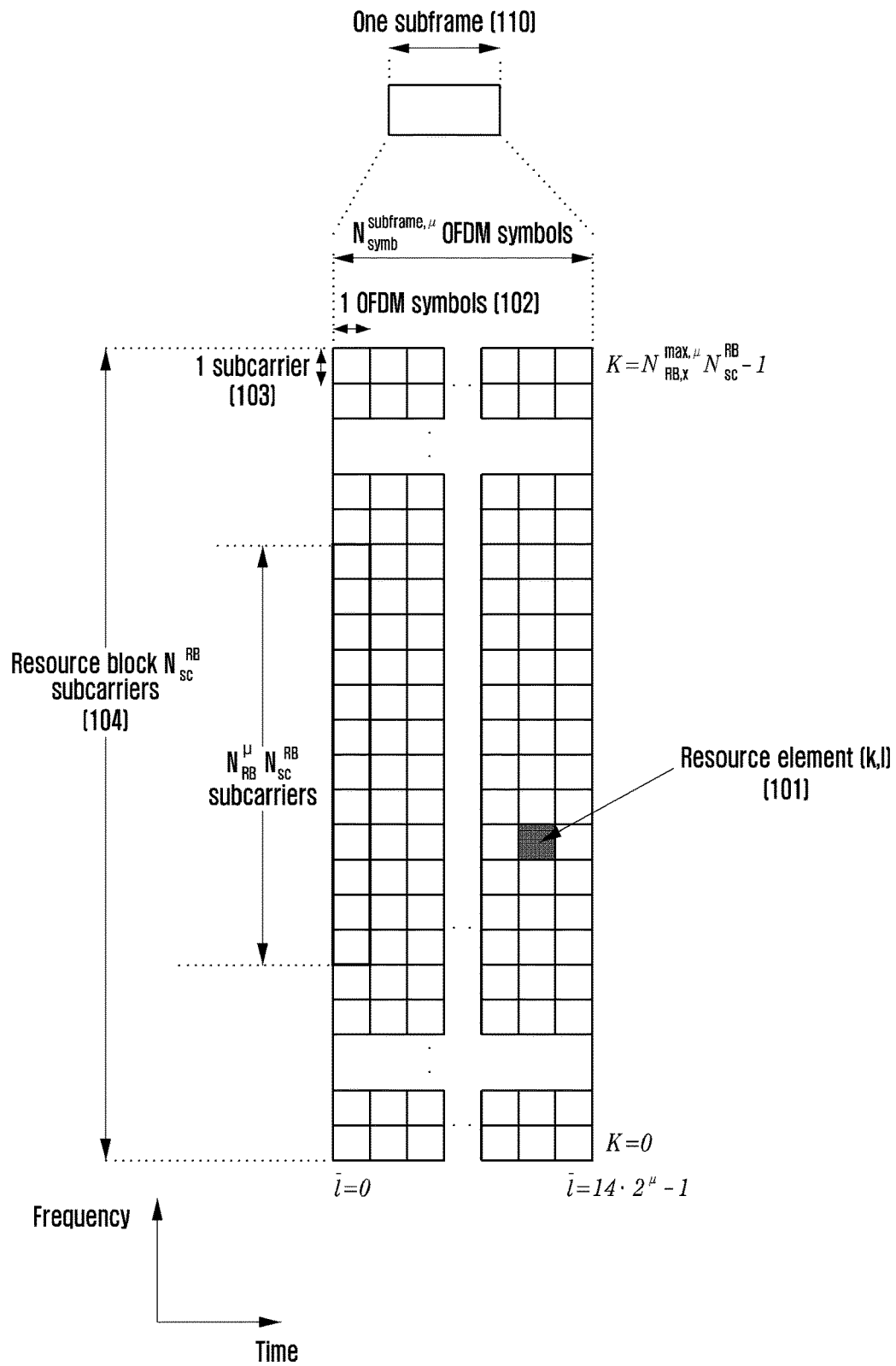
FIG. 1 illustrates a basic structure of a time-frequency domain in a wireless communication system according to an embodiment.

Hereinafter, embodiments are described in detail with reference to the accompanying drawings, with descriptions related to technical contents that are well-known in the art omitted for clarity.

For the same reason, in the accompanying drawings, some elements may be exaggerated, omitted, or schematically illustrated.

The advantages and features of the disclosure, and ways to achieve them, will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Herein, the same or like reference numerals designate the same or like elements.

In the following description, a base station is an entity that allocates resources to terminals, and may be at least one of a gNode B, an eNode B, a Node B, a wireless access unit, a base station controller, and a node on a network. A terminal may include a UE, a mobile station (MS), a cellular phone, a smartphone, a computer, or a multimedia system capable of performing communication functions. A downlink (DL) refers to a radio link via which a base station transmits a signal to a terminal, and an uplink (UL) refers to a radio link via which a terminal transmits a signal to a base station. Further, in the following description, long term evolution (LTE) or LTE advanced (LTE-A) systems may be described by way of example. However, embodiments may also be applied to other communication systems having similar technical backgrounds or channel types. Examples of such communication systems may include 5th generation mobile communication technologies (e.g., 5G and NR) developed beyond LTE-A, and in the following description, 5G may be the concept that covers the exiting LTE, LTE-A, or other similar services. In addition, based on determinations by those skilled in the art, the embodiments may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. The computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s) and, in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term unit refers to a software element or a hardware element, such as a field programmable gate array (FPGA) or an application specific integrated circuit (ASIC), which performs a predetermined function. However, the term unit does not always have a meaning limited to software or hardware. The term unit may be constructed either to be stored in an addressable storage medium or to execute one or more processors. Therefore, unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the term unit may be either combined into a smaller number of elements, or a unit, or divided into a larger number of elements, or a unit. Moreover, the elements and units or may be implemented to reproduce one or more central processing units (CPUs) within a device or a security multimedia card. Further, in the embodiments, the term unit may include one or more processors.

A wireless communication system is advancing to a broadband wireless communication system for providing high-speed and high-quality packet data services using communication standards, such as high-speed packet access (HSPA) of 3GPP, LTE or evolved universal terrestrial radio access (E-UTRA), LTE-A, LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a DL and employs a single carrier frequency division multiple access (SC-FDMA) scheme in a UL. The uplink indicates a radio link through which a UE (or an MS) transmits data or control signals to a base station (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include eMBB communication, mMTC, URLLC, etc.

Initially, eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Further, the 5G communication system must provide an increased user-perceived data rate to the UE, as well as the maximum data rate. To satisfy such requirements, transmission/reception technologies including a further enhanced MIMO transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of things (IoT) in the 5G communication system. mMTC has requirements, such as support of connection of a large number of UEs in a cell, enhancement coverage of UEs, improved battery time, a reduction in the cost of a UE, and the like, in order to effectively provide the IoT. Since the IoT provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 15 years, because it is difficult to frequently replace the battery of the UE.

In addition, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and may also require a design for assigning a large number of resources in a frequency band in order to secure reliability of a communication link.

Three services in the 5G communication system, that is, eMBB, URLLC, and mMTC, may be multiplexed and transmitted in a single system. In this case, different transmission/reception techniques and transmission/reception parameters may be used between services in order to satisfy different requirements of the respective services. Of course, the 5G is not limited to the above-described three services.

NR Time-Frequency Resource

A frame structure of the 5G system is described in more detail with reference to the drawings, with FIG. 1 illustrating a basic structure of a time-frequency domain in a wireless communication system according to an embodiment.

FIG. 1 illustrates a basic structure of a time-frequency domain, which is a radio resource domain in which data or control channels are transmitted in a 5G system.

Referring to FIG. 1, the horizontal axis represents the time domain, and the vertical axis represents the frequency domain. The basic unit of resources in the time and frequency domains is a resource element (RE) 101, which may be defined as 1 OFDM symbol 102 in the time axis and 1 subcarrier 103 in the frequency axis. In the frequency domain, $N_{sc}^{RB}$ (e.g., 12 consecutive REs) may constitute one resource block (RB) 104 of one subframe 110.

Figure 2:
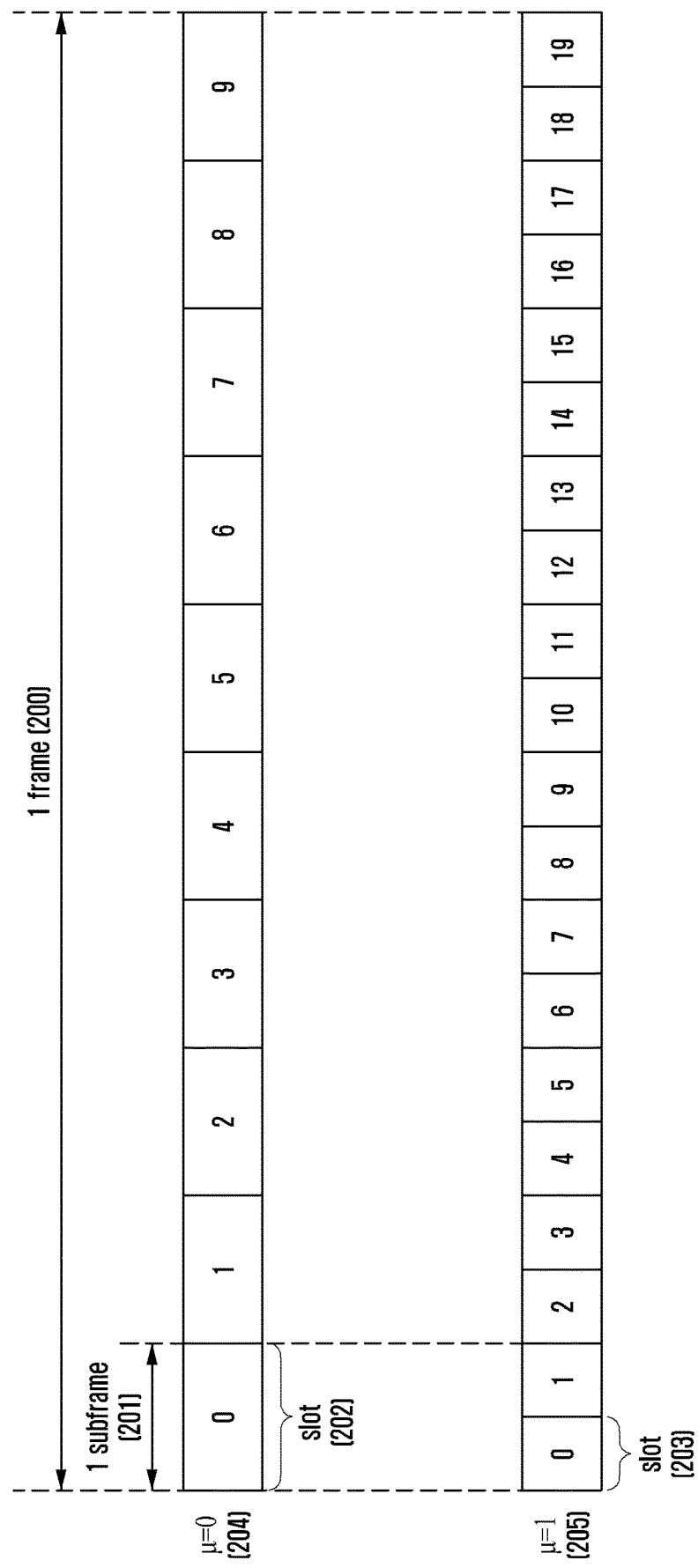
FIG. 2 illustrates a frame, subframe, and slot structure in a wireless communication system according to an embodiment.

FIG. 2 illustrates a frame, subframe, and slot structure in a wireless communication system according to an embodiment.

More specifically, FIG. 2 illustrates an example of the structure of a frame 200, a subframe 201, and a slot 202.

One frame 200 may be defined as 10 ms. One subframe 201 may be defined as 1 ms. Therefore, one frame 200 may consist of a total of 10 subframes 201. One slot (202, 203) may be defined with 14 OFDM symbols (i.e., the number of symbols per slot ($N_{symb}^{slot}$)=14). One subframe 201 may consist of one or a plurality of slots 202 and 203, and the number of slots 202 and 203 per one subframe 201 may vary depending on the configuration value μ(204, 205) for the subcarrier interval. FIG. 2 illustrates a case of μ=0 (204) and the case of μ=1 (205) as the subcarrier interval configuration value. When μ=0 (204), one subframe 201 may consist of one slot 202, and when μ=1 (205), one subframe 201 may consist of two slots 203. That is, the number of slots per subframe ($N_{slot}^{subframe,\mu}$) may vary according to the configuration value μ for the subcarrier interval, and accordingly, the number of slots per frame ($N_{slot}^{frame,\mu}$) may vary.

According to each subcarrier interval configuration $\mu$, $N_{slot}^{subframe,\mu}$ and $N_{slot}^{frame,\mu}$ may be defined as in Table 1 below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

BWP

Figure 3:
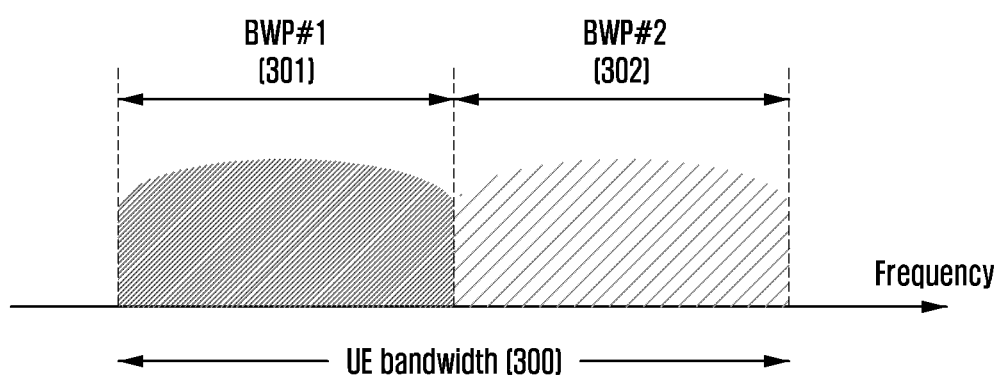
FIG. 3 illustrates an example of configuring a BWP in a wireless communication system according to an embodiment.

FIG. 3 illustrates an example of the BWP configuration in a wireless communication system according to an embodiment.

Referring to FIG. 3, a UE bandwidth 300 is configured to two BWPs, i.e., BWP #1 301 and BWP #2 302. The base station may configure one or a plurality of BWPs to the terminal, and may configure the following information for each BWP, as in Table 2, below.

TABLE 2

| BWP ::= | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

Of course, the above example is provided as a non-limiting example, and various parameters related to the BWP may be configured in the terminal in addition to the configuration information. The information may be transmitted from the base station to the terminal through upper layer signaling, e.g., radio resource control (RRC) signaling. At least one BWP among one or a plurality of configured BWPs may be activated. Whether the configured BWP is activated may be semi-statically transmitted from the base station to the terminal through RRC signaling or dynamically transmitted through DCI.

A terminal prior to an RRC connection may receive an initial BWP for initial access from a base station through a master information block (MIB). More specifically, in the initial access step, the terminal may receive configuration information about a CORESET and a search space in which a PDCCH for receiving system information (SI) (remaining minimum system information (RMSI) or system information block (SIB) 1) for initial access may be transmitted through the MIB. The control area and search space configured by the MIB may be regarded as identifier (ID) 0. The base station may notify the terminal of configuration information such as frequency allocation information, time allocation information, and numerology for the control area #0 through the MIB. In addition, the base station may notify the terminal of configuration information about the monitoring period and occasion for control area #0, that is, configuration information about search space #0, through the MIB. The terminal may regard the frequency domain configured as the control domain #0 acquired from the MIB as an initial BWP for initial access. The ID of the initial BWP may be regarded as 0.

The configuration for the BWP supported by the 5G may be used for various purposes.

When the bandwidth supported by the terminal is smaller than the system bandwidth, it can be supported through the BWP configuration. For example, the base station may transmit and receive data at a specific frequency position within the system bandwidth by configuring the frequency position (configuration information 2) of the BWP to the terminal.

In addition, the base station may configure a plurality of BWPs to the terminal for the purpose of supporting different numerologies. For example, in order to support both data transmission and reception using a subcarrier spacing of 15 kHz and a subcarrier spacing of 30 kHz to a terminal, two BWPs may be configured to subcarrier spacings of 15 kHz and 30 kHz, respectively. Different BWPs may be frequency division multiplexed, and when data is to be transmitted/received at a specific subcarrier interval, a BWP configured at a corresponding subcarrier interval may be activated.

Also, to reduce the power consumption of the terminal, the base station may configure BWPs having different sizes of bandwidth to the terminal. For example, when a terminal supports a very large bandwidth, e.g., a bandwidth of 100 MHz and always transmits/receives data with the corresponding bandwidth, very large power consumption may occur. In particular, monitoring an unnecessary downlink control channel with a large bandwidth of 100 MHz in a non-traffic situation may be very inefficient in terms of power consumption. For the purpose of reducing power consumption of the terminal, the base station may configure a BWP of a relatively small bandwidth, for example, a BWP of 20 MHz for the terminal. When there is no traffic, the terminal may perform a monitoring operation in the 20 MHz BWP. When data is generated, the terminal may transmit and receive data in the 100 MHz BWP according to the instructions of the base station.

For configuring the BWP, terminals before RRC connection (connected) may receive configuration information on the initial BWP through an MIB in an initial access step. More specifically, the terminal may be configured with a control area for a downlink control channel (CORESET) through which DCI scheduling the SIB can be transmitted from the MIB of the physical broadcast channel (PBCH). The bandwidth of the control area configured by the MIB may be regarded as an initial BWP, and the terminal may receive a PDSCH through which the SIB is transmitted through the configured initial BWP. The initial BWP may be used for other SI (OSI), paging, and random access in addition to the purpose of receiving the SIB.

BWP Change

When one or more BWPs are configured for the terminal, the base station may instruct the terminal to change (or switch or transition) the BWP using a BWP indicator field in the DCI. For example, in FIG. 3, when the currently active BWP of the terminal is BWP #1 (301), the base station may indicate BWP #2 (302) to the terminal as a bandwidth part indicator in the DCI, and the terminal may change the BWP to the BWP #2 302 indicated by the BWP indicator in the received DCI.

Since the DCI-based BWP change can be indicated by the DO scheduling the PDSCH or PUSCH, when the terminal receives the BWP change request, the terminal should be able to receive or transmit the PDSCH or PUSCH scheduled by the corresponding DCI in the changed BWP without difficulty. To this end, the standard stipulates the requirements for the delay time ($T_{BWP}$) required when changing the BWP, and can be defined, for example, as in Table 3, below.

TABLE 3

| μ | NR Slot length (ms) | BWP switch delay $T_{BWP}$ (slots) | |
| --- | --- | --- | --- |
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirement for the BWP change delay time supports type 1 or type 2 according to the capability of the terminal. The terminal may report a supportable bandwidth partial delay time type to the base station.

According to the above-mentioned requirement for the BWP change delay time, when the terminal receives the DCI including the BWP change indicator in slot n, the terminal may complete the change to the new BWP indicated by the BWP change indicator at a time not later than slot n+$T_{BWP}$, and perform transmission and reception on a data channel scheduled by the corresponding DCI in the changed new BWP. When the base station wants to schedule a data channel with a new BWP, the base station may determine time domain resource allocation for the data channel in consideration of the BWP change delay time $T_{BWP}$ of the terminal. That is, when scheduling a data channel with a new bandwidth portion, in the method for determining time domain resource allocation for the data channel, the base station may schedule the corresponding data channel after the BWP change delay time. Accordingly, the terminal may not expect that the DCI indicating the BWP change indicates a slot offset K0 or K2 value smaller than the BWP change delay time $T_{BWP}$.

If the terminal receives a DCI (e.g., DCI format 1_1 or 0_1) indicating a change in bandwidth portion, the terminal may not perform any transmission or reception during the time interval from the third symbol of the slot in which the PDCCH including the corresponding DCI is received to the starting point of the slot indicated by the slot offset K0 or K2 value indicated by the time domain resource allocation indicator field in the corresponding DCI. For example, if the terminal receives a DCI indicating a BWP change in slot n and the slot offset value indicated by the corresponding DCI is K, the terminal may not perform any transmission or reception from the third symbol of slot n to the previous symbol of slot n+K (i.e., the last symbol of slot n+K−1).

SS/PBCH Block

Next, a synchronization signal (SS)/PBCH block in 5G is described.

The SS/PBCH block is a physical layer channel block composed of a primary SS (PSS), a secondary SS (SSS), and a PBCH, as follows:

PSS: PSS is a signal that is a reference signal for downlink time/frequency synchronization, and provides some information of cell ID.

SSS: SSS serves as a standard for downlink time/frequency synchronization, and provides remaining cell ID information not provided by PSS. Additionally, it may serve as a reference signal for demodulation of the PBCH.

PBCH: PBCH provides SI for transmitting and receiving the data channel and control channel of the terminal, which may include search space-related control information indicating radio resource mapping information of a control channel, scheduling control information for a separate data channel through which SI is transmitted, etc.

SS/PBCH block: The SS/PBCH block consists of a combination of PSS, SSS, and PBCH. One or a plurality of SS/PBCH blocks may be transmitted within 5 ms, and each SS/PBCH block to be transmitted may be distinguished by an index.

The terminal may detect the PSS and SSS in the initial access stage and decode the PBCH. The terminal may obtain the MIB from the PBCH, and receive a control area (CORESET) #0 (which may correspond to a control area having a control area index of 0) configured therefrom. The terminal may perform monitoring for control area #0, assuming that the selected SS/PBCH block and demodulation reference signal (DMRS) transmitted in control area #0 are quasi co-located (QCL). The terminal may receive SI through downlink control information transmitted in control area #0. The terminal may obtain random access channel (RACH) related configuration information required for initial access from the received SI. The terminal may transmit a physical RACH (PRACH) to the base station in consideration of the selected SS/PBCH index, and the base station receiving the PRACH may obtain information about the SS/PBCH block index selected by the terminal. The base station may know that the terminal has selected a certain block among the SS/PBCH blocks and monitors the control area #0 related thereto.

DRX

Figure 6:
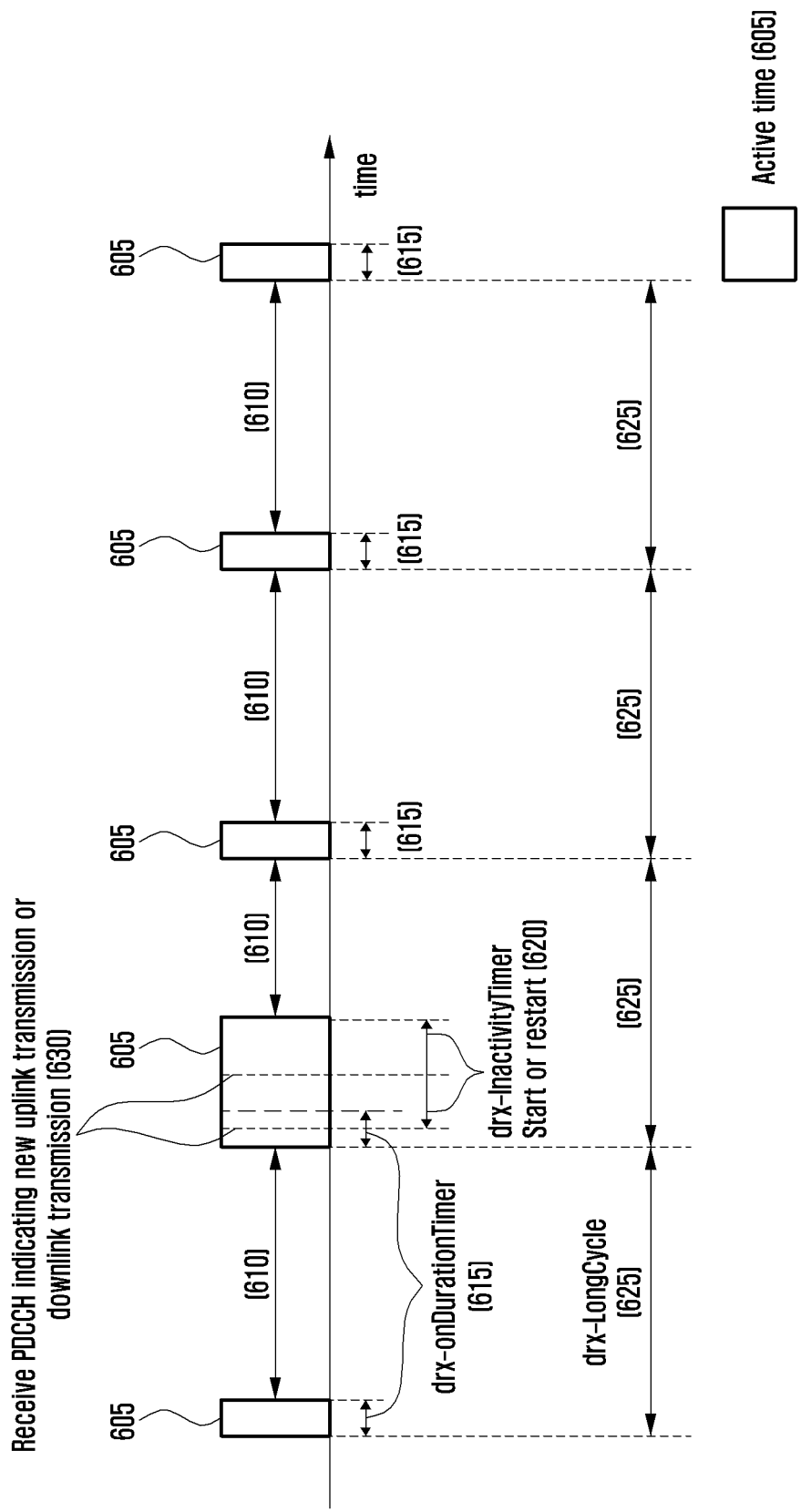
FIG. 6 illustrates a discontinuous reception (DRX) operation in a wireless communication system according to an embodiment.

FIG. 6 illustrates a DRX operation in a wireless communication system according to an embodiment.

The DRX operation is an operation in which a terminal using a service discontinuously receives data in an RRC connected state in which a radio link is established between a base station and a terminal. When the DRX is applied, the terminal may turn on the receiver at a specific time point to monitor the control channel, and turn off the receiver when there is no data received for a certain period of time to reduce power consumption of the terminal. The DRX operation may be controlled by the medium access control (MAC) layer device, based on various parameters and timers.

Referring to FIG. 6, active time 605 is the time when the terminal wakes up every DRX cycle and monitors the PDCCH. Active time 605 may be defined as:
- drx-onDurationTimer, or drx-InactivityTimer, drx-RetransmissionTimerDL, drx-RetransmissionTimerUL, or ra-ContentionResolutionTimer is running; or
- a Scheduling Request is sent on PUCCH and is pending; or
- a PDCCH indicating a new transmission addressed to the cell radio network temporary identifier (C-RNTI) of the MAC entity has not been received after successful reception of a random access response for the random access preamble not selected by the MAC entity among the contention-based random access preamble.

The drx-onDurationTimer, drx-InactivityTimer, drx-RetransmissionTimerDL, drx-RetransmissionTimerUL, ra-ContentionResolutionTimer, etc. are timers whose value is configured by the base station, and have functions of configuring the terminal to monitor the PDCCH when a predetermined condition is satisfied.

The drx-onDurationTimer 615 is a parameter for configuring the minimum time the terminal is awake in the DRX cycle. The drx-InactivityTimer 620 is a parameter for configuring an additional awake time when a PDCCH indicating a new uplink transmission or downlink transmission is received (630). The drx-RetransmissionTimerDL is a parameter for configuring the maximum awake time of a terminal to receive a downlink retransmission in a downlink HARQ procedure. The drx-RetransmissionTimerUL is a parameter for configuring the maximum time during which the UE is awake to receive an uplink retransmission grant in an uplink HARQ procedure. The drx-onDurationTimer, drx-InactivityTimer, drx-RetransmissionTimerDL, and drx-RetransmissionTimerUL may be configured to, for example, time, the number of subframes, and the number of slots. The ra-ContentionResolutionTimer is a parameter for monitoring PDCCH in a random access procedure.

An inActive time 610 is a time set not to monitor PDCCH or/or a time set not to receive PDCCH during DRX operation, and may be the remaining time excluding the active time 605 from the total time for performing the DRX operation as the inActive time 610. If the terminal does not monitor the PDCCH during the active time 605, the terminal may enter a sleep or inactive state to reduce power consumption.

The DRX cycle is a period in which the terminal wakes up and monitors the PDCCH. That is, the DRX cycle is a time interval or an on-duration generation period until the terminal monitors the next PDCCH after monitoring the PDCCH. There are two types of DRX cycle: short DRX cycle and long DRX cycle. The short DRX cycle may be applied as an option.

The long DRX cycle 625 is a long cycle among two DRX cycles configured in the terminal. While operating in long DRX, the terminal starts drx-onDurationTimer 615 again at the time when as much as the long DRX cycle 625 has elapsed from the start point (e.g., start symbol) of drx-onDurationTimer 615. When operating in the long DRX cycle 625, the terminal may start drx-onDurationTimer 615 in a slot after drx-SlotOffset in a subframe that satisfies Equation (1), below. Here, the drx-SlotOffset means a delay before starting the drx-onDurationTimer 615. The drx-SlotOffset may be configured to, for example, time, number of slots, and the like.

[(SFN×10)+subframe number] modulo (drx-Long-Cycle)=drx-StartOffset (1)

The drx-LongCycleStartOffset may be used to define a long DRX cycle 625 and the drx-StartOffset may be used to define a subframe from which the Long DRX cycle 625 starts. The drx-LongCycleStartOffset may be configured to, for example, time, number of subframes, number of slots, and the like.

PDCCH: DCI Related

Herein, DCI in the 5G system is described in detail.

Scheduling information for uplink data (or physical uplink shared channel (PUSCH)) or downlink data (or PDSCH) in the 5G system is transmitted from a base station to a terminal through DCI. The terminal may monitor the DCI format for fallback and the DCI format for non-fallback with respect to PUSCH or PDSCH. The contingency DCI format may be composed of a fixed field predefined between the base station and the terminal, and the DCI format for non-preparation may include a configurable field.

The DCI may be transmitted through a PDCCH through channel coding and modulation processes. A cyclic redundancy check (CRC) is attached to the DCI message payload, and the CRC may be scrambled with a radio network temporary identifier (RNTI) corresponding to the identity of the terminal. Different RNTIs may be used according to the purpose of the DCI message, that is, terminal-specific data transmission, power control command, or random access response. That is, the RNTI is not transmitted explicitly but is included in the CRC calculation process and transmitted. Upon receiving the DCI message transmitted on the PDCCH, the terminal may check the CRC using the allocated RNTI, and if the CRC check result is correct, the terminal may know that the corresponding message has been transmitted to the terminal.

For example, a DCI scheduling a PDSCH for SI may be scrambled with SI-RNTI. A DCI scheduling a PDSCH for a random access response (RAR) message may be scrambled with random access (RA)-RNTI. A DCI scheduling a PDSCH for a paging message may be scrambled with a P-RNTI. A DC notifying slot format indicator (SFI) may be scrambled with SFI-RNTI. A DCI notifying transmit power control (TPC) may be scrambled with TPC-RNTI. A DCI scheduling terminal-specific PDSCH or PUSCH may be scrambled with C-RNTI.

A DCI format 0_0 may be used as a fallback DCI for scheduling PUSCH, and in this case, the CRC may be scrambled with C-RNTI. The DCI format 0_0 in which the CRC is scrambled with C-RNTI may include, for example, the information in Table 4, below.

TABLE 4

-Identifier for DCI formats- [1] bit
-Frequency domain resource assignment -[ ] bits
-Time domain resource assignment - X bits
-Frequency hopping flag - 1 bit.
-Modulation and coding scheme - 5 bits
-New data indicator - 1 bit
-Redundancy version - 2 bits
-HARQ process number - 4 bits
-TPC command for scheduled PUSCH - [2] bits
- UL/SUL indicator - 0 or 1 bit The DCI format 0_1 may be used as a non-backup DCI for scheduling PUSCH, and in this case, the CRC may be scrambled with C-RNTI. The DCI format 0_1 in which CRC is scrambled with C-RNTI may include, for example, the following information.

TABLE 5

- Carrier indicator - 0 or 3 bits
- UL/SUL indicator - 0 or 1 bit
- Identifier for DCI formats - [1] bits
- Bandwidth part indicator - 0, 1 or 2 bits
- Frequency domain resource assignment
    • For resource allocation type 0, $[N_{RB}^{UL,BWP}/P]$ bits
    • For resource allocation type 1, $\lceil \log_2(N_{RB}^{UL,BWP}(N_{RB}^{UL,BWP}+1)/2) \rceil$ bits
- Time domain resource assignment -1, 2, 3, or 4 bits
- Virtual RB-to-physical RB (VRB-to-PRB) mapping - 0 or 1 bit, only for resource allocation type 1.
    • 0 bit if only resource allocation type 0 is configured;
    • 1 bit otherwise.

TABLE 5-continued

- Frequency hopping flag - 0 or 1 bit, only for resource allocation type 1.
    - 0 bit if only resource allocation type 0 is configured;
    - 1 bit otherwise.
- Modulation and coding scheme - 5 bits
- New data indicator - 1 bit
- Redundancy version - 2 bits
- HARQ process number - 4 bits
- 1st downlink assignment index- 1 or 2 bits
    - 1 bit for semi-static HARQ-ACK codebook;
    - 2 bits for dynamic HARQ-ACK codebook with single HARQ-ACK codebook.
- 2nd downlink assignment index - 0 or 2 bits
    - 2 bits for dynamic HARQ-ACK codebook with two HARQ-ACK sub-codebooks;
    - 0 bit otherwise.
- TPC command for scheduled PUSCH - 2 bits

- SRS resource indicator $- \left\lceil \log_2 \left( \sum_{k=1}^{L_{max}} \binom{N_{SRS}}{k} \right) \right\rceil$ or $\lceil \log_2(N_{SRS}) \rceil$ bits

- $\left\lceil \log_n \left( \sum_{k=1}^{L_{max}} \binom{N_{SRS}}{k} \right) \right\rceil$ bits for non-codebook based PUSCH transmission;

- $\lceil \log_2(N_{SRS}) \rceil$ bits for codebook based PUSCH transmission.
- Precoding information and number of layers-up to 6 bits
- Antenna ports - up to 5 bits
- SRS request - 2 bits
- CSI request - 0, 1, 2, 3, 4, 5, or 6 bits
- CBG transmission information- 0, 2, 4, 6, or 8 bits
- PTRS-DMRS association- 0 or 2 bits.
- beta offset indicator- 0 or 2 bits
- DMRS sequence initialization- 0 or 1 bit The DCI format 1_0 may be used as a fallback DCI for scheduling PDSCH, and in this case, the CRC may be scrambled with C-RNTI. The DCI format 1_0 in which CRC is scrambled with C-RNTI may include, for example, the information in FIG. 6, below.

TABLE 6

- Identifier for DCI formats - [1] bit
- Frequency domain resource assignment - $\lceil \log_2(N_{RB}^{DL, BWP}(N_{RB}^{DL, BWP} + 1)/2) \rceil$ bits
- Time domain resource assignment - X bits
- VRB-to-PRB mapping - 1 bit.
- Modulation and coding scheme - 5 bits

TABLE 6-continued

- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits The DCI format 1_1 may be used as anon-backup DCI for scheduling PDSCH, and in this case, the CRC may be scrambled with C-RNTI. The DOI format 1_1 in which CRC is scrambled with C-RNTI may include, for example, the following information.

TABLE 7

- Carrier indicator - 0 or 3 bits
- Identifier for DCI formats - [1] bits
- BWP indicator - 0, 1 or 2 bits
- Frequency domain resource assignment
    - For resource allocation type 0, $\lceil N_{RB}^{DL, BWP}/P \rceil$ bits
    - For resource allocation type 1, $\lceil \log_2(N_{RB}^{DL, BWP}(N_{RB}^{DL, BWP} + 1)/2) \rceil$ bits
- Time domain resource assignment -1, 2, 3, or 4 bits
- VRB-to-PRB mapping - 0 or 1 bit, only for resource allocation type 1.
    - 0 bit if only resource allocation type 0 is configured;
    - 1 bit otherwise.
- PRB bundling size indicator - 0 or 1 bit
- Rate matching indicator - 0, 1, or 2 bits
- ZP CSI-RS trigger - 0, 1, or 2 bits For transport block 1:
- Modulation and coding scheme - 5 bits
- New data indicator - 1 bit
- Redundancy version - 2 bits For transport block 2:
- Modulation and coding scheme - 5 bits
- New data indicator - 1 bit
- Redundancy version - 2 bits
- HARQ process number - 4 bits

TABLE 7-continued

- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit

PDCCH: CORESET, REG, CCE, Search Space

Figure 4:
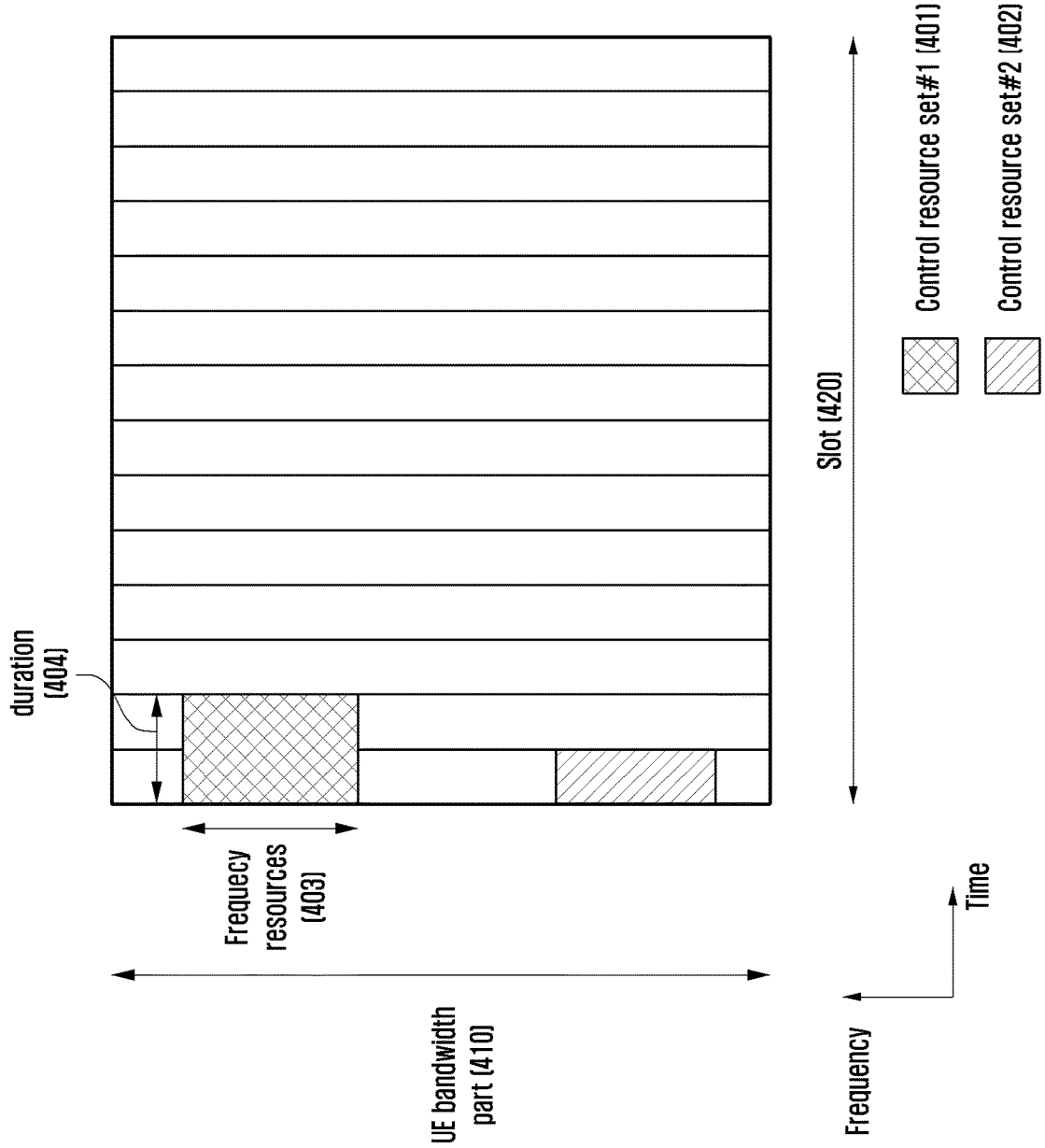
FIG. 4 illustrates an example of configuring a control area of a control resource set (CORESET) of a downlink control channel in a in a 5G wireless communication system according to an embodiment.

Regarding a downlink control channel in a 5G communication system, FIG. 4 illustrates an example of configuring a control area of CORESET of a downlink control channel in a 5G wireless communication system according to an embodiment. FIG. 4 illustrates an example in which a BWP 410 of a terminal (UE) BWP is configured on the frequency axis, and two control resource sets (control resource set #1 401 and control resource set #2 402) are configured in one slot 420 on the time axis. The control resource sets 401 and 402 may be configured to a specific frequency resource 403 within the entire UE BWP 410 on the frequency axis. The time axis may be configured to one or a plurality of OFDM symbols, and this may be defined as a control resource set duration 404. Referring to FIG. 4, the control resource set #1 401 is configured to a duration of two symbols, and control resource set #2 402 is configured to a control resource set duration of one symbol.

The control resource set in the aforementioned 5G system may be configured by the base station to the terminal through upper layer signaling (e.g., SI, MIB, RRC signaling). Configuring the control resource set to the terminal means providing information such as a control resource set identifier (identity), a frequency location of the control area, and a symbol length of the control area. For example, it may include the information in Table 8, below.

TABLE 8

```
ControlResourceSet ::=         SEQUENCE {
-- Corresponds to L1 parameter 'CORESET-ID'
  controlResourceSetId         ControlResourceSetId,
    (control resource set identity)
  frequencyDomainResources     BIT STRING (SIZE (45)),
    (frequency domain resource allocation information)
  duration                     INTEGER
    (1..maxCoReSetDuration),
    (time domain resource allocation information)
  cce-REG-MappingType          CHOICE {
    (CCE-to-REG mapping type)
    interleaved                SEQUENCE {
      reg-BundleSize           ENUMERATED {n2, n3, n6},
        (REG bundle size)
      precoderGranularity      ENUMERATED
    {sameAsREG-bundle, allContiguousRBs},
      interleaverSize          ENUMERATED {n2, n3, n6}
        (interleaver size)
      shiftIndex
      INTEGER(0..maxNrofPhysicalResourceBlocks-1)
          OPTIONAL
      (interleaver shift)
    },
    nonInterleaved             NULL
  },
```

TABLE 8-continued

```
  tci-StatesPDCCH              SEQUENCE(SIZE
    (1..maxNrofTCI-StatesPDCCH)) OF TCI-StateId
      OPTIONAL,
    (QCL configuration information)
  tci-PresentInDCI             ENUMERATED {enabled}
                               OPTIONAL, -- Need S
}
```

In Table 8, tci-StatesPDCCH (simply named TCI state) configuration information may include one or more SS/PBCH block indexes or channel state information (CSI-RS) in a QCL relationship with DMRS transmitted in the corresponding control resource set reference signal) index information.

Figure 5A:
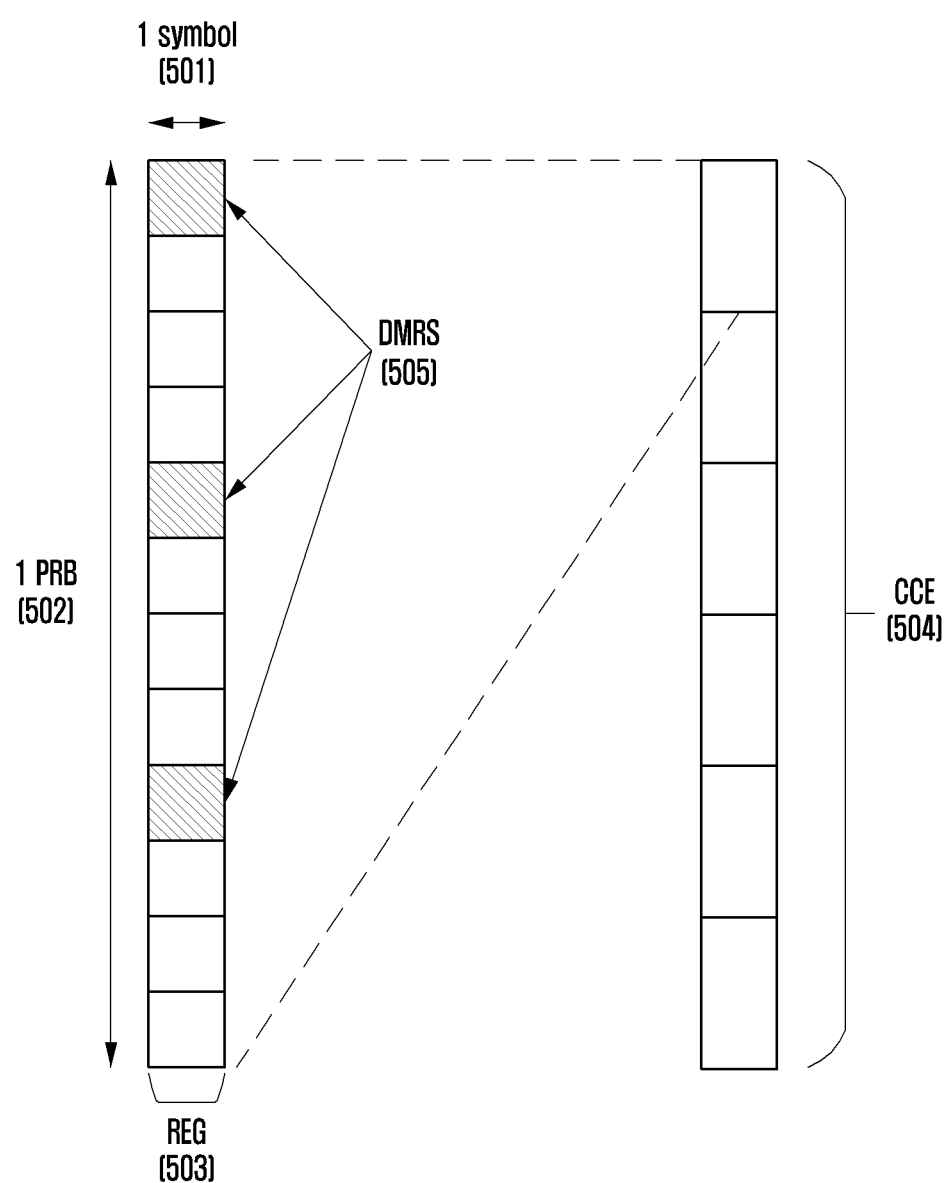
FIG. 5A illustrates a structure of a downlink control channel in a wireless communication system according to an embodiment.

FIG. 5A illustrates a structure of a downlink control channel in a wireless communication system according to an embodiment.

Specifically, FIG. 5A illustrates an example of basic units of time and frequency resources constituting a downlink control channel that can be used in 5G. According to FIG. 5A, the basic unit of time and frequency resources constituting a control channel may be referred to as an RE group (REG) 503, and the REG 503 may be defined as one OFDM symbol 501 on the time axis and one PRB 502 on the frequency axis, that is, 12 subcarriers. The base station may configure a downlink control channel allocation unit by concatenating the REGs 503.

As shown in FIG. 5A, when the basic unit to which a downlink control channel is allocated in 5G is a control channel element (CCE) 504, one CCE 504 may be composed of a plurality of REGs 503. Taking the REG 503 shown in FIG. 5A may consist of 12 REs, and if one CCE 504 consists of 6 REGs 503, one CCE 504 may consist of 72 REs. When a downlink control area is configured, the corresponding area may be composed of a plurality of CCEs 504, and a specific downlink control channel may be mapped to one or a plurality of CCEs 504 according to an aggregation level (AL) in the control area and transmitted. The CCEs 504 in the control area may be identified by numbers, and the numbers of the CCEs 504 may be assigned according to a logical mapping method.

The basic unit of the downlink control channel shown in FIG. 5A, i.e., the REG 503, may include both REs to which DCI is mapped and an area to which the DMRS 505, which is a reference signal for decoding them, is mapped. As shown in FIG. 5A, three DMRSs 505 may be transmitted within one REG 503. The number of CCEs required to transmit the PDCCH can be 1, 2, 4, 8, or 16 depending on the AL, and the different numbers of CCEs may be used to implement link adaptation of a downlink control channel. For example, when AL=L, one downlink control channel may be transmitted through L CCEs. A UE should detect a signal without knowing information about a downlink control channel, and a search space representing a set of CCEs is defined for blind decoding. The search space is a set of downlink control channel candidates consisting of CCEs that the UE should attempt to decode on a given AL, and since there are various ALs that make one bundle with 1, 2, 4, 8, and 16 CCEs, the terminal may have a plurality of search spaces. The search space set may be defined as a set of search spaces at all configured ALs.

The search space may be classified into a common search space and a UE-specific search space. A certain group of terminals or all terminals may search the common search space of the PDCCH in order to receive cell-common control information such as dynamic scheduling for SI or a paging message. For example, PDSCH scheduling allocation information for SIB transmission including cell operator information may be received by examining the common search space of the PDCCH. In the case of a common search space, since a predetermined group of UEs or all UEs should receive the PDCCH, the common search space may be defined as a pre-promised set of CCEs. Scheduling assignment information for the UE-specific PDSCH or PUSCH may be received by examining the UE-specific search space of the PDCCH. The UE-specific search space may be defined UE-specifically as a function of the identity of the UE and various system parameters.

In 5G systems, a parameter for a search space for a PDCCH may be configured from a base station to a terminal through upper layer signaling (e.g., SIB, MIB, RRC signaling). For example, the base station may configure the number of PDCCH candidate groups in each AL L, monitoring period for search space, monitoring occasion (MO) in symbol units within slots for search space, search space type (common search space or UE-specific search space), combination of DCI format and RNTI to be monitored in the search space, control resource set index to be monitored in the search space, and the like to the terminal. For example, it may include the information in Table 9, below.

TABLE 9

```
SearchSpace ::=                        SEQUENCE {
    -- Identity of the search space. SearchSpaceId = 0 identifies the SearchSpace
       configured via PBCH (MIB) or ServingCellConfigCommon.
    searchSpaceId                      SearchSpaceId,
    (search space identifier)
    controlResourceSetId               ControlResourceSetId,
    (control resource set identifier)
    monitoringSlotPeriodicityAndOffset CHOICE {
    (monitoring slot level period)
       sl1                             NULL,
       sl2                             INTEGER (0..1),
       sl4                             INTEGER (0..3),
       sl5                             INTEGER (0..4),
       sl8                             INTEGER (0..7),
       sl10                            INTEGER (0..9),
       sl16                            INTEGER (0..15),
       sl20                            INTEGER (0..19)
    }
                                       OPTIONAL,
    duration(monitoring duration)      INTEGER (2..2559)
    monitoringSymbolsWithinSlot        BIT STRING (SIZE (14))
                                       OPTIONAL,
    (monitoring symbol inslot)
    nrofCandidates                     SEQUENCE {
    (number of PDCCH candidates by aggregation level)
       aggregationLevel1               ENUMERATED {n0, n1, n2, n3,
       n4, n5, n6, n8},
       aggregationLevel2               ENUMERATED {n0, n1, n2, n3,
       n4, n5, n6, n8},
       aggregationLevel4               ENUMERATED {n0, n1, n2, n3,
       n4, n5, n6, n8},
       aggregationLevel8               ENUMERATED {n0, n1, n2, n3,
       n4, n5, n6, n8},
       aggregationLevel16              ENUMERATED {n0, n1, n2, n3,
       n4, n5, n6, n8}
    },
    searchSpaceType                    CHOICE {
    (search space type)
       -- Configures this search space as common search space (CSS) and DCI
          formats to monitor.
       common                          SEQUENCE {
       (common search space)
       }
       ue-Specific                     SEQUENCE {
       (UE-specific search space)
          -- Indicates whether the UE monitors in this USS for DCI formats 0-0 and
             1-0 or for formats 0-1 and 1-1.
          formats                      ENUMERATED  {formats0-0-
          And-1-0, formats0-1-And-1-1},
          ...
       }
```

The base station may configure one or a plurality of search space sets for the terminal according to configuration information. The base station may configure search space set 1 and search space set 2 to the terminal, may configure the terminal to monitor DCI format A scrambled with X-RNTI in search space set 1 in the common search space, and may configure the UE to monitor DCI format B scrambled with Y-RNTI in search space set 2 in the UE-specific search space.

According to the configuration information, one or a plurality of search space sets may exist in a common search space or a terminal-specific search space. For example, search space set #1 and search space set #2 may be configured as common search spaces, and search space set #3 and search space set #4 may be configured as terminal-specific search spaces:

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI
In the UE-specific search space, a combination of the following DCI format and RNTI may be monitored, as non-limiting examples:

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and uses:

C-RNTI (cell RNTI): Used for UE-specific PDSCH scheduling

TC-RNTI (temporary cell RNTI): Used for UE-specific PDSCH scheduling

CS-RNTI (configured scheduling RNTI): Used for semi-statically configured UE-specific PDSCH scheduling RA-RNTI: Used for PDSCH scheduling in random access phase P-RNTI (paging RNTI): Used for PDSCH scheduling through which paging is transmitted SI-RNTI: Used for PDSCH scheduling for transmitting SI INT-RNTI (interruption RNTI): Used for inform whether puncturing for PDSCH TPC-PUSCH-RNTI (transmit power control for PUSCH RNTI): Used to indicate power control command for PUSCH TPC-PUCCH-RNTI (transmit power control for PUCCH RNTI): Used to indicate power control command for PUCCH TPC-SRS-RNTI (transmit power control for SRS RNTI): Used to indicate power control command for SRS The aforementioned specified DCI formats may follow the definitions in Table 10, below.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 10-continued

| DCI format | Usage |
| --- | --- |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G systems, the search space of the AL L in the control area p and the search space set s may be expressed as Equation (2), below.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i, \quad (2)$$

in which:
L is an AL;
$n_{CI}$ is a carrier index;
$N_{CCE,p}$ is a total number of CCEs existing in the control resource set p;
$n_{s,f}^{\mu}$ is a slot index;
$M_{s,max}^{(L)}$ is a number of PDCCH candidates at AL L;
$M_{s,n_{CI}}=0, \ldots, M_{s,max}^{(L)}-1$ is a PDCCH candidate group index of AL L;
i=0, ..., L−1;
$Y_{p,n_{s,f}^{\mu}} = (A_p \cdot Y_{p,n_{s,f}^{\mu}-1}) \bmod D$;
$Y_{p,-1} = n_{RNTI} \neq 0$;
$A_p=39827$ for p mod 3=0;
$A_p=39829$ for p mod 3=1;
$A_p=39839$ for p mod 3=2;
D=65537; and
$n_{RNTI}$ is a terminal identifier;

The $Y_{p,n_{s,f}^{\mu}}$ value may correspond to 0 in the case of a common search space.

The $Y_{p,n_{s,f}^{\mu}}$ value may correspond to a value that changes according to the identity of the terminal (C-RNTI or ID configured by the base station to the terminal) and time index in the case of a terminal-specific search space.

In 5G systems, as a plurality of search space sets may be configured to different parameters (e.g., parameters in Table 9), a set of search space sets monitored by the UE may be different at each point in time. For example, when the search space set #1 is configured to an X-slot period and the search space set #2 is configured to a Y-slot period and X and Y are different, the terminal may monitor both search space set #1 and search space set #2 in a specific slot, and may monitor either search space set #1 or search space set #2 in a specific slot.

PDCCH: Span

The UE may perform a UE capability report for the case of having a plurality of PDCCH monitoring positions within a slot for each subcarrier interval, and the concept of span may be used. A span means consecutive symbols in which a terminal can monitor a PDCCH within a slot, and each PDCCH monitoring position is within one span. A span may be expressed as (X,Y), where X means the minimum number of symbols that must be separated between the first symbols of two consecutive spans, and Y refers to the number of consecutive symbols that can monitor the PDCCH within one span. The UE may monitor the PDCCH in a section within Y symbols from the first symbol of span within span.

Figure 5B:
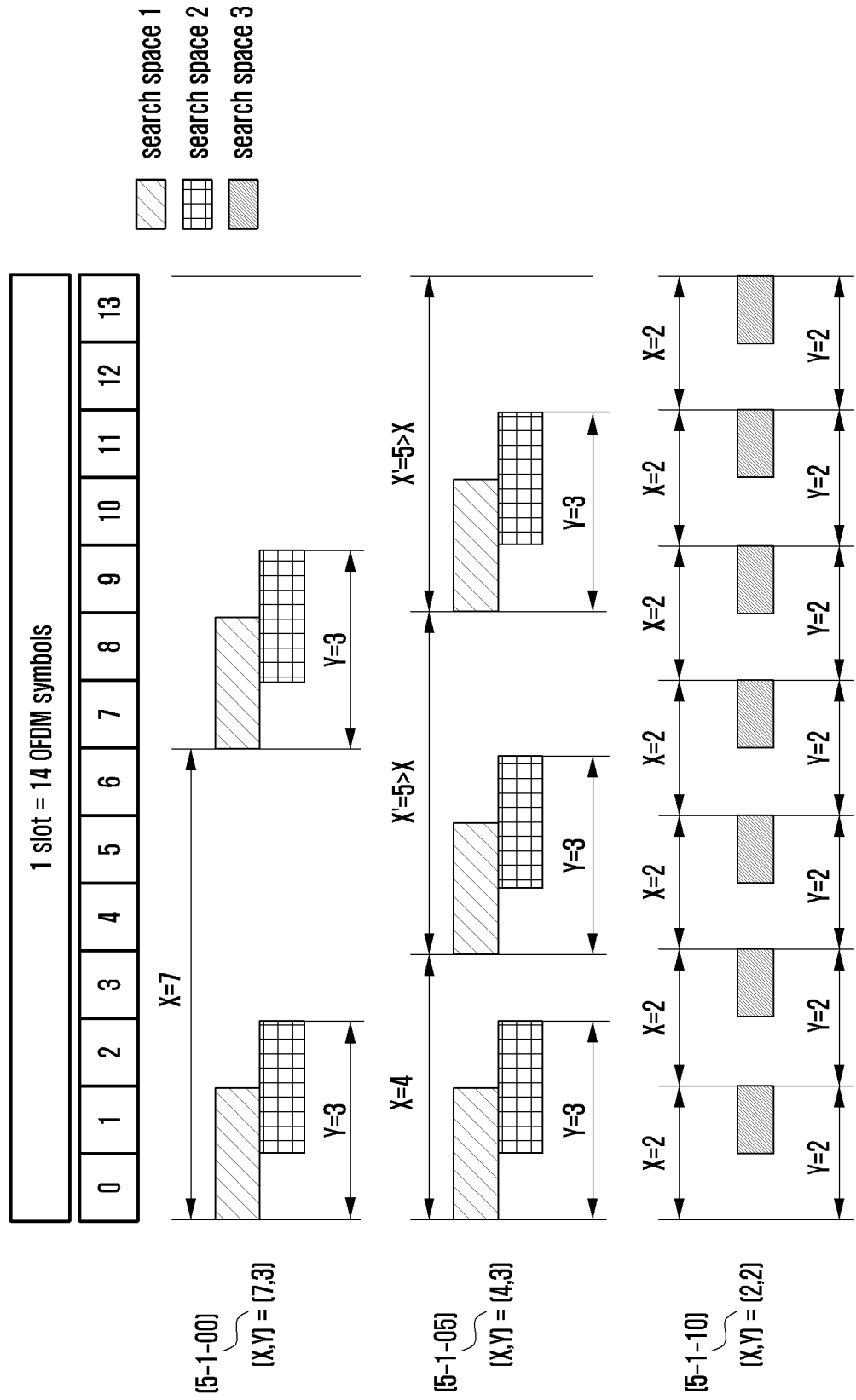
FIG. 5B illustrates a case in which a terminal can have a plurality of PDCCH monitoring positions in a slot in a wireless communication system according to an embodiment of the disclosure through span according to an embodiment.

FIG. 5B illustrates a case in which a terminal can have a plurality of PDCCH monitoring positions in a slot in a wireless communication system according to an embodiment of the disclosure through span.

Specifically, FIG. 5B illustrates a case in which a terminal can have a plurality of PDCCH monitoring positions in a slot in a wireless communication system according to an embodiment of the disclosure through span. The span may be (X,Y)=(7,3), (4,3), (2,2), and each of the three cases is represented as (5-1-00), (5-1-05), and (5-1-10) in FIG. 5B. As an example, (5-1-00) illustrates the case where there are two spans in a slot that can be expressed as (7,4). The interval between the first symbols of two spans is expressed as X=7, PDCCH monitoring positions can exist within a total of Y=3 symbols from the first symbol of each span, and it is shown that search spaces 1 and 2 each exist within the Y=3 symbol. As another example, in (5-1-05), the case where there are a total of three spans in the slot that may be expressed as (4,3) is represented, and the interval between the second and third spans indicated that they were separated by X'=5 symbols greater than X=4.

PDCCH: UE Capability Report

Slot positions in which the above-described common search space and the terminal-specific search space are located are indicated by the monitoringSymbolsWithinSlot parameter in Table 11, below, and symbol positions in slots are indicated as a bitmap through the monitoringSymbolsWithinSlot parameter in Table 9. A symbol position within a slot in which search space monitoring is possible by the terminal may be reported to the base station through the following UE capabilities.

Terminal capability 1 (FG Index 3-1 herein). This UE capability means the ability to monitor the corresponding MO when the corresponding MO location is located within the first 3 symbols in the slot in a case in which there is one MO for the type 1 and type 3 common search spaces or the UE-specific search space in a slot, as shown in Table 11, below. This UE capability is a mandatory capability that all UEs supporting NR must support, and whether this capability is supported is not explicitly reported to the base station.

TABLE 11

| Index | Feature group | Components | Field name in TS 38.331 [2] |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

Terminal capability 2 (FG Index 3-2 herein). This terminal capability means a capability that can be monitored regardless of the position of the start symbol of the corresponding MO in a case in which there is one MO in a slot for a common search space or a UE-specific search space, as shown in Table 12 below. This terminal capability can be selectively supported by the terminal (optional), and whether this capability is supported is explicitly reported to the base station.

TABLE 12

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

Terminal capability 3 (hereafter referred to as FGs 3-5, 3-a, 3-5b). This terminal capability indicates a pattern of MOs that can be monitored by the UE in a case in which a plurality of MOs for a common search space or a UE-specific search space exist in a slot, as shown in Table 13 below. The above-described pattern consists of a start symbol interval X between different MOs and a maximum symbol length Y for one MO. The combination of (X,Y) supported by the terminal may be one or a plurality of (2,2), (4,3), (7,3)). This terminal capability can be selectively supported by the terminal (optional), and whether this capability is supported and the above-described (X,Y) combination are explicitly reported to the base station.

TABLE 13

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions {3-5. withoutDCI-Gap 3-5a. withDCI-Gap} |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. | |

TABLE 13-continued

| Index | Feature group | Components | Field name in TS 38.331 [2] |
|---|---|---|---|
| | | For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report to the base station whether to support UE capability 2 and/or UE capability 3 and related parameters. The base station may perform time axis resource allocation for a common search space and a terminal-specific search space based on the reported terminal capabilities. When allocating the resource, the base station may prevent the terminal from locating the MO in a position where monitoring is impossible.

PDCCH: BD/CCE Limit

When a plurality of search space sets are configured for a terminal, the following conditions may be considered in a method for determining a search space set to be monitored by a terminal.

If the value of monitoringCapabilityConfig-r16, which is upper layer signaling, is configured to r15monitoringcapability, the terminal defines the maximum value for the number of PDCCH candidates that can be monitored and the number of CCEs constituting the entire search space (here, the entire search space means the entire CCE set corresponding to the union area of a plurality of search space sets) for each slot, and if the value of monitoringCapabilityConfig-r16 is configured to r16monitoringcapability, the terminal defines the maximum value for the number of PDCCH candidate groups that can be monitored and the number of CCEs constituting the entire search space (here, the entire search space means the entire CCE set corresponding to the union area of a plurality of search space sets) for each span.

Condition 1: Limit the Maximum Number of PDCCH Candidates

As described above, according to the configuration value of upper layer signaling, M, the maximum number of PDCCH candidates that can be monitored by the terminal, may follow Table 14, below, when defined on a slot basis in a cell configured to a subcarrier interval of $15 \cdot 2^\mu$ kHz, and may follow Table 15, below, when defined based on Span.

TABLE 14

| $\mu$ | Maximum number of PDCCH candidates per slot and per serving cell ($M^\mu$) |
|---|---|
| 0 | 44 |
| 1 | 36 |
| 2 | 22 |
| 3 | 20 |

TABLE 15

| | Maximum number $M^\mu$ of monitored PDCCH candidates per span for combination (X, Y) and per serving cell | | |
|---|---|---|---|
| $\mu$ | (2, 2) | (4, 3) | (7, 3) |
| 0 | 14 | 28 | 44 |
| 1 | 12 | 24 | 36 |

Condition 2: Limit the Maximum Number of CCEs

As described above, according to the configuration value of upper layer signaling, $C^\mu$, the maximum number of CCEs constituting the entire search space (here, the entire search space means the entire set of CCEs corresponding to the union area of a plurality of search space sets), may follow Table 16, below, when defined on a slot basis in a cell set to a subcarrier interval of $15 \cdot 2^\mu$ kHz, and may follow Table 17, below, when defined based on Span.

TABLE 16

| $\mu$ | Maximum number of non-overlapped CCEs per slot and per serving cell ($C^\mu$) |
|---|---|
| 0 | 56 |
| 1 | 56 |
| 2 | 48 |
| 3 | 32 |

TABLE 17

| | Maximum number $C^H$ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

For convenience of description, a situation in which both conditions 1 and 2 above are satisfied at a specific point in time is defined as condition A. Accordingly, not satisfying condition A means not satisfying at least one of conditions 1 and 2 above.

PDCCH: Overbooking

Depending on the configuration of search space sets of the base station, a case in which condition A is not satisfied may occur at a specific point in time. If condition A is not satisfied at a specific time point, the terminal may select and monitor only a part of search space sets configured to satisfy condition A at that time point, and the base station may transmit a PDCCH to the selected search space set.

The following method may be followed for selecting some search spaces from the set of entire configured search spaces.

If condition A for the PDCCH is not satisfied at a specific time point (slot), the terminal (or base station) may preferentially select a search space set in which the search space type is configured as a common search space from among search space sets existing at that time, over a search space set configured as a terminal-specific search space.

When all search space sets configured as the common search space are selected (that is, when condition A is satisfied even after all search spaces configured as the common search space are selected), the terminal (or the base station) may select search space sets configured as terminal-specific search spaces. In this case, when a plurality of search space sets are configured as the terminal-specific search space, a search space set having a lower search space set index may have a higher priority. In consideration of priority, the terminal-specific search space sets may be selected within a range satisfying condition A.

QCL, TCI State

In a wireless communication system, one or more different antenna ports may be associated with each other by QCL configuration, as shown in Table 18, below, despite the possibility of replacing one or more channels, signals, and combinations. The TCI state is for notifying the QCL relationship between PDCCH (or PDCCH DMRS) and other RSs or channels, and when a certain reference antenna port A (reference RS #A) and another target antenna port B (target RS #B) are QCLed to each other, it means that the terminal is allowed to apply some or all of the large-scale channel parameters estimated at the antenna port A to the channel measurement from the antenna port B. The QCL may need to be associated with different parameters depending on circumstances of: 1) time tracking affected by average delay and delay spread, 2) frequency tracking affected by Doppler shift and Doppler spread, 3) radio resource management (RRM) affected by average gain, 4) beam management (BM) affected by spatial parameter receiving, etc. Accordingly, NR supports four types of QCL relationships as shown in Table 18, below.

TABLE 18

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial reception (RX) parameter may collectively refer to some or all of various parameters such as angle of arrival (AoA), power angular spectrum (PAS) of AoA, angle of departure (AoD), PAS of AoD, transmission/reception channel correlation, transmission/reception beamforming, spatial channel correlation, etc.

The QCL relationship can be configured to the terminal through the RRC parameters TCI-State and QCL-Info as shown in Table 19, below. Referring to Table 19, the base station may configure one or more TCI states to the terminal and inform of up to two QCL relationships (qcl-Type1, qcl-Type2) for the RS referring to the ID of the TCI state, that is, the target RS. Each QCL information (QCL-Info) included in each of the TCI states includes the serving cell index and BWP index of the reference RS indicated by the corresponding QCL information, the type and ID of the reference RS, and the QCL type as shown in Table 18, above.

TABLE 19

```
TCI-State ::=              SEQUENCE {
    tci-StateId            TCI-StateId,
    (ID of corresponding TCI state)
    qcl-Type1              QCL-Info,
    (QCL information of the first reference RS of the RS (target RS) referring to the
corresponding TCI state ID)
    qcl-Type2              QCL-Info          OPTIONAL, -- Need R
    (QCL information of the second reference RS of RS (target RS) referring to the
corresponding TCI state ID)
    ...
}
QCL-Info ::=               SEQUENCE {
    cell                   ServCellIndex     OPTIONAL, -- Need R
    (serving cell index of the reference RS indicated by the corresponding QCL information)
    bwp-Id                 BWP-Id            OPTIONAL, -- Cond
```

TABLE 19-continued

```
CSI-RS-Indicated
  (BWP index of the reference RS indicated by the corresponding QCL information)
  referenceSignal            CHOICE {
    csi-rs                   NZP-CSI-RS-ResourceId,
    ssb                      SSB-Index
    (One of the CSI-RS ID or SSB ID indicated by the corresponding QCL information)
  },
  qcl-Type                   ENUMERATED {typeA, typeB, typeC, typeD},
  ...
}
```

Figure 7:
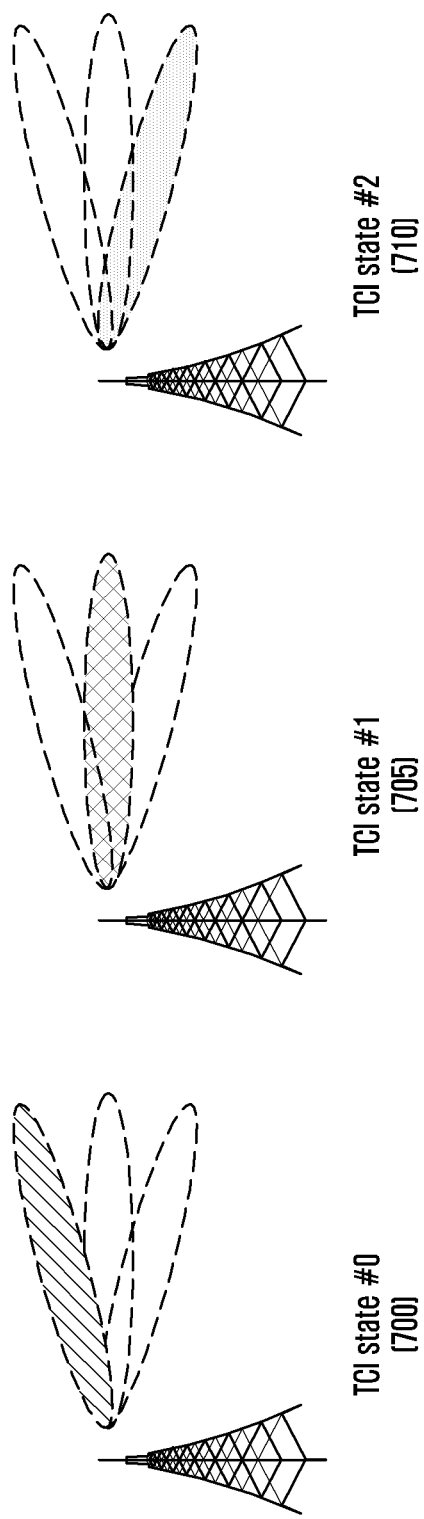
FIG. 7 illustrates an example of base station beam allocation according to TCI state configuration in a wireless communication system according to an embodiment.

FIG. 7 illustrates an example of base station beam allocation according to TCI state configuration in a wireless communication system according to an embodiment. Referring to FIG. 7, the base station may transmit information on different N beams to the terminal through different N TCI states. For example, as shown in FIG. 7, when N=3, the base station may configure the qcl-Type2 parameters included in the three TCI states (700, 705, and 710) to CSI-RS or SSB corresponding to different beams and configure to QCL type D to notify that the antenna ports referring to the different TCI states 700, 705, or 710 are associated with different spatial Rx parameters, that is, different beams.

Tables 20 to 24, below, show valid TCI state settings according to the type of target antenna port.

Table 20 shows valid TCI state settings when the target antenna port is CSI-RS for tracking (TRS). The TRS means an non-zero power (NZP) CSI-RS in which a repetition parameter is not configured and trs-Info is configured to true among CSI-RSs. In the case of configuration No. 3 in Table 20, it can be used for aperiodic TRS.

TABLE 20

Valid TCI state configurations when the target antenna port is CSI-RS for TRS

| Valid TCI state | DL RS 1 | qci-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 21 shows valid TCI state configurations when the target antenna port is CSI-RS for CSI. The CSI-RS for CSI refers to an NZP CSI-RS in which a parameter indicating repetition (e.g., a repetition parameter) is not configured and trs-Info is not configured to true among CSI-RSs.

TABLE 21

Valid TCI state configurations when the target antenna port is CSI-RS for CSI

| Valid TCE state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 22 shows valid TCI state configurations when the target antenna port is CSI-RS for beam management (BM, meaning the same as CSI-RS for L1 RSRP reporting). The CSI-RS for BM means an NZP CSI-RS in which the repetition parameter is configured among CSI-RSs and has a value of On or Off, and trs-Info is not configured as true.

TABLE 22

Valid TCI state configurations when target antenna port is CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 23, below, shows valid TCI state configurations when the target antenna port is PDCCH DMRS.

TABLE 23

Valid TCI state configurations when target antenna port is PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 24, below, shows valid TCI state configurations when the target antenna port is PDSCH DMRS.

TABLE 24

Valid TCI state configurations when target antenna port is PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuring method according to Tables 20 to 24, the target antenna port and reference antenna port for each step are configured and performed as "SSB"->"TRS"->"CSI-RS for CSI, or CSI-RS for BM, or PDCCH DMRS, or PDSCH DMRS". Through this, it is possible to help the reception operation of the terminal by linking the statistical characteristics that can be measured from the SSB and TRS to each antenna port.

PDCCH: Related to TCI State

Specifically, the T state combinations applicable to the PDCCH DMRS antenna port are shown in Table 25, below. In Table 25, the fourth row is a combination assumed by the terminal before RRC configuration, and configuration after RRC is impossible.

TABLE 25

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
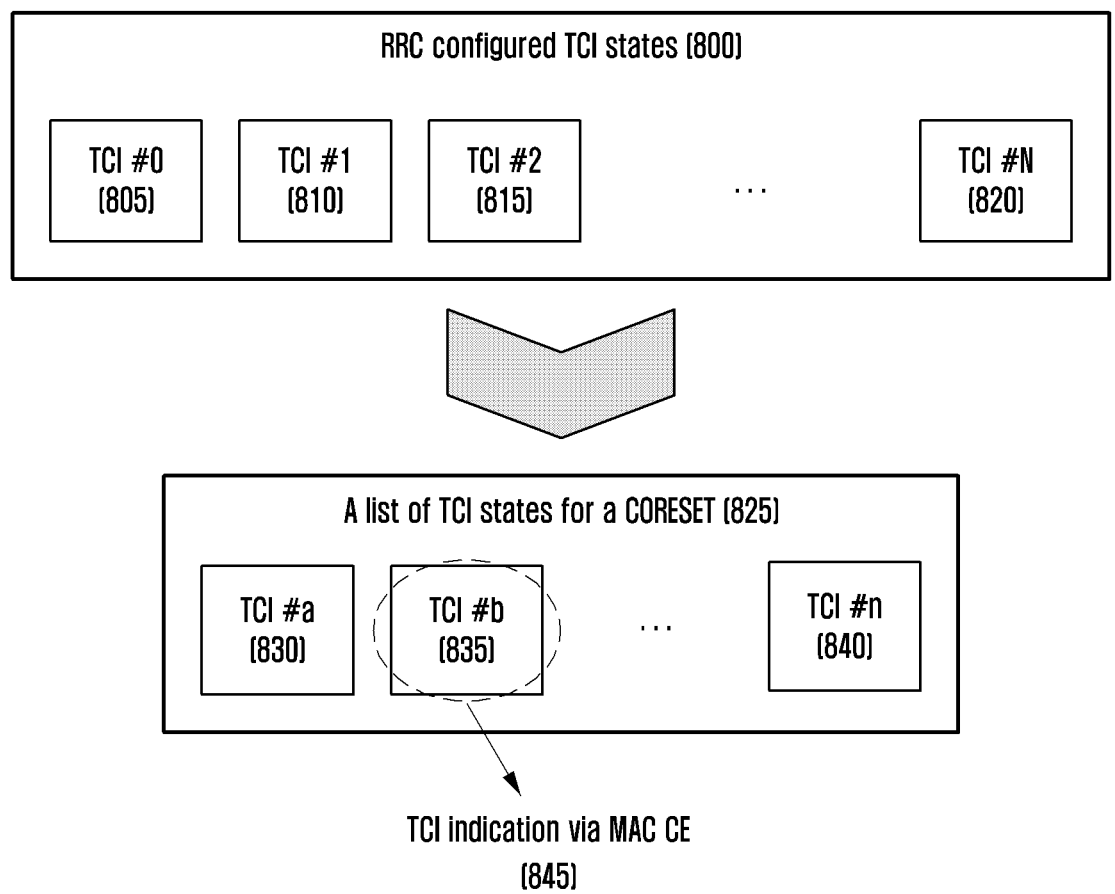
FIG. 8 illustrates an example of a TCI state allocation method for a PDCCH in a wireless communication system according to an embodiment.

FIG. 8 illustrates an example of a TCI state allocation method for a PDCCH in a wireless communication system according to an embodiment. In NR, a hierarchical signaling method as shown in FIG. 8 is supported for dynamic allocation of PDCCH beams. Referring to FIG. 8, the base station may configure N TCI states (805, 810, 815, . . . , 820) to the terminal through RRC signaling 800, and some of them may be configured as TCI states for CORESET (825). Thereafter, the base station may instruct the terminal one of TCI states (830, 835, 840) for CORESET through MAC-CE signaling (845). Thereafter, the terminal receives the PDCCH, based on beam information included in the TCI state indicated by the MAC-CE signaling.

Figure 9:
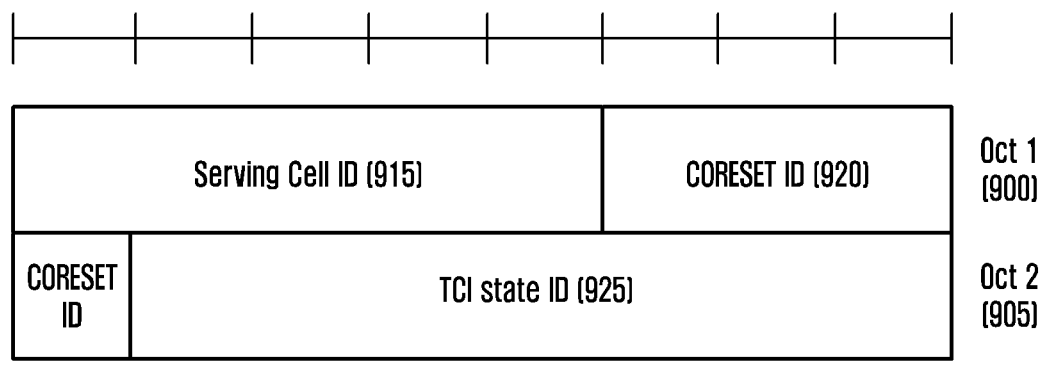
FIG. 9 illustrates a TCI indication medium access control control element (MAC-CE) signaling structure for PDCCH DMRS in a wireless communication system according to an embodiment.

FIG. 9 illustrates a TCI indication MAC-CE signaling structure for PDCCH DMRS in a wireless communication system according to an embodiment. Specifically, FIG. 9 illustrates a TC indication MAC-CE signaling structure for the PDCCH DMRS. Referring to FIG. 9, the TCI indication MAC-CE signaling for the PDCCH DMRS consists of 2 bytes (16 bits), 5-bit serving cell ID 915, 4-bit CORESET ID 920, and 7-bit TCI state ID 925.

Figure 10:
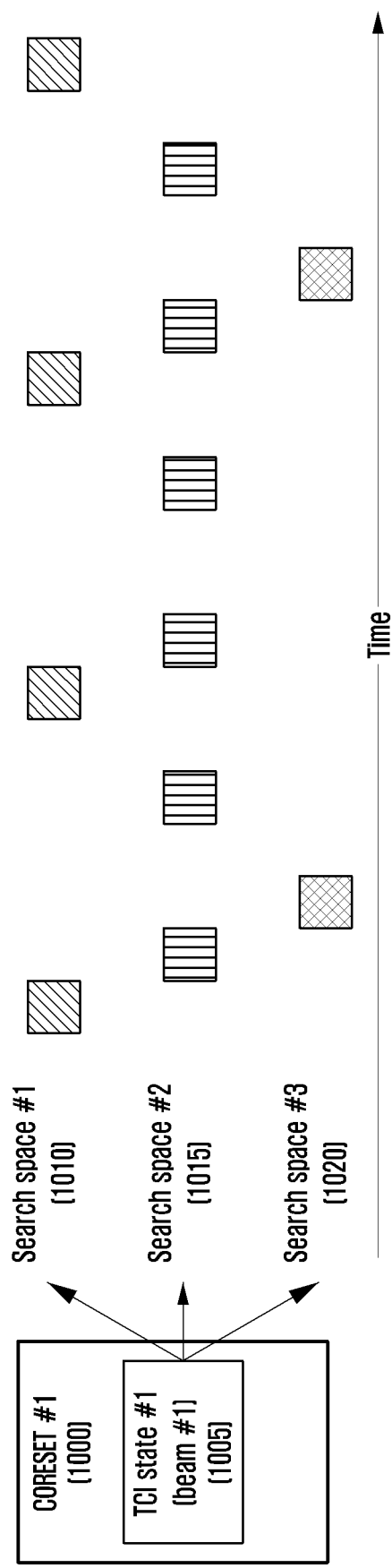
FIG. 10 illustrates an example of beam configuration of a CORESET and a search space in a wireless communication system according to an embodiment.

FIG. 10 illustrates an example of beam configuration of a CORESET and a search space according to the description. Referring to FIG. 10, a base station may indicate one of the TCI state lists included in the CORESET 1000 configuration through MAC-CE signaling (1005). Afterwards, until another TCI state is indicated to the corresponding CORESET through another MAC-CE signaling, a terminal considers that the same QCL information (beam #1, 1005) is applied to one or more search spaces (1010, 1015, 1020) connected to the CORESET. The PDCCH beam allocation method described above makes it difficult to indicate a beam change faster than the MAC-CE signaling delay, and also has the disadvantage of collectively applying the same beam for each CORESET regardless of search space characteristics, which makes flexible PDCCH beam operation difficult. The following embodiments provide more flexible PDCCH beam configuration and operation methods. In describing the embodiments, several distinct examples are provided for convenience of explanation, but they are not mutually exclusive and can be applied by appropriately combining with each other depending on the situation.

The base station may configure one or a plurality of TCI states for a specific control area to the terminal, and may activate one of the configured TCI states through a MAC-CE activation command. For example, {TCI state #0, TCI state #1, TCI state #2} are configured as TCI states in control area #1, and the base station may transmit a command activating the terminal to assume TCI state #0 as the TCI state for control area #1 through the MAC-CE. The terminal may correctly receive the DMRS of the corresponding control area, based on the QCL information in the activated TCI state, based on the activation command for the TCI state received through the MAC-CE.

Regarding the control area (control area #0) whose index is configured to 0, if the terminal does not receive the MAC-CE activation command for the TCI state of control area #0, the terminal may assume that the control area is QCLed with the SS/PBCH block identified in the initial access process or non-contention based random access process that is not triggered by the PDCCH command for the DMRS transmitted in the control area #0.

Regarding the control area (e.g., control area #X) whose index is configured to a value other than 0, if the terminal has not received the TCI state for control area #X or has received one or more TCI states but has not received a MAC-CE activation command to activate one of them, the terminal may assume that the control area is QCLed with the SS/PBCH block identified in the initial access process with respect to the DMRS transmitted in the control area #X.

PDCCH: Related to OCL Prioritization Rule

When a terminal operates with carrier aggregation within a single cell or band, and a plurality of control resource sets existing within an activated BWP of a single cell or a plurality of cells overlap in time while having the same or different QCL-TypeD characteristics in a specific PDCCH monitoring period, the terminal may select a specific control resource set according to the QCL priority determination operation and monitor control resource sets having the same QCL-TypeD characteristics as the corresponding control resource set. That is, when a plurality of control resource sets overlap in time, only one QCL-TypeD characteristic can be received. In this case, the criteria for determining the QCL priority may be according to the following criterion:

Criterion 1. A control resource set connected to the common search section with the lowest index within a cell corresponding to the lowest index among cells including the common search section Criterion 2. A control resource set connected to a UE-specific search interval of the lowest index within a cell corresponding to the lowest index among cells including a terminal-specific search section.

Each of the above criteria applies the next criterion when the criterion is not satisfied. For example, when control resource sets overlap in time in a specific PDCCH monitoring period, if all control resource sets are not connected to a common search period but are connected to a terminal-specific search period, that is, if criterion 1 is not satisfied, the terminal may omit the application of criterion 1 and apply criterion 2.

When selecting a control resource set based on the above criteria, the terminal may additionally consider the following two items for QCL information configured in the control resource set. First, if control resource set 1 has CSI-RS 1 as a reference signal having a QCL-TypeD relationship, the reference signal with which this CSI-RS 1 has a QCL-TypeD relationship is SSB 1, and another control resource set 2 has a QCL-TypeD relationship with SSB 1, the terminal may consider these two control resource sets 1 and 2 to have different QCL-TypeD characteristics. Second, if control resource set 1 has CSI-RS 1 set in cell 1 as a reference signal having a QCL-TypeD relationship, the reference signal that this CSI-RS 1 has a QCL-TypeD relationship is SSB 1, the control resource set 2 has CSI-RS 2 configured in cell 2 as a reference signal having a QCL-TypeD relationship, and this CSI-RS 2 has the same SSB 1 as a reference signal having a QCL-TypeD relationship, the terminal may consider the two control resource sets to have the same QCL-TypeD characteristics.

Figure 12:
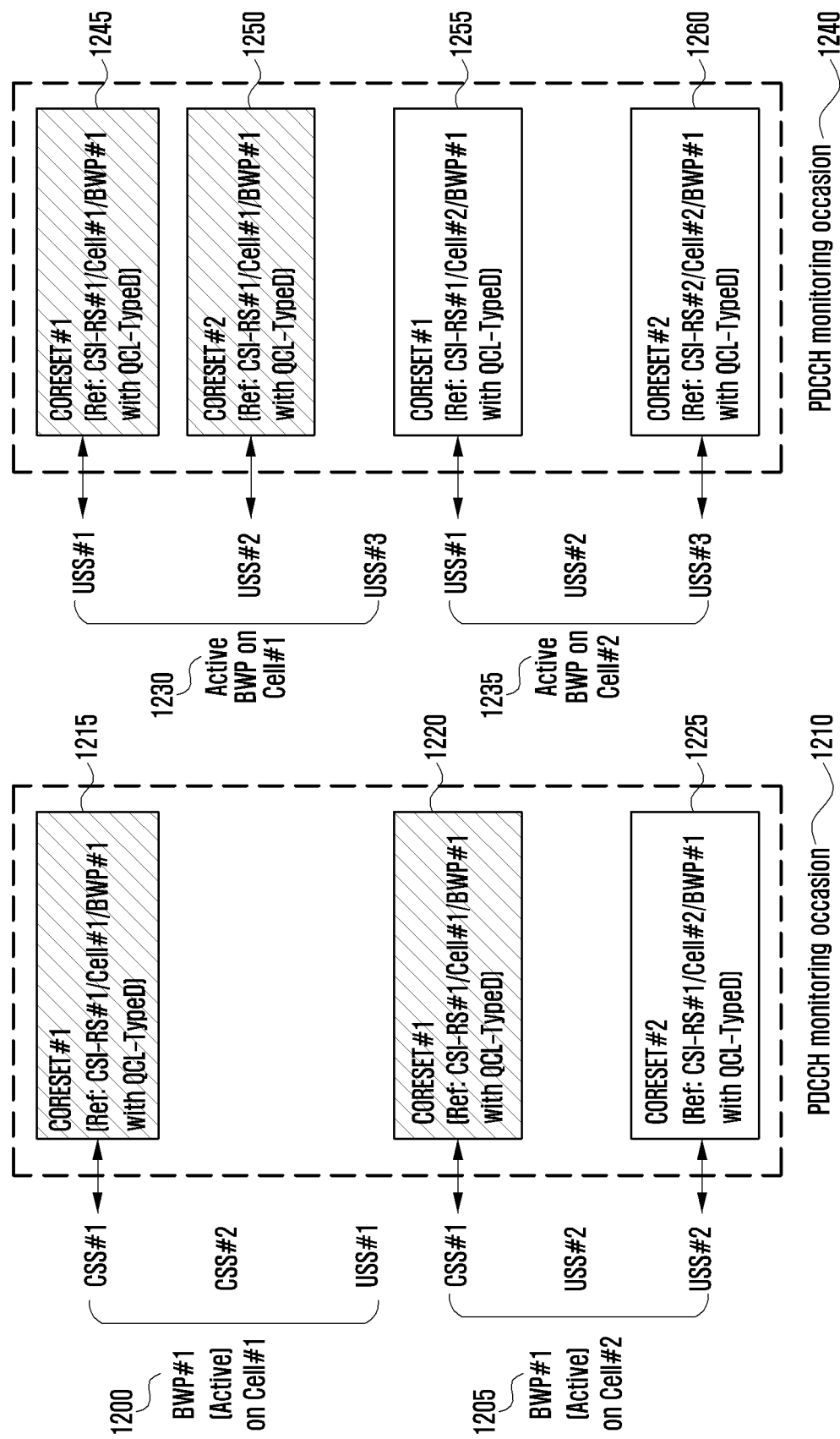
FIG. 12 is a diagram explaining a method for selecting a receivable control resource set in consideration of priority when a terminal receives a downlink control channel in a wireless communication system according to an embodiment.

FIG. 12 is a diagram explaining a method for selecting a receivable control resource set in consideration of priority when a terminal receives a downlink control channel in a wireless communication system according to an embodiment. As an example, the terminal may be configured to receive a plurality of CORESETs overlapping in time in a specific PDCCH MO 1210, and these plurality of control resource sets may be connected to a common search space (CSS) or a UE-specific search space (USS) for a plurality of cells. Within the corresponding PDCCH MO, a control resource set #1 1215 connected to a common search section #1 may exist in a BWP #1 1200 of a cell #1, and a control resource set #1 1220 connected to a common search section #1 and a control resource set #2 1225 connected to a UE-specific search section #2 may exist in a BWP 1 1205 of cell #2. The control resource sets 1215 and 1220 may have a relationship of CSI-RS resource #1 and QCL-TypeD configured in the BWP #1 of cell #1, and the control resource set 1225 may have a QCL-TypeD relationship with CSI-RS resource #1 configured in the #1 BWP of cell #2. Therefore, if criterion 1 is applied to the corresponding PDCCH MO 1210, all other control resource sets having QCL-TypeD reference signals such as the control resource set #1 1215 may be received. Thus, the terminal may receive the control resource sets 1215 and 1220 in the corresponding PDCCH MO 1210. As another example, the terminal may be configured to receive a plurality of control resource sets overlapping in time in a specific PDCCH MO 1240, and the plurality of control resource sets may be connected to a common search space or a UE-specific search space for a plurality of cells. Within the corresponding PDCCH MO, the control resource set #1 1245 connected to the UE #1 specific search section and the control resource set #2 connected to the UE #2 specific search section 1250 may exist in the BWP #1 1230 of cell #1, and the control resource set #1 1255 connected to the UE #1-specific search section and the control resource set #2 1260 connected to the UE #3-specific search section may exist in the BWP #1 1235 of cell #2. The control resource sets 1245 and 1250 may have a QCL-TypeD relationship with CSI-RS resource #1 configured within BWP #1 of cell #1, the control resource set 1255 may have a QCL-TypeD relationship with CSI-RS resource #1 configured within the BWP #1 of cell #2, and the control resource set 1260 may have a QCL-TypeD relationship with the second CSI-RS resource configured within the BWP #1 of the cell #2. However, when criterion 1 is applied to the corresponding PDCCH MO 1240, since there is no common search section, the next criterion, criterion 2, may be applied. If criterion 2 is applied to the corresponding PDCCH MO 1240, all other control resource sets having the same QCL-TypeD reference signal as the control resource set 1245 may be received. Therefore, the terminal may receive control resource sets 1245 and 1250 in the corresponding PDCCH MO 1240.

Rate Matching/Puncturing

When the time and frequency resource A to transmit a random symbol sequence A overlaps with the random time and frequency resource B, a rate matching or puncturing operation may be considered as a transmission/reception operation of channel A considering resource C in the region where resource A and resource B overlap. A specific operation may operate according to the following.

Rate Matching Operation

A base station may map and transmit channel A only for the remaining resource areas excluding resource C corresponding to an area overlapping with resource B among all resources A to transmit symbol sequence A to the terminal. For example, symbol sequence A is composed of {symbol #1, symbol #2, symbol #3, symbol 4}, resource A is {resource #1, resource #2, resource #3, resource #4} and resource B is {resource #3, resource #5}, the base station may sequentially map and transmit symbol sequence A to {resource #1, resource #2, and resource #4}, which are resources other than {resource #3} corresponding to resource C among resource A. As a result, the base station may map symbol sequences {symbol #1, symbol #2, and symbol #3} to {resource #1, resource #2, and resource #4} and transmit the symbol sequences.

The terminal may determine resource A and resource B from scheduling information for symbol sequence A from the base station, and through this, may determine resource C, which is an area where resource A and resource B overlap. The terminal may receive the symbol sequence A assuming that the symbol sequence A is mapped and transmitted in the remaining regions excluding resource C from among all resources A. For example, when symbol sequence A is composed of {symbol #1, symbol #2, symbol #3, symbol 4}, resource A is {resource #1, resource #2, resource #3, resource #4}, and resource B is {resource #3, resource #5}, the terminal may receive the symbol sequence A assuming that the symbol sequence A is sequentially mapped to {resource #1, resource #2, and resource #4}, which are resources other than {resource #3} corresponding to resource C among resource A. As a result, the terminal may assume that the symbol sequences {symbol #1, symbol #2, and symbol #3} are transmitted to {resource #1, resource #2, and resource #4}, respectively, and perform a series of reception operations thereafter.

Puncturing Operation

The base station maps the symbol sequence A to the entire resource A when there is a resource C corresponding to an area overlapping with the resource B among all resources A to transmit the symbol sequence A to the terminal, but may not perform transmission in a resource region corresponding to resource C, and may perform transmission only in resource regions other than resource C in resource A. For example, when the symbol sequence A is composed of {symbol #1, symbol #2, symbol #3, symbol 4}, the resource A is {resource #1, resource #2, resource #3, resource #4}, and the resource B is {resource #3, resource #5}, the base station may map the symbol sequence A {symbol #1, symbol #2, symbol #3, symbol #4} to resource A {resource #1, resource #2, resource #3, resource #4}, respectively, may transmit only symbol sequence {symbol #1, symbol #2, symbol #4} corresponding to the remaining resources {resource #1, resource #2, resource #4} excluding {resource #3} corresponding to resource C among resource A, and may not transmit {symbol #3} mapped to {resource #3} corresponding to resource C. As a result, the base station may map symbol sequences {symbol #1, symbol #2, and symbol #4} to {resource #1, resource #2, and resource #4} and transmit them.

The terminal may determine resource A and resource B from scheduling information on symbol sequence A from the base station. Through this, the terminal may determine resource C, which is an area where resource A and resource B overlap. The terminal may receive the symbol sequence A assuming that the symbol sequence A is mapped to the entire resource A and transmitted only in the remaining regions excluding resource C among the resource regions A. For example, when the symbol sequence A is composed of {symbol #1, symbol #2, symbol #3, symbol 4}, the resource A is {resource #1, resource #2, resource #3, resource #4}, and the resource B is {resource #3, resource #5}, the terminal may assume that the symbol sequence A {symbol #1, symbol #2, symbol #3, symbol #4} is mapped to resource A {resource #1, resource #2, resource #3, resource #4}, but {symbol #3} mapped to {resource #3} corresponding to resource C is not transmitted, and may receive by assuming that the symbol sequence {symbol #1, symbol #2, symbol #4} corresponding to the remaining resources {resource #1, resource #2, resource #4} excluding {resource #3} corresponding to resource C among resources A is mapped and transmitted. As a result, the terminal may assume that the symbol sequence {symbol #1, symbol #2, symbol #4} is mapped to {resource #1, resource #2, resource #4} and transmitted, and perform a series of subsequent reception operations.

A method for setting rate matching resources for the purpose of rate matching in the 5G communication system is described herein. The rate matching means that the size of the signal is adjusted in consideration of an amount of resources capable of transmitting the signal. For example, the rate matching of data channels means that the size of data is adjusted accordingly without mapping and transmitting the data channels for specific time and frequency resource domains.

Figure 11:
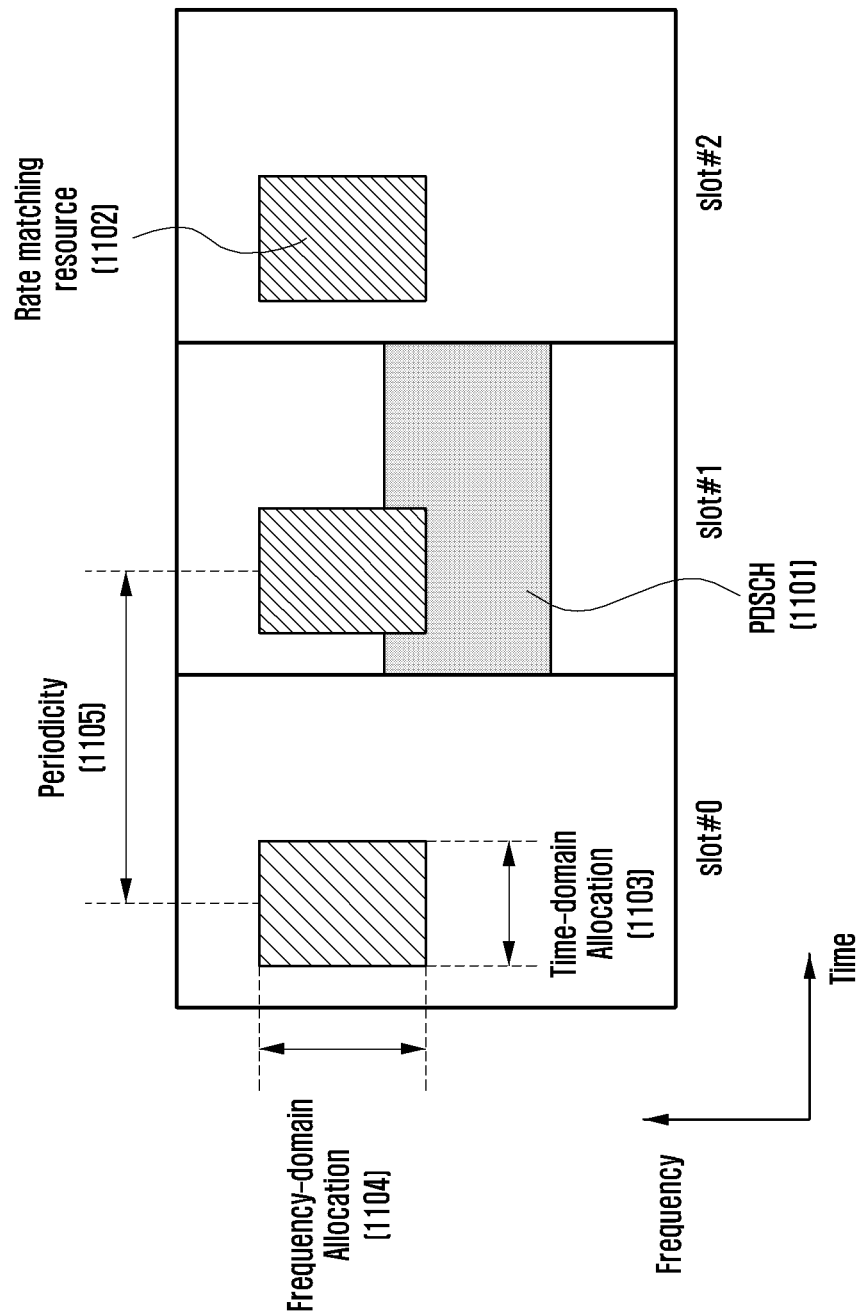
FIG. 11 illustrates a method for transmitting and receiving data by a base station and a terminal in consideration of a downlink data channel and a rate matching resource according to an embodiment.

FIG. 11 illustrates a method for transmitting and receiving data by a base station and a terminal in consideration of a downlink data channel and a rate matching resource according to an embodiment.

FIG. 11 shows a PDSCH 1101 and a rate matching resource 1102. The base station may configure one or multiple rate matching resources 1102 to the terminal through upper layer signaling (e.g., RRC signaling). The rate matching resource 1102 configuration information may include time axis resource allocation information 1103, frequency axis resource allocation information 1104, and period information 1105. A bitmap corresponding to the frequency-axis resource allocation information 1104 will be referred to as a first bitmap, a bitmap corresponding to time-axis resource allocation information 1103 will be referred to as a second bitmap, and a bitmap corresponding to the period information 1105 will be referred to as a third bitmap. When all or part of the time and frequency resources of the scheduled data channel 1101 overlap with the configured rate matching resource 602, the base station may rate-match and transmit the data channel 1101 in the rate-matching resource 1102 portion, and the terminal may perform reception and decoding after assuming that the data channel 1101 is rate-matched in the rate matching resource 1102 portion.

The base station may dynamically notify the terminal through DCI whether to rate match the data channel in the set rate matching resource part through additional configuration (corresponding to the rate matching indicator in the aforementioned DCI format). Specifically, the base station may select some of the set rate matching resources and group them into rate matching resource groups, and instruct to the terminal whether the rate matching of the data channel for each rate matching resource group is performed using a DCI using a bitmap method. For example, when four rate matching resources, RMR #1, RMR #2, RMR #3, and RMR #4 are configured, the base station may configure RMG #1={RMR #1, RMR #2}, and RMG #2={RMR #3, RMR #4} as a rate matching group, and may use 2 bits in the DCI field to instruct to the terminal whether rate matching is performed in RMG #1 and RMG #2, respectively, using a bitmap. For example, "1" may be indicated when rate matching is to be performed, and "0" may be indicated when rate matching is not to be performed.

In 5G systems, granularity of RB symbol level and RE level is supported as a method of configuring the above-described rate matching resources in the UE. Specifically, the following configuration method may be followed.

RB Symbol Level

The terminal may receive up to four RateMatchPatterns configured for each BWP by upper level signaling, and one RateMatchPattern may include the following contents:

As a reserved resource in the BWP, a resource in which the time and frequency resource domains of the corresponding reserved resource are configured may be included in a combination of an RB level bitmap and a symbol level bitmap on the frequency axis. The reserved resource may span one or two slots. A time domain pattern (periodicityAndPattern) in which time and frequency domains composed of each RB level and symbol level bitmap pair are repeated may be additionally configured.

Time and frequency domain resource areas configured as control resource sets within the BWP and resource areas corresponding to time domain patterns configured as search space configurations in which the corresponding resource areas are repeated may be included.

RE Level

The terminal may receive the following contents through upper layer signaling.

As configuration information (lte-CRS-ToMatchAround) for an RE corresponding to an LTE CRS (cell-specific reference signal or common reference signal) pattern, the number of ports of LTE CRS (nrofCRS-Ports) and the value of LTE-CRS-vshift(s) (v-shift), center subcarrier location information (carrierFreqDL) of the LTE carrier from the reference frequency point (e.g., reference point A), LTE carrier bandwidth size (carrierBandwidthDL) information, subframe configuration information corresponding to MBSFN (Multicast-broadcast single-frequency network) (mbsfn-SubframeConfigList), and the like may be included. The terminal may determine the position of the CRS in the NR slot corresponding to the LTE subframe based on the above information.

Configuration information about a resource set corresponding to one or a plurality of zero power (ZP) CSI-RS in the BWP may be included.

Related to LTE CRS Rate Match

The rate match process for the above-described LTE CRS is described herein in detail. For the coexistence of LTE and new RAT (LTE-NR coexistence), the NR provides the NR terminal with a function of setting a cell specific reference signal (CRS) pattern of LTE. More specifically, the CRS pattern may be provided by RRC signaling including at least one parameter in a ServingCellConfig information element (IE) or a ServingCellConfigCommon IE. Examples of the parameters may include lte-CRS-ToMatchAround, lte-CRS-PatternList1-r16, lte-CRS-PatternList2-r16, crs-RateMatch-PerCORESETPoolIndex-r16, and the like.

Rel-15 NR provides a function of setting one CRS pattern per serving cell through the lte-CRS-ToMatchAround parameter. In Rel-16 NR, the above function has been extended to enable configuring of a plurality of CRS patterns per serving cell. More specifically, one CRS pattern may be configured per one LTE carrier in a single-TRP configuration terminal, and two CRS patterns per one LTE carrier in a multi-TRP setting terminal could be configured. For example, up to three CR patterns per serving cell may be configured in a single-TRP configuration terminal through the lte-CRS-PatteDList1-r16 parameter. For another example, a CR5 may be configured for each TRP in a multi-TRP configuration terminal. That is, the CR pattern for TRP1 may be configured through the lte-CRS-PatternList1-r16 parameter, and the CRS pattern for TRP2 may be configured through the lte-CRS-PatternList2-r6 parameter. On the other hand, when two TRPs are configured as above, whether to apply both the CRS patterns of TRP1 and TRP2 to a specific PDSCH or whether to apply only the CRS pattern for one TRP is determined through the crs-RateMatch-PerCORESETPoolIndex-r16 parameter. If the crs-RateMatch-PerCORESETPoolIndex-r16 parameter is configured to enabled, only the CRS pattern of one TRP is applied, and in other cases, the CRS patterns of both TRPs are applied.

Table 26, below, shows the ServingCellConfg IE including the CRS pattern, and Table27, below, shows the RateMatchPatternLTE-CRS IE including at least one parameter for the CRS pattern.

TABLE 26

| | |
|---|---|
| ServingCellConfig ::= | SEQUENCE { |
| tdd-UL-DL-ConfigurationDedicated | TDD-UL-DL-ConfigDedicated |
| OPTIONAL, -- Cond TDD | |
| initialDownlinkBWP | BWP-DownlinkDedicated |
| OPTIONAL, -- Need M | |
| downlinkBWP-ToReleaseList | SEQUENCE (SIZE (1..maxNrofBWPs)) |
| OF BWP-Id | OPTIONAL, -- Need N |
| downlinkBWP-ToAddModList | SEQUENCE (SIZE |
| (1..maxNrofBWPs)) OF BWP-Downlink | OPTIONAL, -- |
| Need N | |
| firstActiveDownlinkBWP-Id | BWP-Id |
| OPTIONAL, -- Cond SyncAndCellAdd | |
| bwp-InactivityTimer | ENUMERATED {ms2, ms3, ms4, ms5, ms6, |
| ms8, ms10, ms20, ms30, | |
| | ms40,ms50, ms60, |
| ms80,ms100, ms200,ms300, ms500, | |
| | ms750, ms1280, ms1920, |
| ms2560, spare10, spare9, spare8, | |

TABLE 26-continued

```
                                                 spare7, spare6, spare5,
spare4, spare3, spare2, spare1 }   OPTIONAL,   -- Need R
    defaultDownlinkBWP-Id                        BWP-Id
OPTIONAL,   -- Need S
    uplinkConfig                                 UplinkConfig
OPTIONAL,   -- Need M
    supplementaryUplink                          UplinkConfig
OPTIONAL,   -- Need M
    pdcch-ServingCellConfig            SetupRelease { PDCCH-ServingCellConfig
}                                     OPTIONAL,   -- Need M
    pdsch-ServingCellConfig            SetupRelease { PDSCH-ServingCellConfig
}                                     OPTIONAL,   -- Need M
    csi-MeasConfig                        SetupRelease { CSI-MeasConfig }
OPTIONAL,   -- Need M
    sCellDeactivationTimer               ENUMERATED {ms20, ms40, ms80,
ms160, ms200, ms240,
                                                 ms320, ms400, ms480,
ms520, ms640, ms720,
                                                 ms840, ms1280,
spare2,spare1}   OPTIONAL,   -- Cond ServingCellWithoutPUCCH
    crossCarrierSchedulingConfig                 CrossCarrierSchedulingConfig
OPTIONAL,   -- Need M
    tag-Id                             TAG-Id,
    dummy                                        ENUMERATED {enabled}
OPTIONAL,   -- Need R
    pathlossReferenceLinking             ENUMERATED {spCell, sCell}
OPTIONAL,   -- Cond SCellOnly
    servingCellMO                                MeasObjectId
OPTIONAL,   -- Cond MeasObject
    ...,
    [[
    lte-CRS-ToMatchAround                SetupRelease { RateMatchPatternLTE-
CRS }                                 OPTIONAL,   -- Need M
    rateMatchPatternToAddModList                 SEQUENCE (SIZE
(1..maxNrofRateMatchPatterns)) OF RateMatchPattern    OPTIONAL,   -- Need N
    rateMatchPatternToReleaseList                SEQUENCE (SIZE
(1..maxNrofRateMatchPatterns)) OF RateMatchPatternId   OPTIONAL,   -- Need N
    downlinkChannelBW-PerSCS-List         SEQUENCE (SIZE (1..maxSCSs)) OF
SCS-SpecificCarrier                   OPTIONAL   -- Need S
    ]],
    [[
    supplementaryUplinkRelease                   ENUMERATED {true}
OPTIONAL,   -- Need N
    tdd-UL-DL-ConfigurationDedicated-IAB-MT-r16           TDD-UL-DL-
ConfigDedicated-IAB-MT-r16            OPTIONAL,   -- Cond
TDD_IAB
    dormantBWP-Config-r16                SetupRelease { DormantBWP-Config-r16
}                                     OPTIONAL,   -- Need M
    ca-SlotOffset-r16                   CHOICE {
        refSCS15kHz                              INTEGER (-2..2),
        refSCS30KHz                              INTEGER (-5..5),
        refSCS60KHz                              INTEGER (-10..10),
        refSCS120KHz                             INTEGER (-20..20)
    }
OPTIONAL,   -- Cond AsyncCA
    channelAccessConfig-r16            SetupRelease { ChannelAccessConfig-r16 }
OPTIONAL,   -- Need M
    intraCellGuardBandsDL-List-r16       SEQUENCE (SIZE (1..maxSCSs)) OF
IntraCellGuardBandsPerSCS-r16         OPTIONAL,   -- Need S
    intraCellGuardBandsUL-List-r16       SEQUENCE (SIZE (1..maxSCSs)) OF
IntraCellGuardBandsPerSCS-r16         OPTIONAL,   -- Need S
    csi-RS-ValidationWith-DCI-r16                ENUMERATED  {enabled}
OPTIONAL,   -- Need R
    lte-CRS-PatternList1-r16           SetupRelease { LTE-CRS-PatternList-r16 }
OPTIONAL,   -- Need M
    lte-CRS-PatternList2-r16           SetupRelease { LTE-CRS-PatternList-r16 }
OPTIONAL,   -- Need M
    crs-RateMatch-PerCORESETPoolIndex-r16        ENUMERATED  {enabled}
OPTIONAL,   -- Need R
    enableTwoDefaultTCI-States-r16               ENUMERATED  {enabled}
OPTIONAL,   -- Need R
    enableDefaultTCI-StatePerCoresetPoolIndex-r16     ENUMERATED {enabled}
OPTIONAL,   -- Need R
    enableBeamSwitchTiming-r16                   ENUMERATED  {true}
OPTIONAL,   -- Need R
```

TABLE 26-continued

```
    cbg-TxDiffTBsProcessingType1-r16          ENUMERATED  {enabled}
OPTIONAL,   -- Need R
    cbg-TxDiffTBsProcessingType2-r16          ENUMERATED  {enabled}
OPTIONAL       -- Need R
    ]]
}
```

TABLE 27

```
-RateMatchPatternLTE-CRS
The IE RateMatchPatternLTE-CRS is used to configure a pattern to rate match around LTE
CRS. See TS 38.214 [19], clause 5.1.4.2.
        RateMatchPatternLTE-CRS information element
-- ASN1START
-- TAG-RATEMATCHPATTERNLTE-CRS-START
RateMatchPatternLTE-CRS ::=       SEQUENCE {
    carrierFreqDL                     INTEGER (0..16383),
    carrierBandwidthDL                ENUMERATED {n6, n15, n25, n50, n75,
n100, spare2, spare1},
    mbsfn-SubframeConfigList          EUTRA-MBSFN-SubframeConfigList
OPTIONAL,   -- Need M
    nrofCRS-Ports                     ENUMERATED {n1, n2, n4},
    v-Shift                           ENUMERATED {n0, n1, n2, n3, n4, n5}
}
LTE-CRS-PatternList-r16 ::=       SEQUENCE (SIZE (1..maxLTE-CRS-Patterns-r16))
OF RateMatchPatternLTE-CRS
-- TAG-RATEMATCHPATTERNLTE-CRS-STOP
-- ASN1STOP
        RateMatchPatternLTE-CRS field descriptions
carrierBandwidthDL
 BW of the LTE carrier in number of PRBs (see TS 38.214 [19], clause 5.1.4.2).
carrierFreqDL
 Center of the LTE carrier (see TS 38.214 [19], clause 5.1.4.2).
mbsfn-SubframeConfigList
 LTE MBSFN subframe configuration (see TS 38.214 [19], clause 5.1.4.2).
nrofCRS-Ports
 Number of LTE CRS antenna port to rate-match around (see TS 38.214 [19], clause 5.1.4.2).
v-Shift
 Shifting value v-shift in LTE to rate match around LTE CRS (see TS 38.214 [19], clause
5.1.4.2).
```

PDSCH: Related to Frequency Resource Allocation

Figure 13:
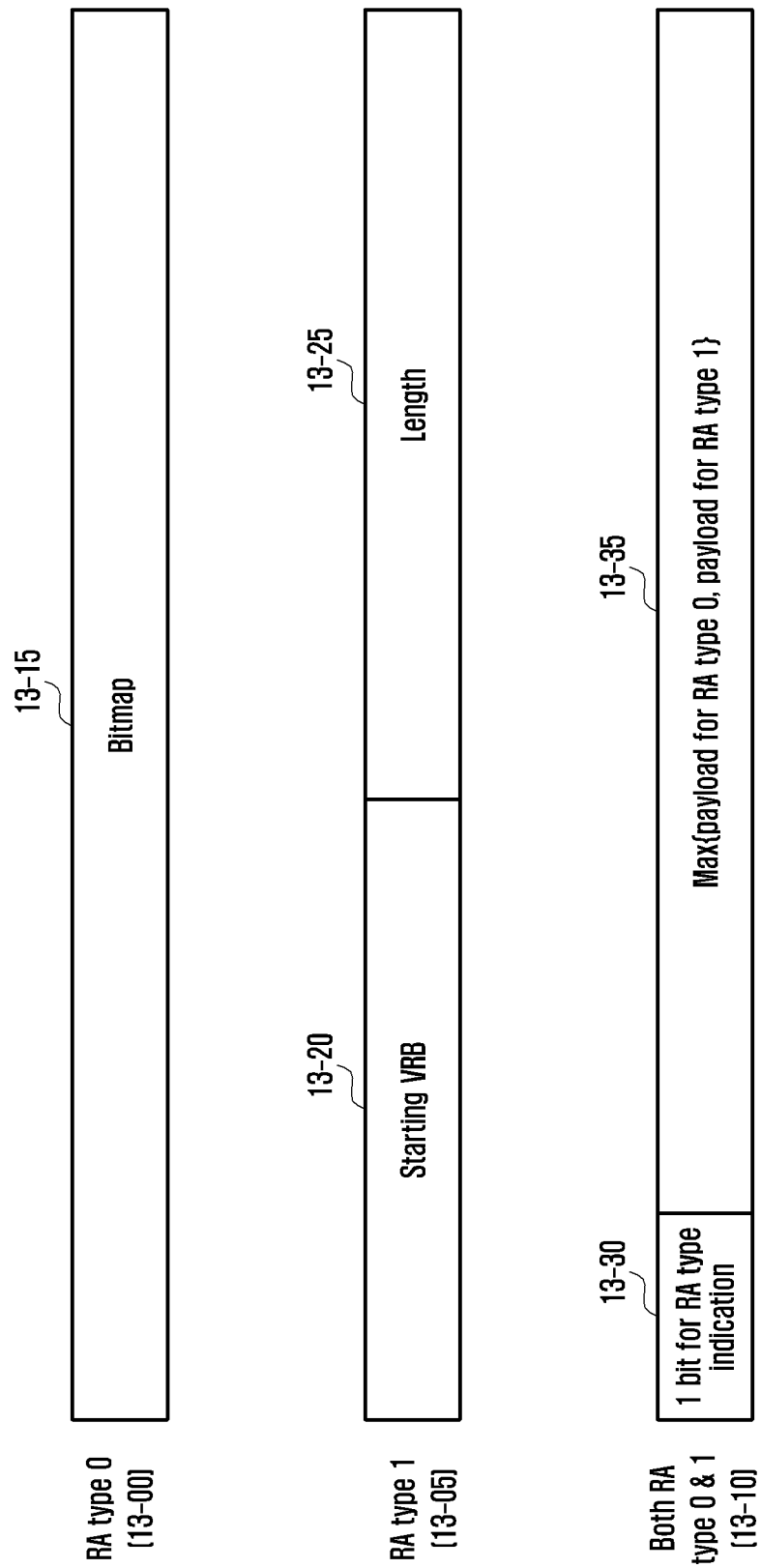
FIG. 13 illustrates an example of frequency axis resource allocation of a physical downlink shared channel (PDSCH) in a wireless communication system according to an embodiment.

FIG. 13 illustrates an example of frequency axis resource allocation of a PDSCH in a wireless communication system according to an embodiment. Specifically, FIG. 13 illustrates three frequency axis resource allocation methods of type 0 (13-00), type 1 (13-05), and dynamic switch (13-10) that can be configured through an upper layer in an NR wireless communication system.

Referring to FIG. 13, if the terminal is configured to use only resource type 0 through upper layer signaling (13-00), some DCI for allocating a PDSCH to a corresponding UE includes a bitmap composed of non-deterministic random bit generator (NRBG) bits. Conditions for this are described below. In this case, the NRBG means the number of RB groups (RBGs) determined as shown in Table 28, below, according to the BWP size allocated by the BWP indicator and the upper layer parameter rbg-Size, and data is transmitted to the RBG indicated by 1 by the bitmap.

TABLE 28

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

If the terminal is set to use only resource type 1 through upper layer signaling (13-05), some DCIs for allocating a PDSCH to a corresponding UE include frequency axis resource allocation information consisting of $\lceil \log_2(N_{RB}^{DL,BWP}(N_{RB}^{DW,BWP}+1)/2) \rceil$ bits. Conditions for this are described below. Through this, the base station may configure the starting VRB (13-20) and the length (13-25) of frequency axis resources continuously allocated therefrom.

If the terminal is configured to use both resource type 0 and resource type 1 through upper layer signaling (13-10), some DCIs allocating a PDSCH to a corresponding terminal include frequency axis resource allocation information consisting of bits of a large value (13-35) among payloads (13-30) for configuring resource type 0 and payloads (13-20, 13-25) for configuring resource type 1. Conditions for this are described below. One bit may be added to the first part most significant bit (MSB) of the frequency axis resource allocation information in the DCI, and may indicate that resource type 0 is used when the corresponding bit has a value of '0', and it may indicate that resource type 1 is used when the corresponding bit has a value of '1'.

PDSCH/PUSCH: Related to Time Resource Allocation

Herein, a time domain resource allocation method for a data channel in a next-generation mobile communication system (5G or NR system) is described.

The base station may configure a table for time domain resource allocation information for a downlink shared channel (PDSCH) and a PUSCH to the terminal by upper layer signaling (e.g., RRC signaling). For PDSCH, a table consisting of maxNrofDL-Allocations=16 entries may be configured, and for PUSCH, a table consisting of maxNrofUL-Allocations=16 entries may be configured. The time domain resource allocation information may include PDCCH-to-PDSCH slot timing (corresponding to the time interval in units of slots between the time when the PDCCH is received and the time when the PDSCH scheduled by the received PDCCH is transmitted, denoted as K0), PDCCH-to-PUSCH slot timing (corresponding to the time interval in units of slots between the time when the PDCCH is received and the time when the PUSCH scheduled by the received PDCCH is transmitted, denoted as K2), information on the position and length of the start symbol for which the PDSCH or PUSCH is scheduled within the slot, the mapping type of the PDSCH or PUSCH, and the like. For example, information such as Table 29 or Table 30, below, may be transmitted from the base station to the terminal.

TABLE 29

*PDSCH-TimeDomainResourceAllocationList* information element

```
PDSCH-TimeDomainResourceAllocationList          ::=    SEQUENCE
(SIZE(1..maxNrofDL-Allocations)) OF PDSCH-TimeDomainResourceAllocation
PDSCH-TimeDomainResourceAllocation     ::= SEQUENCE    (
    k0                                                 INTEGER
(0..32)
OPTIONAL, --Need S
    (PDCCH-to-PDSCH timing, slot unit)
    mappingType                  ENUMERATED (typeA, typeB),
    (PDSCH mapping type)
    startSymbolAndLength         INTEGER (0..127)
    (start symbol and length PDSCH)
```

TABLE 30

*PUSCH-TimeDomainResourceAllocationList* information element

```
PUSCH-TimeDomainResourceAllocationList          ::=    SEQUENCE
(SIZE(1..maxNrofUL-Allocations)) OF PUSCH-TimeDomainResourceAllocation
PUSCH-TimeDomainResourceAllocation     ::= SEQUENCE    (
    k2                                          INTEGER (0..32)
OPTIONAL, -- Need S
    (PDCCH-to-PUSCH timing, slot unit)
    mappingType                  ENUMERATED (typeA, typeB),
    (PUSCH mapping type)
    startSymbolAndLength         INTEGER (0..127)
    (start symbol and length of PUSCH)
```

The base station may notify the terminal of one of the entries of the table for the above-described time domain resource allocation information through L1 signaling (e.g., DCI) (e.g., to be indicated by the time domain resource allocation field in the DCI). The terminal may obtain time domain resource allocation information for the PDSCH or PUSCH, based on the DCI received from the base station.

Figure 14:
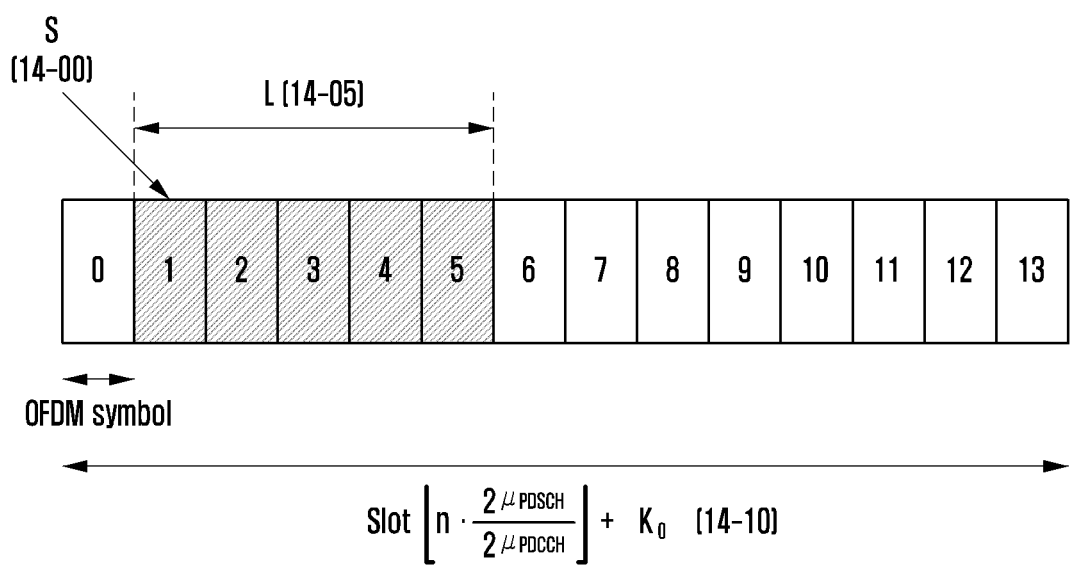
FIG. 14 illustrates an example of time axis resource allocation of a PDSCH in a wireless communication system according to an embodiment.

FIG. 14 illustrates an example of time axis resource allocation of a PDSCH in a wireless communication system according to an embodiment.

Referring to FIG. 14, the base station may indicate the time axis position of the PDSCH resource according to subcarrier spacing (SCS) ($\mu_{PDSCH}$, $\mu_{PDCCH}$) of a data channel and a control channel configured using a higher layer, a scheduling offset (K0) value, and OFDM symbol start position (14-00) and length (14-05) within one slot dynamically indicated through DCI.

Figure 15:
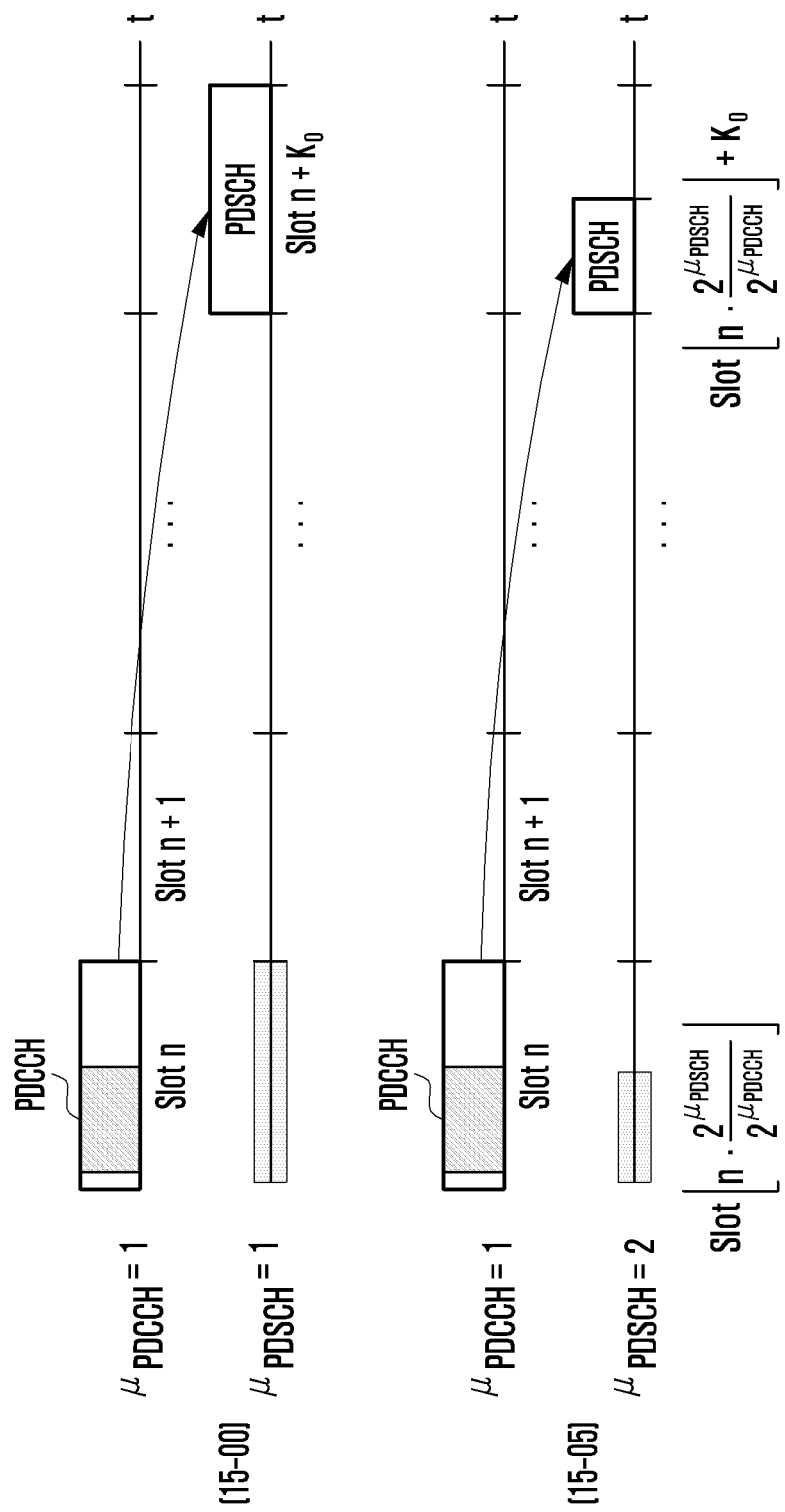
FIG. 15 illustrates an example of time axis resource allocation according to subcarrier intervals of a data channel and a control channel in a wireless communication system according to an embodiment.

FIG. 15 illustrates an example of time axis resource allocation according to subcarrier intervals of a data channel and a control channel in a wireless communication system according to an embodiment.

Referring to FIG. 15, when the subcarrier intervals of the data channel and the control channel are the same (15-00, $\mu_{PDSCH}=\mu_{PDCCH}$), because the slot numbers for data and control are the same, the base station and the terminal may generate a scheduling offset according to a predetermined slot offset K0. On the other hand, when the subcarrier intervals of the data channel and the control channel are different (15-05, $\mu_{PDSCH}\neq\mu_{PDCCH}$), because the slot numbers for data and control are different, the base station and the terminal may generate a scheduling offset according to a predetermined slot offset K0 based on the subcarrier interval of the PDCCH.

PDSCH: Processing Time

When the base station schedules the terminal to transmit PDSCH using DCI format 1_0, 1_1, or 1_2, the terminal may need PDSCH processing time to receive the PDSCH by applying the transmission method indicated through DCI (modulation and coding instruction index of a modulation coding scheme (MCS), DMRS related information, time and frequency resource allocation information, etc.). In the NR, the PDSCH processing time was defined in consideration of this. The PDSCH processing time of the UE may follow Equation (3), below.

$$T_{proc,1}=(N_1+d_{1,1}+d_2)(2048+144)\kappa 2^{-\mu}T_c+T_{ext} \quad (3)$$

In $T_{proc,1}$ described above based on Equation (3), the variables may have the following meaning:

$N_1$: The number of symbols determined according to UE processing capability 1 or 2 and numerology µ according to the capabilities of the UE. When reported as UE processing capability 1 according to the capability report of the UE, $N_1$ has the value of Table 31, below, and when reported has UE processing capability 2 and configured through upper layer signaling that UE processing capability 2 can be used, $N_1$ may have a value of Table 32, below. The numerology JA may correspond to the minimum value among $\mu_{PDCCH}$, $\mu_{PDSCH}$, and $\mu_{UL}$ to maximize $T_{proc,1}$, and $\mu_{PDCCH}$, $\mu_{PDSCH}$, and $\mu_{UL}$ means the numerology of a PDCCH that schedules a PDSCH, the numerology of a scheduled PDSCH, and the numerology of an uplink channel through which an HARQ-ACK is to be transmitted.

TABLE 31

PDSCH processing time in case of PDSCH processing capability 1

PDSCH decoding time $N_1$ [symbols]

| $\mu$ | When dmrs-AdditionalPosition = pos0 in DMRS-DownlinkConfig, which is upper layer signaling for both PDSCH mapping type A and B | When dmrs-AdditionalPosition ≠ pos0 in DMRS-DownlinkConfig, which is upper layer signaling for both PDSCH mapping type A and B or when the upper layer parameter is not set |
|---|---|---|
| 0 | 8 | $N_{1,0}$ |
| 1 | 10 | 13 |
| 2 | 17 | 20 |
| 3 | 20 | 24 |

TABLE 32

PDSCH processing time in case of PDSCH processing capability 2

| $\mu$ | PDSCH decoding time $N_1$ [symbols] When dmrs-AdditionalPosition = pos0 in DMRS-DownlinkConfig, which is upper layer signaling for both PDSCH mapping type A and B |
|---|---|
| 0 | 3 |
| 1 | 4.5 |
| 2 | 9 for frequency range 1 |

κ: 64

$T_{ext}$: If the terminal uses the shared spectrum channel access method, the terminal may calculate $T_{ext}$ and apply the $T_{ext}$ to the PDSCH processing time. Otherwise, $T_{ext}$ is assumed to be 0.

If $l_1$ indicating the PDSCH DMRS position value is 12, N1,0 in Table 31, above, has a value of 14, otherwise it has a value of 13.

For PDSCH mapping type A, the last symbol of the PDSCH is the $i^{th}$ symbol in the slot in which the PDSCH is transmitted, and if i<7, $d_{1,1}$ is 7-i, otherwise $d_{1,1}$ is 0.

$d_2$: When a PUCCH with a high priority index and a PUCCH or PUSCH with a low priority index overlap in time, $d_2$ of the PUCCH with a high priority index may be set to a value reported from the UE. Otherwise, $d_2$ is 0.

When PDSCH mapping type B is used for UE processing capability 1, the value of $d_{1,1}$ is determined according to L, which is the number of symbols of the scheduled PDSCH, and d, the number of overlapping symbols between the PDCCH scheduling the PDSCH and the scheduled PDSCH.

If L≥7, $d_{1,1}$=0.
If L≥4 and L≤6, $d_{1,1}$=7−L.
If L=3, $d_{1,1}$=min(d,1).
If L=2, $d_{1,1}$=3+d.

When PDSCH mapping type B is used for UE processing capability 2, the value of $d_{1,1}$ may be determined according to L, which is the number of symbols of the scheduled PDSCH, and d, the number of overlapping symbols between the PDCCH scheduling the PDSCH and the scheduled PDSCH, as follows:

If L≥7, $d_{1,1}$=0.
If L≥4 and L≤6, $d_{1,1}$=7−L.
If L=2,

If a PDCCH to be scheduled exists in a CORESET composed of 3 symbols, and the corresponding CORESET and the scheduled PDSCH have the same start symbol, $d_{1,1}$=3.
Otherwise, $d_{1,1}$=d.

In the case of a UE supporting capability 2 in a given serving cell, PDSCH processing time according to UE processing capability 2 may be applied when the UE configures processingType2Enabled, which is upper layer signaling, to enable for the corresponding cell.

If the position (corresponding position may consider $K_1$ defined as the transmission time of HARQ-ACK, PUCCH resources used for HARQ-ACK transmission, and timing advance effect) of the first uplink transmission symbol of the PUCCH including HARQ-ACK information does not start before the first uplink transmission symbol that appears after a time of $T_{proc,1}$ from the last symbol of the PDSCH, the terminal should transmit a valid HARQ-ACK message. That is, the UE should transmit the PUCCH including the HARQ-ACK only when the PDSCH processing time is sufficient. Otherwise, the terminal cannot provide valid HARQ-ACK information corresponding to the scheduled PDSCH to the base station. The above $T_{proc,1}$ may be used for both normal or extended CP cases. In the case of a PDSCH composed of two PDSCH transmission positions within one slot, dii is calculated based on the first PDSCH transmission position within the corresponding slot.

PDSCH: Receive Preparation Time for Cross-Carrier Scheduling

Next, in the case of cross-carrier scheduling in which $\mu_{PDCCH}$, which is a numerology through which a scheduled PDCCH is transmitted, and $\mu_{PDSCH}$, which is a numerology through which a PDSCH scheduled through the corresponding PDCCH is transmitted, are different from each other, $N_{pdsch}$, which is the PDSCH reception preparation time of the UE defined for the time interval between the PDCCH and the PDSCH, is described.

If $\mu_{PDCCH} < \mu_{PDSCH}$, the scheduled PDSCH cannot be transmitted before the first symbol of the slot following the $N_{pdsch}$ symbol from the last symbol of the PDCCH that scheduled the corresponding PDSCH. A transmission symbol of the corresponding PDSCH may include a DM-RS.

If $\mu_{PDCCH} > \mu_{PDSCH}$, the scheduled PDSCH may be transmitted from the $N_{pdsch}$ symbol after the last symbol of the PDCCH that scheduled the corresponding PDSCH. A transmission symbol of the corresponding PDSCH may include a DM-RS.

Table 33, below, provides an example of Npdsch according to the scheduled PDCCH subcarrier interval.

TABLE 33

| $\mu_{PDCCH}$ | $N_{pdsch}$ [symbols] |
|---|---|
| 0 | 4 |
| 1 | 5 |
| 2 | 10 |
| 3 | 14 |

PDSCH: TCI State Activation MAC-CE

Figure 16:
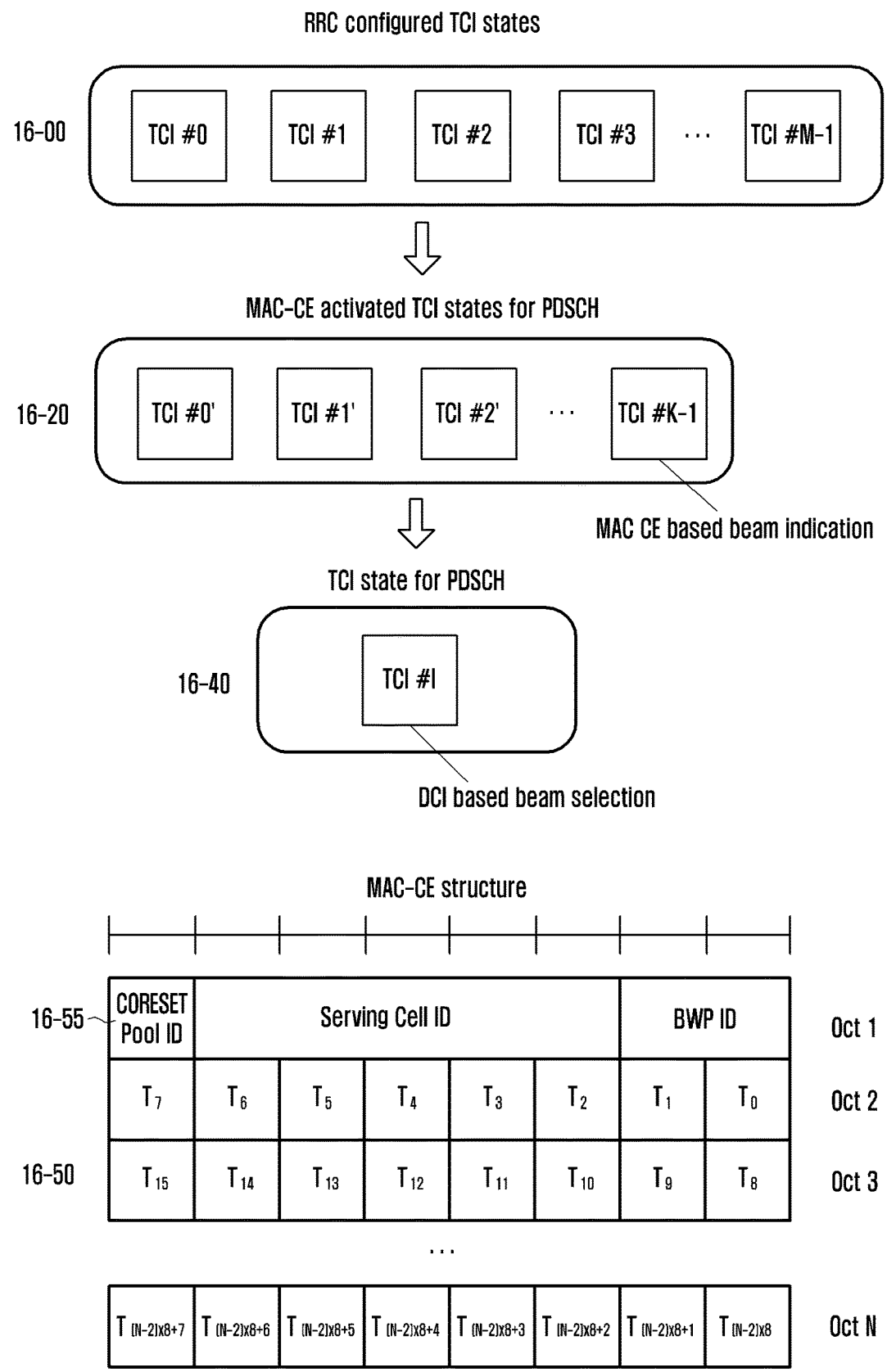
FIG. 16 illustrates a process for configuring and activating a PDSCH beam.

Next, a beam configuration method for the PDSCH is described. FIG. 16 illustrates a process for configuring and activating a PDSCH beam. The list of TCI states for the PDSCH may be indicated through an upper layer list such as RRC (16-00). The list of TCI states may be indicated as, for example, tci-StatesToAddModList and/or tci-StatesToReleaseList in the PDSCH-Config IE for each BWP. Next, some of the list of TCI states may be activated through MAC-CE (16-20). The maximum number of activated TCI states may be determined according to capabilities reported by the UE. 16-40 illustrates DCI beam selection in a TCI state for PDSCH, and (16-50) shows an example of a MAC-CE structure for PDSCH TCI state activation/deactivation.

Table 34, below, shows the meaning of each field in the MAC-CE and values that can be set for each field.

TABLE 34

- Serving Cell ID (serving cell identifier): This field indicates the identity of the Serving Cell for which the MAC-CE applies. The length of the field is 5 bits. If the indicated Serving Cell is configured as part of a simultaneousTCI-UpdateList1 or simultaneousTCI-UpdateList2 as specified in TS 38.331 [5], this MAC-CE applies to all the Serving Cells configured in the set simultaneousTCI-UpdateList1 or simultaneousTCI-UpdateList2, respectively;
- BWP ID: This field indicates a DL BWP for which the MAC-CE applies as the codepoint of the DCI BWP indicator field as specified in TS 38.212 [9]. The length of the BWP ID field is 2 bits. This field is ignored if this MAC-CE applies to a set of Serving Cells;
- T$_i$ (TCI state identifier): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e., the first TCI State with T$_i$ field set to 1 shall be mapped to the codepoint value 0, second TCI State with Ti field set to 1 shall be mapped to the codepoint value 1 and so on. The maximum number of activated TCI states is 8;
- CORESET Pool ID (CORESET Pool ID identifier): This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC-CE shall be applied for the DL transmission scheduled by CORESET with the CORESET pool ID equal to 1, otherwise, this MAC-CE shall be applied for the DL transmission scheduled by CORESET pool ID equal to 0. If the coresetPoolIndex is not configured for any CORESET, MAC entity shall ignore the CORESET Pool ID field in this MAC-CE when receiving the MAC-CE. If the Serving Cell in the MAC-CE is configured in a cell list that contains more than one Serving Cell, the CORESET Pool ID field shall be ignored when receiving the MAC-CE.

Related to SRS

Next, a method for estimating an uplink channel using sounding reference signal (SRS) transmission of a terminal is described. The base station may configure at least one SRS configuration for each uplink BWP to deliver configuration information for SRS transmission to the terminal, and may also configure at least one SRS resource set for each SRS configuration.

As an example, the base station and the terminal may send and receive upper layer signaling information to deliver information about the SRS resource set, as follows:

srs-ResourceSetId: SRS resource set index srs-ResourceIdList: A set of SRS resource indexes referenced by the SRS resource set resourceType: This is a time axis transmission configuration of the SRS resource referenced by the SRS resource set, which can be configured to one of periodic, semi-persistent, and aperiodic. If configured to periodic or semi-persistent, associated CSI-RS information may be provided according to the usage of the SRS resource set. If configured to aperiodic, an aperiodic SRS resource trigger list and slot offset information may be provided, and associated CSI-RS information may be provided according to the usage of the SRS resource set.

usage: This is a configuration for the usage of the SRS resource referenced by the SRS resource set, and may be configured to one of beamManagement, codebook, nonCodebook, and antennaSwitching.

alpha, p0, pathlossReferenceRS, srs-PowerControlAdjustmentStates: Provide parameter settings for adjusting the transmit power of the SRS resource referenced by the SRS resource set.

The UE can understand that the SRS resource included in the set of SRS resource indexes referenced by the SRS resource set follows the information configured in the SRS resource set.

In addition, the base station and the terminal may transmit and receive upper layer signaling information to deliver individual configuration information for the SRS resource. For example, the individual configuration information for the SRS resource may include time-frequency axis mapping information within a slot of the SRS resource, which may include information on frequency hopping within a slot or between slots of the SRS resource. In addition, individual configuration information for the SRS resource may include time axis transmission configuration of the SRS resource, and may be configured to one of periodic, semi-persistent, and aperiodic. This may be limited to having a time axis transmission setting such as an SRS resource set including an SRS resource. If the time axis transmission configuration of the SRS resource is configured to periodic or semi-persistent, the SRS resource transmission period and slot offset (e.g., periodicityAndOffset) may be additionally included in the time axis transmission configuration.

The base station may activate, deactivate, or trigger SRS transmission to the terminal through upper layer signaling including RRC signaling or MAC-CE signaling, or L1 signaling (e.g., DCI). For example, the base station may activate or deactivate periodic SRS transmission through upper layer signaling to the terminal. The base station may instruct to activate an SRS resource set in which resourceType is configured to periodic through upper layer signaling, and the terminal may transmit an SRS resource referred to in the activated SRS resource set. The time-frequency axis resource mapping within the slot of the transmitted SRS resource follows resource mapping information configured in the SRS resource, and the slot mapping including transmission period and slot offset follows periodicityAndOffset configured in the SRS resource. In addition, the spatial domain transmission filter applied to the transmitted SRS resource may refer to spatial relation info set in the SRS resource or associated CSI-RS information configured in the SRS resource set including the SRS resource. The UE may transmit the SRS resource within the uplink BWP activated for the periodic SRS resource activated through upper layer signaling.

For example, the base station may activate or deactivate semi-persistent SRS transmission through upper layer signaling to the terminal. The base station may instruct to activate the SRS resource set through MAC-CE signaling, and the terminal may transmit the SRS resource referred to in the activated SRS resource set. An SRS resource set activated through MAC-CE signaling may be limited to an SRS resource set whose resourceType is configured to semi-persistent. The time-frequency axis resource mapping within the slot of the transmitted SRS resource follows the resource mapping information configured in the SRS resource, and the slot mapping including transmission period and slot offset follows periodicityAndOffset configured in the SRS resource. In addition, the spatial domain transmission filter applied to the transmitted SRS resource may refer to spatial relation info configured in the SRS resource, or may refer to associated CSI-RS information configured in an SRS resource set including the SRS resource. If spatial relation info is set in the SRS resource, instead of following it, a spatial domain transmission filter may be determined by referring to configuration information on spatial relation info transmitted through MAC-CE signaling for activating semi-persistent SRS transmission. The terminal may transmit the SRS resource within the activated uplink BWP for the semi-persistent SRS resource activated through upper layer signaling.

For example, the base station may trigger aperiodic SRS transmission to the terminal through DCI. The base station may indicate one of the aperiodic SRS resource triggers (aperiodicSRS-ResourceTrigger) through the SRS request field of the DCI. The UE may understand that the SRS resource set including the aperiodic SRS resource trigger indicated through the DCI in the aperiodic SRS resource trigger list among the configuration information of the SRS resource set has been triggered. The terminal may transmit the SRS resource referred to in the triggered SRS resource set. The time-frequency axis resource mapping within a slot of a transmitted SRS resource follows resource mapping information configured in the SRS resource. In addition, the slot mapping of the transmitted SRS resource may be determined through a slot offset between a PDCCH including DCI and the SRS resource, which may refer to value(s) included in a slot offset set configured in the SRS resource set. Specifically, the slot offset between the PDCCH including the DCI and the SRS resource may apply a value indicated by the time domain resource assignment field of the DCI among the offset value(s) included in the slot offset set configured in the SRS resource set. In addition, the spatial domain transmission filter applied to the transmitted SRS resource may refer to spatial relation info set in the SRS resource, or may refer to associated CSI-RS information configured in an SRS resource set including the SRS resource. The UE may transmit an SRS resource within an activated uplink BWP for an aperiodic SRS resource triggered through DCI.

When the base station triggers aperiodic SRS transmission to the terminal through DCI, and in order for the terminal to transmit the SRS by applying the configuration information for the SRS resource, a minimum time interval between a PDCCH including a DCI triggering aperiodic SRS transmission and a transmitting SRS may be required. The time interval for SRS transmission of the UE may be defined as the number of symbols between the last symbol of the PDCCH including the DCI triggering aperiodic SRS transmission and the first symbol to which the first transmitted SRS resource among transmitted SRS resource(s) is mapped. The minimum time interval may be determined by referring to the PUSCH preparation procedure time required for the UE to prepare for PUSCH transmission. In addition, the minimum time interval may have a different value depending on where an SRS resource set including a transmitted SRS resource is used. For example, the minimum time interval may be defined as an N2 symbol defined in consideration of UE processing capability according to the capabilities of the UE with reference to the PUSCH preparation procedure time of the UE. In addition, considering the usage of the SRS resource set including the transmitted SRS resource, when the usage of the SRS resource set is configured to codebook or antennaSwitching, the minimum time interval is configured to N2 symbols, and when the usage of the SRS resource set is configured to nonCodebook or beamManagement, the minimum time interval can be configured to N2+14 symbols. The UE may transmit the aperiodic SRS when the time interval for aperiodic SRS transmission is greater than or equal to the minimum time interval, and ignore the DCI triggering the aperiodic SRS when the time interval for aperiodic SRS transmission is less than the minimum time interval.

TABLE 35

```
SRS-Resource ::=                    SEQUENCE {
    srs-ResourceId                      SRS-ResourceId,
    nrofSRS-Ports                       ENUMERATED {port1, ports2,
ports4},
    ptrs-PortIndex                      ENUMERATED {n0, n1 }
OPTIONAL,    -- Need R
    transmissionComb                    CHOICE {
        n2                                  SEQUENCE {
            combOffset-n2                       INTEGER (0..1),
            cyclicShift-n2                      INTEGER (0..7)
        },
        n4                                  SEQUENCE {
            combOffset-n4                       INTEGER (0..3),
            cyclicShift-n4                      INTEGER (0..11)
        }
    },
    resourceMapping                     SEQUENCE {
        startPosition                       INTEGER (0..5),
        nrofSymbols                         ENUMERATED {n1, n2,
n4},
        repetitionFactor                    ENUMERATED {n1, n2, n4}
    }
    freqDomainPosition                  INTEGER (0..67),
    freqDomainShift                     INTEGER (0..268),
    freqHopping                         SEQUENCE {
        c-SRS                               INTEGER (0..63),
        b-SRS                               INTEGER (0..3),
        b-hop                               INTEGER (0..3)
    },
    groupOrSequenceHopping              ENUMERATED { neither,
groupHopping, sequenceHopping },
    resourceType                        CHOICE {
        aperiodic                           SEQUENCE {
            ...
        },
        semi-persistent                     SEQUENCE {
            periodicityAndOffset-sp             SRS-
PeriodicityAndOffset,
            ...
        },
        periodic                            SEQUENCE {
            periodicityAndOffset-p              SRS-
PeriodicityAndOffset,
            ...
        }
    },
    sequenceId                          INTEGER (0..1023),
    spatialRelationInfo                 SRS-SpatialRelationInfo
OPTIONAL,    -- Need R
    ...
}
```

The spatialRelationInfo configuration information in Table 35, above, refers to one reference signal and applies the beam information of the reference signal to the beam used for the corresponding SRS transmission. For example, the configuration of spatialRelationInfo may include information such as in Table 36, below.

TABLE 36

```
SRS-SpatialRelationInfo ::=    SEQUENCE {
    servingCellId                  ServCellIndex
OPTIONAL,   -- Need S
    referenceSignal                CHOICE {
        ssb-Index                      SSB-Index,
        csi-RS-Index                   NZP-CSI-RS-ResourceId,
        srs                            SEQUENCE {
            resourceId                     SRS-ResourceId,
            uplinkBWP                      BWP-Id
        }
    }
}
```

Referring to the spatialRelationInfo setting, an SS/PBCH block index, CSI-RS index, or SRS index may be configured as an index of a reference signal to be referred to in order to use beam information of a specific reference signal. Upper layer signaling referenceSignal is configuration information indicating which beam information of a reference signal will be referred to for corresponding SRS transmission, and ssb-Index denotes an SS/PBCH block index, csi-RS-Index denotes a CSI-RS index, and srs denotes an SRS index. If the value of upper layer signaling referenceSignal is configured to ssb-Index, the terminal may apply the RX beam used when receiving the SS/PBCH block corresponding to the ssb-Index as the transmit beam of the corresponding SRS transmission. If the value of the upper layer signaling referenceSignal is configured to csi-RS-Index, the terminal may apply the Rx beam used when receiving the CSI-RS corresponding to the csi-RS-Index as the Tx beam of the corresponding SRS transmission. If the value of upper layer signaling referenceSignal is configured to srs, the terminal may apply the transmission beam used when transmitting the SRS corresponding to srs as the transmission beam of the corresponding SRS transmission.

PUSCH: Related to Transmission Method

Next, a scheduling scheme for PUSCH transmission is described. PUSCH transmission may be dynamically scheduled by a UL grant in DCI or operated by configured grant Type 1 or Type 2. Dynamic scheduling indication for PUSCH transmission is available in DCI format 0_0 or 0_1.

Configured grant Type 1 PUSCH transmission may be semi-statically configured through reception of configuredGrantConfig including rrc-ConfiguredUplinkGrant of Table 37, below, through upper layer signaling without reception of UL grant in DCI. Configured grant Type 2 PUSCH transmission may be semi-persistently scheduled by UL grant in DCI after receiving configuredGrantConfig not including rrc-ConfiguredUplinkGrant in Table 37 through upper layer signaling. When the PUSCH transmission is operated by configured grant, parameters applied to the PUSCH transmission are applied through configuredGrant-Config, upper layer signaling of Table 37, except for dataScramblingIdentityPUSCH, txConfig, codebookSubset, maxRank, and scaling of UCI-OnPUSCH provided by push-Config of Table 38, below, which is an upper layer signaling. If the terminal is provided with transformPrecoder in configuredGrantConfig, which is the upper layer signaling of Table 37, the terminal applies tp-pi2BPSK in push-Config of Table 38 to PUSCH transmission operated by the configured grant.

TABLE 37

```
ConfiguredGrantConfig ::=        SEQUENCE {
    frequencyHopping                ENUMERATED {intraSlot, interSlot}
OPTIONAL,   -- Need S,
    cg-DMRS-Configuration           DMRS-UplinkConfig,
    mcs-Table                       ENUMERATED {qam256,
qam64LowSE}                                          OPTIONAL,  --
Need S
    mcs-TableTransformPrecoder      ENUMERATED {qam256,
qam64LowSE}                                          OPTIONAL,  --
Need S
    uci-OnPUSCH                     SetupRelease { CG-UCI-
OnPUSCH }                                            OPTIONAL,  --
Need M
    resourceAllocation              ENUMERATED
{ resourceAllocationType0, resourceAllocationType1, dynamicSwitch },
    rbg-Size                        ENUMERATED {config2}
OPTIONAL,   -- Need S
    powerControlLoopToUse           ENUMERATED {n0, n1},
    p0-PUSCH-Alpha                  P0-PUSCH-AlphaSetId,
    transformPrecoder               ENUMERATED {enabled, disabled}
OPTIONAL,   -- Need S
    nrofHARQ-Processes              INTEGER(1..16),
    repK                            ENUMERATED {n1, n2, n4, n8},
    repK-RV                         ENUMERATED {s1-0231, s2-0303,
s3-0000}                                             OPTIONAL,  -- Need R
    periodicity                     ENUMERATED {
                                         sym2, sym7, sym1x14,
sym2x14, sym4x14, sym5x14, sym8x14, sym10x14, sym16x14, sym20x14,
                                         sym32x14, sym40x14,
sym64x14, sym80x14, sym128x14, sym160x14, sym256x14, sym320x14, sym512x14,
                                         sym640x14, sym1024x14,
sym1280x14, sym2560x14, sym5120x14,
                                         sym6, sym1x12, sym2x12,
sym4x12, sym5x12, sym8x12, sym10x12, sym16x12, sym20x12, sym32x12,
                                         sym40x12, sym64x12,
sym80x12, sym128x12, sym160x12, sym256x12, sym320x12, sym512x12,
sym640x12,
                                         sym1280x12, sym2560x12
    },
    configuredGrantTimer            INTEGER (1..64)
OPTIONAL,   -- Need R
    rrc-ConfiguredUplinkGrant       SEQUENCE {
        timeDomainOffset                INTEGER (0..5119),
        timeDomainAllocation            INTEGER (0..15),
        frequencyDomainAllocation       BIT STRING (SIZE(18)),
        antennaPort                     INTEGER (0..31),
        dmrs-SeqInitialization          INTEGER (0..1)
OPTIONAL,   -- Need R
        precodingAndNumberOfLayers      INTEGER (0..63),
        srs-ResourceIndicator           INTEGER  (0..15)
OPTIONAL,   -- Need R
        mcsAndTBS                       INTEGER (0..31),
        frequencyHoppingOffset          INTEGER (1..
maxNrofPhysicalResourceBlocks-1)                     OPTIONAL,  -- Need R
        pathlossReferenceIndex          INTEGER
(0..maxNrofPUSCH-PathlossReferenceRSs-1),
        ...
    }
OPTIONAL,   -- Need R
    ...
}
```

Next, a PUSCH transmission method is described. The DMRS antenna port for PUSCH transmission is the same as the antenna port for SRS transmission. The PUSCH transmission may follow a codebook-based transmission method and a non-codebook-based transmission method, respectively, depending on whether the value of txConfig in push-Config of Table 38, which is an upper layer signaling, is codebook or nonCodebook.

As described above, PUSCH transmission may be dynamically scheduled through DCI format 0_0 or 0_1, and may be semi-statically configured by configured grant. If the UE is instructed to schedule PUSCH transmission through DCI format 0_0, the UE performs beam configuration for PUSCH transmission using the pucch-spatialRelationInfoID corresponding to the UE-specific PUCCH resource corresponding to the minimum ID in the uplink BWP activated in the serving cell, and in this case, the PUSCH transmission is based on a single antenna port. The UE does not expect scheduling for PUSCH transmission through DCI format 0_0 in a BWP in which PUCCH resource including pucch-spatialRelationInfo is not configured. If the UE is not configured with txConfig in push-Config of Table 38, below, the UE does not expect to be scheduled in DCI format 0_1.

mat 0_1 or semi-statically configured by configured grant, the terminal determines a precoder for PUSCH transmission, based on SRS resource indicator (SRI), transmission precoding matrix indicator (TPMI), and transmission rank (number of PUSCH transmission layers).

In this case, SRI may be given through a field SRS resource indicator in DCI or set through upper layer signaling, srs-ResourceIndicator. When transmitting codebook-based PUSCH, the UE may be configured at least one SRS resource and be configured up to two SRS resources. When the UE may be configured with SRI through DCI, the SRS resource indicated by the corresponding SRI means an SRS resource corresponding to the SRI among SRS resources transmitted prior to the PDCCH including the corresponding SRI. In addition, TPMI and transmission rank may be given through field precoding information and number of layers in DCI or configured through precodingAndNumberOfLayers, which is an upper layer signaling. TPMI is used to indicate a precoder applied to PUSCH transmission. If the UE is configured with one SRS resource, TPMI is used to indicate a precoder to be applied in the configured one SRS resource. If the UE is configured with a plurality of SRS resources,

TABLE 38

```
PUSCH-Config ::=                            SEQUENCE {
    dataScramblingIdentityPUSCH                 INTEGER (0..1023)
OPTIONAL,   -- Need S
    txConfig                                    ENUMERATED {codebook,
nonCodebook}                                        OPTIONAL,   -- Need S
    dmrs-UplinkForPUSCH-MappingTypeA            SetupRelease { DMRS-
UplinkConfig }                                      OPTIONAL,   -- Need M
    dmrs-UplinkForPUSCH-MappingTypeB            SetupRelease { DMRS-
UplinkConfig }                                      OPTIONAL,   -- Need M
    pusch-PowerControl                          PUSCH-PowerControl
OPTIONAL,   -- Need M
    frequencyHopping                            ENUMERATED {intraSlot,
interSlot}                                          OPTIONAL,   -- Need S
    frequencyHoppingOffsetLists                 SEQUENCE (SIZE (1..4)) OF
INTEGER (1.. maxNrofPhysicalResourceBlocks-1)
OPTIONAL,   -- Need M
    resourceAllocation                          ENUMERATED
{ resourceAllocationType0, resourceAllocationType1, dynamicSwitch},
    pusch-TimeDomainAllocationList              SetupRelease { PUSCH-
TimeDomainResourceAllocationList }                  OPTIONAL,   -- Need M
    pusch-AggregationFactor                     ENUMERATED { n2, n4, n8 }
OPTIONAL,   -- Need S
    mcs-Table                                   ENUMERATED {qam256,
qam64LowSE}                                         OPTIONAL,   -- Need
S
    mcs-TableTransformPrecoder                  ENUMERATED {qam256,
qam64LowSE}                                         OPTIONAL,   -- Need
S
    transformPrecoder                           ENUMERATED {enabled,
disabled}                                           OPTIONAL,   -- Need S
    codebookSubset                              ENUMERATED
{fullyAndPartialAndNonCoherent, partialAndNonCoherent,nonCoherent}
OPTIONAL, -- Cond codebookBased
    maxRank                                     INTEGER (1..4)
OPTIONAL, -- Cond codebookBased
    rbg-Size                                    ENUMERATED { config2}
OPTIONAL, -- Need S
    uci-OnPUSCH                                 SetupRelease { UCI-
OnPUSCH}                                        OPTIONAL, -- Need M
    tp-pi2BPSK                                  ENUMERATED {enabled}
OPTIONAL, -- Need S
    ...
}
```

Next, codebook-based PUSCH transmission is described. The codebook-based PUSCH transmission may be dynamically scheduled through DCI format 0_0 or 0_1, and may operate quasi-statically by configured grant. If the codebook-based PUSCH is dynamically scheduled by DCI for- TPMI is used to indicate a precoder to be applied in the SRS resource indicated through the SRI.

A precoder to be used for PUSCH transmission is selected from an uplink codebook having the same number of antenna ports as the value of nrofSRS-Ports in SRS-Config, which is upper layer signaling. In codebook-based PUSCH transmission, the UE determines a codebook subset, based on TPMI and codebookSubset in push-Config, which is upper layer signaling. The codebookSubset in push-Config, which is upper layer signaling, may be configured to one of fullyAndPartialAndNonCoherent, partialAndNonCoherent, or nonCoherent based on the UE capability reported by the terminal to the base station. If the terminal reports partialAndNonCoherent as the UE capability, the terminal does not expect the value of codebookSubset, which is upper layer signaling, to be configured to fullyAndPartialAndNonCoherent. In addition, if the terminal reports nonCoherent as the UE capability, the terminal does not expect that the value of codebookSubset, which is upper layer signaling, is configured to fullyAndPartialAndNonCoherent or partialAndNonCoherent. When nrofSRS-Ports in SRS-ResourceSet, which is upper layer signaling, indicate two SRS antenna ports, the UE does not expect the value of codebookSubset, which is upper layer signaling, to be configured to partialAndNonCoherent.

The terminal may be configured with one SRS resource set in which the value of usage in the SRS-ResourceSet, which is upper layer signaling, is configured to codebook, and one SRS resource within the corresponding SRS resource set may be indicated through SRI. If several SRS resources are configured in an SRS resource set in which the usage value in the upper layer signaling SRS-ResourceSet is configured to codebook, the UE expects that the value of nrofSRS-Ports in SRS-Resource, which is upper layer signaling, is configured to the same value for all SRS resources.

The terminal transmits one or a plurality of SRS resources included in the SRS resource set in which the value of usage is set to codebook to the base station according to upper layer signaling, and the base station selects one of the SRS resources transmitted by the terminal and indicates the terminal to perform PUSCH transmission using transmission beam information of the corresponding SRS resource. In codebook-based PUSCH transmission, SRI is used as information for selecting an index of one SRS resource and is included in DCI. Additionally, the base station includes information indicating the TPMI and rank to be used by the terminal for PUSCH transmission in the DCI. The UE performs PUSCH transmission by using the SRS resource indicated by the SRI and applying the rank indicated by the transmission beam of the corresponding SRS resource and the precoder indicated by the TPMI.

Next, non-codebook based PUSCH transmission is described. The non-codebook based PUSCH transmission may be dynamically scheduled through DCI format 0_0 or 0_1, and may operate quasi-statically by configured grant. When at least one SRS resource is configured within the SRS resource set where the value of usage in the upper layer signaling SRS-ResourceSet is set to nonCodebook, the terminal may be scheduled for non-codebook based PUSCH transmission through DCI format 0_1.

For an SRS resource set in which the value of usage in the SRS-ResourceSet, which is upper layer signaling, is configured to nonCodebook, the terminal may be configured with one connected NZP CSI-RS resource (non-zero power CSI-RS). The UE may calculate a precoder for SRS transmission through measurement of NZP CSI-RS resource connected to the SRS resource set. If the difference between the last received symbol of the aperiodic NZP CSI-RS resource associated with the SRS resource set and the first symbol of aperiodic SRS transmission in the UE is less than 42 symbols, the UE does not expect information about the precoder for SRS transmission to be updated.

When the value of resourceType in SRS-ResourceSet, which is upper layer signaling, is set to aperiodic, the connected NZP CSI-RS is indicated by SRS request, which is a field in DCI format 0_1 or 1_1. If the connected NZP CSI-RS resource is an aperiodic NZP CSI-RS resource, when the value of the field SRS request in DCI format 0_1 or 1_1 is not 00, it indicates that there is a connected NZP CSI-RS. The corresponding DCI should not indicate cross carrier or cross BWP scheduling. In addition, if the value of the SRS request indicates the existence of the NZP CSI-RS, the corresponding NZP CSI-RS is located in the slot where the PDCCH including the SRS request field is transmitted. The TCI states configured for the scheduled subcarriers are not configured to QCL-TypeD.

If a periodic or semi-persistent SRS resource set is configured, the connected NZP CSI-RS may be indicated through associatedCSI-RS in the SRS-ResourceSet, which is upper layer signaling. For the non-codebook based transmission, the terminal does not expect spatialRelationInfo, which is upper layer signaling for SRS resource, and associatedCSI-RS in SRS-ResourceSet, which is upper layer signaling, to be configured together.

When a plurality of SRS resources are configured, the UE may determine the precoder and transmission rank to be applied to PUSCH transmission, based on the SRI indicated by the base station. The SRI may be indicated through a field SRS resource indicator in DCI or configured through upper layer signaling, srs-ResourceIndicator. Similar to the above-described codebook-based PUSCH transmission, when a UE receives SRI through DCI, the SRS resource indicated by the corresponding SRI means an SRS resource corresponding to the SRI among SRS resources transmitted prior to the PDCCH including the corresponding SRI. The UE can use one or a plurality of SRS resources for SRS transmission, and the maximum number of SRS resources and the maximum number of SRS resources that can be simultaneously transmitted in the same symbol within one SRS resource set are determined by UE capability reported by the UE to the base station. The SRS resources transmitted simultaneously by the UE occupy the same RB. The UE configures one SRS port for each SRS resource. Only one SRS resource set in which the value of usage in the upper layer signaling SRS-ResourceSet is configured to nonCodebook can be configured, and up to four SRS resources for non-codebook based PUSCH transmission can be configured.

The base station transmits one NZP-CSI-RS associated with the SRS resource set to the terminal, and the terminal calculates a precoder to be used when transmitting one or more SRS resources in the corresponding SRS resource set, based on the measurement result when receiving the NZP-CSI-RS. The terminal applies the calculated precoder when transmitting one or a plurality of SRS resources in the SRS resource set with usage configured to nonCodebook to the base station, and the base station selects one or a plurality of SRS resources from among one or a plurality of received SRS resources. In the non-codebook based PUSCH transmission, SRI indicates an index capable of expressing a combination of one or a plurality of SRS resources, and the SRI is included in DCI. The number of SRS resources indicated by the SRI transmitted by the base station may be the number of transmission layers of the PUSCH, and the UE transmits the PUSCH by applying a precoder applied to transmission of the SRS resource to each layer.

PUSCH: Preparation Procedure Time

Next, the PUSCH preparation procedure time is described. When the base station schedules the terminal to transmit the PUSCH using DCI format 0_0, 0_1, or 0_2, the UE may require time for preparing the PUSCH to transmit the PUSCH by applying the transmission method (transmission precoding method of SRS resource, number of transmission layers, spatial domain transmission filter) indicated through DCI. In NR, the PUSCH preparation process time was defined in consideration of this. The PUSCH preparation process time of the UE may follow Equation (4), below.

$$T_{proc,2} = \max((N_2 + d_{2,1} + d_2)(2048 + 144)\kappa 2^{-\mu} T_c + T_{ext} + T_{switch}, d_{2,2}) \quad (4)$$

In $T_{proc,2}$ described above based on Equation (4), each variable may have the following meaning.

$N_2$: The number of symbols determined according to UE processing capability 1 or 2 and numerology s according to the capabilities of the UE. When reported as UE processing capability 1 according to the capability report of the UE, it may have the value of Table 39, below, and when reported as UE processing capability 2 and being able to use UE processing capability 2 is configured through upper layer signaling, it may have a value of Table 40, below.

TABLE 39

| μ | PUSCH preparation time $N_2$ [symbols] |
|---|---|
| 0 | 10 |
| 1 | 12 |
| 2 | 23 |
| 3 | 36 |

TABLE 40

| μ | PUSCH preparation time $N_2$ [symbols] |
|---|---|
| 0 | 5 |
| 1 | 5.5 |
| 2 | 11 for frequency range 1 |

$d_{2,1}$: The number of symbols determined to be 0 when all REs of the first OFDM symbol of PUSCH transmission are configured to consist of only DM-RS, and 1 otherwise.

κ: 64

μ: Depends on whichever value $\mu_{DL}$ or $\mu_{UL}$, $T_{proc,2}$ is greater. $\mu_{DL}$ denotes the numerology of downlink through which the PDCCH including the DCI scheduling the PUSCH is transmitted, and $\mu_{UL}$ denotes the numerology of uplink through which the PUSCH is transmitted.

$T_c$: has $1/(\Delta f_{max} \cdot N_f)$, $\Delta f_{max} = 48 \cdot 10^3$ Hz, $N_f = 4096$ $d_{2,2}$: If the DCI scheduling the PUSCH indicates BWP switching, it follows the BWP switching time, otherwise it has 0.

$d_2$: When PUCCH and OFDM symbols of a PUSCH with a high priority index and a PUCCH with a low priority index overlap in time, the $d_2$ value of the PUSCH with a high priority index is used. Otherwise, $d_2$ is 0.

$T_{ext}$: If the terminal uses the shared spectrum channel access method, the terminal may calculate $T_{ext}$ and apply it to the PUSCH preparation process time. Otherwise, $T_{ext}$ is assumed to be 0.

$T_{switch}$: When an uplink switching interval is triggered, $T_{switch}$ is assumed to be the switching interval time. Otherwise, Twitch is assumed to be 0.

Considering the time axis resource mapping information of the PUSCH scheduled through DCI and the influence of timing advance between uplink and downlink, the base station and the terminal determine that the PUSCH preparation process time is insufficient when the first symbol of the PUSCH starts before the first uplink symbol of the CP starting after $T_{proc,2}$ from the last symbol of the PDCCH including the DCI for scheduling the PUSCH. If not, the base station and the terminal determine that the PUSCH preparation process time is sufficient. The UE may transmit the PUSCH only when the PUSCH preparation time is sufficient, and may ignore the DCI for scheduling the PUSCH when the PUSCH preparation time is not sufficient.

PUSCH: Related to Repeated Transmission

Hereinafter, repetitive transmission of an uplink data channel in a 5G system is described. The 5G system supports two types, PUSCH repeated transmission type A and PUSCH repeated transmission type B, as repetitive transmission methods of an uplink data channel. The UE may be configured with either PUSCH repetitive transmission type A or B through upper layer signaling.

PUSCH Repetitive Transmission Type A

As described above, the symbol length of the uplink data channel and the location of the start symbol are determined by the time domain resource allocation method within one slot, and the base station may notify the terminal of the number of repeated transmissions through upper layer signaling (e.g., RRC signaling) or L1 signaling (e.g., DCI).

The terminal may repeatedly transmit an uplink data channel having the same start symbol as the length of the uplink data channel configured based on the number of repeated transmissions received from the base station in consecutive slots. When at least one symbol of a slot configured by the base station as downlink to the terminal or a symbol of an uplink data channel configured by the terminal is configured to downlink, the UE omits transmission of the uplink data channel, but counts the number of repetitions of transmission of the uplink data channel.

PUSCH Repetitive Transmission Type B

As described above, the start symbol and length of the uplink data channel are determined by the time domain resource allocation method within one slot, and the base station may notify the terminal of the number of repetitions of repeated transmission through upper layer signaling (e.g., RRC signaling) or L1 signaling (e.g., DCI).

The nominal repetition of the uplink data channel is determined as set forth below, based on the start symbol and length of the uplink data channel that is configured first. The slot in which the $n^{th}$ nominal repetition begins is given by $$K_s + \left\lfloor \frac{S + n \cdot L}{N_{symb}^{slot}} \right\rfloor$$

and the symbol starting in that slot is given by $\mod(S+n \cdot L, N_{symb}^{slot})$. The slot in which the nth nominal repetition ends is given by $$K_s + \left\lfloor \frac{S + (n+1) \cdot L - 1}{N_{symb}^{slot}} \right\rfloor$$

and the symbol ending in that slot is given by $\mathrm{mod}(S+(n+1)\cdot L-1, N_{sym}^{slot})$. Here, $n=0, \ldots,$ numberofrepetitions−1 and S is the start symbol of the configured uplink data channel and L represents the symbol length of the configured uplink data channel. $K_s$ indicates a slot in which PUSCH transmission starts, and indicates the number of $N_{sym}^{slot}$ symbols per slot.

The UE determines an invalid symbol for PUSCH repetitive transmission type B. A symbol configured for downlink by tdd-UL-DL-ConfigurationCommon or tdd-UL-DL-ConfigurationDedicated is determined as an invalid symbol for PUSCH repeated transmission type B. Additionally, invalid symbols may be configured in upper-layer parameters (e.g., InvalidSymbolPattern). An upper layer parameter (e.g., InvalidSymbolPattern) provides a symbol level bitmap spanning one slot or two slots so that invalid symbols can be configured. 1 in the bitmap represents an invalid symbol. Additionally, the period and pattern of the bitmap may be configured through an upper layer parameter (e.g., periodicityAndPattern). If an upper layer parameter (e.g., InvalidSymbolPattern) is configured and the InvalidSymbolPatternIndicator-ForDCIFormat0_1 or InvalidSymbolPatternIndicator-ForDCIFormat0_2 parameter indicates 1, the terminal applies the invalid symbol pattern, and if the parameter indicates 0, the terminal does not apply the invalid symbol pattern. If the upper layer parameter (e.g., InvalidSymbolPattern) is configured and the InvalidSymbolPatternIndicator-ForDCIFormat0_1 or InvalidSymbolPatternIndicator-ForDCIFormat0_2 parameter is not configured, the terminal applies the invalid symbol pattern.

After the invalid symbol is determined, for each nominal repetition, the terminal may consider symbols other than the invalid symbol as valid symbols. If more than one valid symbol is included in each nominal repetition, the nominal repetition may include one or more actual repetitions. Here, each actual repetition includes a contiguous set of valid symbols that can be used for PUSCH repeated transmission type B in one slot.

Figure 17:
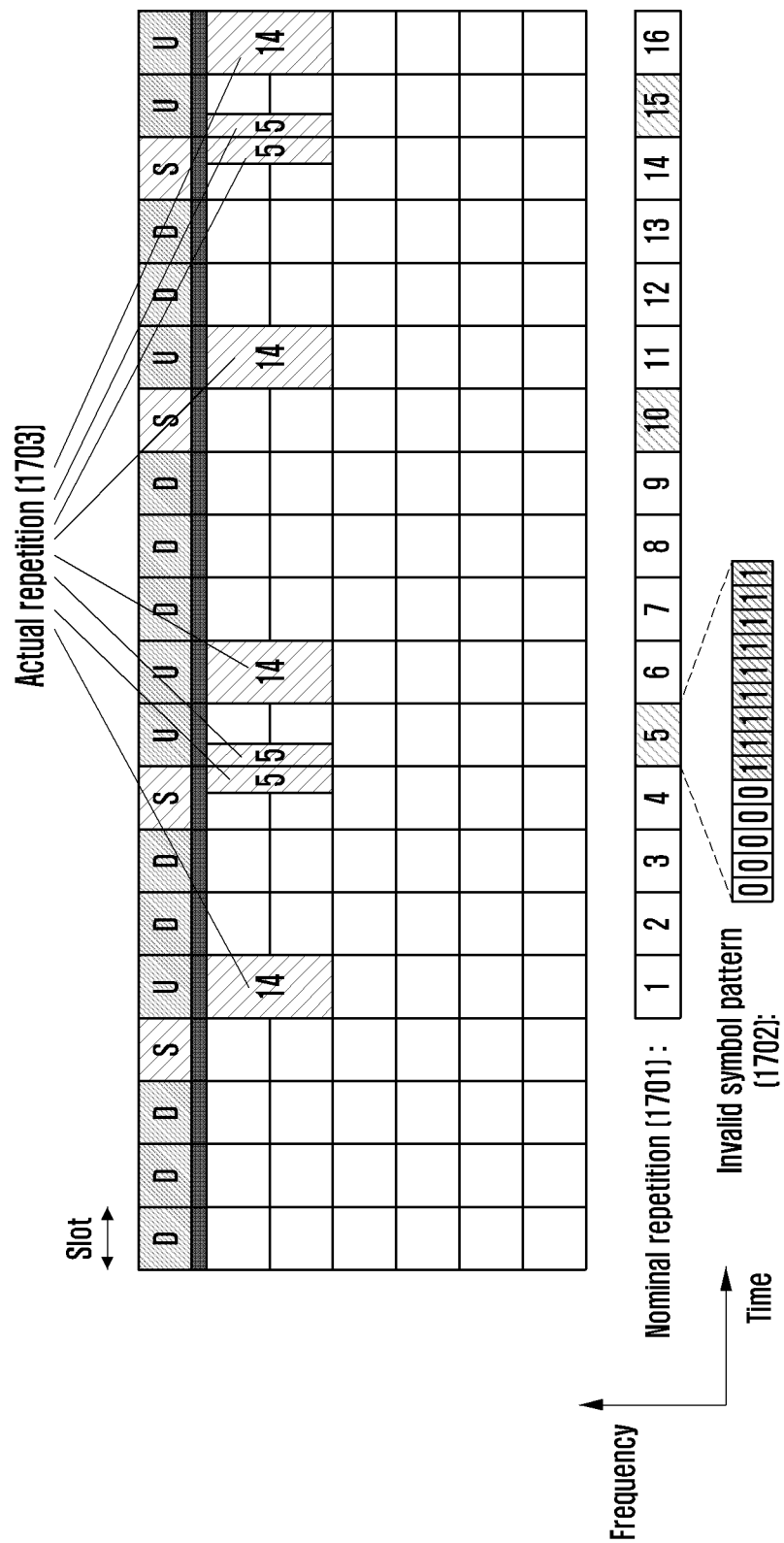
FIG. 17 illustrates an example of PUSCH repeated transmission type B in a wireless communication system according to an embodiment.

FIG. 17 illustrates an example of PUSCH repeated transmission type B in a wireless communication system according to an embodiment. A terminal may be configured with 0 as start symbol S of the uplink data channel, configured with 14 as the length L of the uplink data channel, and configured with 16 as the number of repeated transmissions. In this case, nominal repetition is indicated in 16 consecutive slots. Then, the terminal may determine a symbol set as a downlink symbol in each nominal repetition 1701 as an invalid symbol. In addition, the terminal determines symbols configured to 1 in invalid symbol pattern 1702 as invalid symbols. In each nominal repetition, when valid symbols, not invalid symbols, consist of one or more consecutive symbols in one slot, they are configured as actual repetitions 1703 and transmitted.

In addition, for repeated PUSCH transmission, NR Release 16 may define the following additional methods for UL grant-based PUSCH transmission and configured grant-based PUSCH transmission across slot boundaries.

Method 1 (mini-slot level repetition): Through one UL grant, two or more repeated PUSCH transmissions are scheduled within one slot or across the boundary of consecutive slots. In addition, for method 1, time domain resource allocation information in DCI indicates resources of the first repeated transmission. In addition, time domain resource information of the remaining repeated transmissions may be determined according to the time domain resource information of the first repeated transmission and the uplink or downlink direction determined for each symbol of each slot. Each repeated transmission occupies consecutive symbols.

Method 2 (multi-segment transmission): Two or more repeated PUSCH transmissions are scheduled in consecutive slots through one UL grant. In this case, one transmission is designated for each slot, and different start points or repetition lengths may be different for each transmission. In addition, in method 2, time domain resource allocation information in the DCI indicates the start point and repetition length of all repeated transmissions. In addition, when repeated transmission is performed within a single slot through method 2, if there are several bundles of consecutive uplink symbols in the corresponding slot, each repeated transmission is performed for each bundle of uplink symbols. If a bundle of consecutive uplink symbols exists uniquely in the corresponding slot, one repetition of PUSCH transmission is performed according to the method of NR Release 15.

Method 3: Two or more repeated PUSCH transmissions are scheduled in consecutive slots through two or more UL grants. One transmission is designated for each slot, and the $n^{th}$ UL grant can be received before the end of the PUSCH transmission scheduled for the $(n-1)^{th}$ UL grant.

Method 4: Through one UL grant or one configured grant, one or several PUSCH repeated transmissions within a single slot, or two or more PUSCH repeated transmissions across the boundary of consecutive slots can be supported. The number of repetitions indicated by the base station to the terminal is only a nominal value, and the number of repeated PUSCH transmissions actually performed by the terminal may be greater than the nominal number of repetitions. Time domain resource allocation information within the DCI or within the configured grant means the resource of the first repeated transmission indicated by the base station. Time domain resource information of the remaining repeated transmissions may be determined by referring to resource information of at least the first repeated transmission and uplink or downlink directions of symbols. If time domain resource information of repeated transmission indicated by the base station spans a slot boundary or includes an uplink/downlink switching point, the repeated transmission may be divided into a plurality of repeated transmissions. In this case, one repetitive transmission may be included for each uplink period in one slot.

PUSCH: Frequency Hopping Procedure

Regarding frequency hopping of an uplink data channel (PUSCH) in a 5G system, in the 5G system, as a frequency hopping method of an uplink data channel, two methods are supported for each PUSCH repeated transmission type. First, PUSCH repetition transmission type A supports intra-slot frequency hopping and inter-slot frequency hopping, and PUSCH repetition transmission type B supports inter-repetition frequency hopping and inter-slot frequency hopping.

The intra-slot frequency hopping method supported by PUSCH repetitive transmission type A is a method in which a UE changes and transmits allocated resources in a frequency domain by a configured frequency offset in two hops within one slot. In intra-slot frequency hopping, the starting RB of each hop can be expressed through Equation (5), below.

$$RB_{start} = \begin{cases} RB_{start} & i=0 \\ (RB_{start} + RB_{offset}) \bmod N_{BWP}^{size} & i=1 \end{cases} \quad (5)$$

In Equation (5), i=0 and i=1 represent the first hop and the second hop, respectively, and $RB_{start}$ represents the starting RB in the UL BWP and is calculated from the frequency resource allocation method. $RB_{offset}$ indicates a frequency offset between two hops through an upper layer parameter. The number of symbols of the first hop can be represented by $\lfloor N_{symb}^{PUSCH,s}/2 \rfloor$, and the number of symbols of the second hop can be represented by $N_{symb}^{PUSCH,s} - \lfloor N_{symb}^{PUSCH,s}/2 \rfloor$. $N_{symb}^{PUSCH,s}$ is the length of PUSCH transmission within one slot, represented by the number of OFDM symbols.

Next, the inter-slot frequency hopping method supported by PUSCH repetitive transmission types A and B is a method in which the UE changes and transmits allocated resources in the frequency domain by a set frequency offset for each slot. In inter-slot frequency hopping, a start RB during $n_s^\mu$ slots can be expressed through Equation (6), below.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad (6)$$

In Equation (6), $n_s^\mu$ is a current slot number in multi-slot PUSCH transmission, $RB_{start}$ is a starting RB in UL BWP, and is calculated from a frequency resource allocation method. $RB_{offset}$ represents a frequency offset between two hops through an upper layer parameter.

Next, the inter-repetition frequency hopping method supported by PUSCH repeated transmission type B moves and transmits resources allocated in the frequency domain for one or a plurality of actual repetitions within each nominal repetition by a set frequency offset.

$RB_{start}(n)$, which is an index of a starting RB in the frequency domain for one or a plurality of actual repetitions within the $n^{th}$ nominal repetition, may follow Equation (7), below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad (7)$$

In Equation (7), n is an index of nominal repetition, $RB_{offset}$ and represents an RB offset between two hops through an upper layer parameter.

Regarding Device Capability Reporting

In LTE and NR, the terminal may perform a procedure for reporting the capability supported by the terminal to the corresponding base station while connected to the serving base station, referred to as a UE capability report in the following description.

The base station may transmit a UE capability inquiry message requesting a capability report to a UE in a connected state. The message may include a UE capability request for each radio access technology (RAT) type of the base station. The request for each RAT type may include supported frequency band combination information. In addition, in the case of the terminal capability inquiry message, UE capabilities for each RAT type may be requested through one RRC message container transmitted by the base station, or the base station may include a terminal capability inquiry message including a terminal capability request for each RAT type multiple times and transmit the message to the terminal. That is, the UE capability inquiry may be repeated multiple times within one message, and the UE may configure and report a UE capability information message corresponding to the UE capability information message multiple times. In the next-generation mobile communication system, a UE capability request for multi-RAT dual connectivity (MR-DC) including NR, LTE, and E-UTRA-NR dual connectivity (EN-DC) may be requested. In addition, although the terminal capability inquiry message is generally initially transmitted after the terminal connects to the base station, the base station may request the terminal capability inquiry message under any condition when necessary.

In the above, the terminal receiving the UE capability report request from the base station configures the terminal capability according to the RAT type and band information requested from the base station. A method for configuring UE capabilities in the NR system is summarized below.

1. If the terminal receives a list of LTE and/or NR bands from the base station as a UE capability request, the terminal configures a band combination (BC) for EN-DC and NR stand-alone (SA). That is, BC candidate lists for EN-DC and NR SA are configured based on the bands requested to the base station through FreqBandList. In addition, bands have priorities in the order described in FreqBandList.

2. If the base station sets the eutra-nr-only flag or the eutra flag to request UE capability reporting, the terminal completely removes those for NR SA BCs from the configured BC candidate list. This operation may occur only when the LTE base station (eNB) requests the eutra capability.

3. Thereafter, the terminal removes fallback BCs from the candidate list of BCs configured in the above step. Here, the fallback BC means a BC obtained by removing a band corresponding to at least one SCell from any BC, and can be omitted because the BC before removing the band corresponding to at least one SCell can already cover the fallback BC. This step also applies to MR-DC, that is, LTE bands as well. The remaining BCs after this step are the final candidate BC list.

4. The terminal selects BCs to be reported by selecting BCs suitable for the requested RAT type from the final candidate BC list. In this step, the terminal configures the supportedBandCombinationList in a predetermined order. That is, the terminal configures the BC and UE capabilities to be reported according to the order of the preset rat-Type. (nr→eutra-nr→eutra). In addition, featureSetCombination for the configured supportedBandCombinationList is configured, and a list of candidate feature set combinations is constructed from the list of candidate BCs from which the list of fallback BCs (including capabilities of the same or lower level) has been removed. The above candidate feature set combination includes both feature set combinations for NR and EUTRA-NR BC, and can be obtained from the feature set combination of the UE-NR-Capabilities and UE-MRDC-Capabilities containers.

5. In addition, if the requested rat Type is eutra-nr and has an effect, featureSetCombinations is included in both containers of UE-MRDC-Capabilities and UE-NR-Capabilities. However, the feature set of NR includes only UE-NR-Capabilities.

After the terminal capabilities are configured, the terminal transmits a terminal capability information message including the terminal capabilities to the base station. The base station then performs appropriate scheduling and transmission/reception management for the corresponding terminal, based on the terminal capabilities received from the terminal.

CA/DC Related

Figure 18:
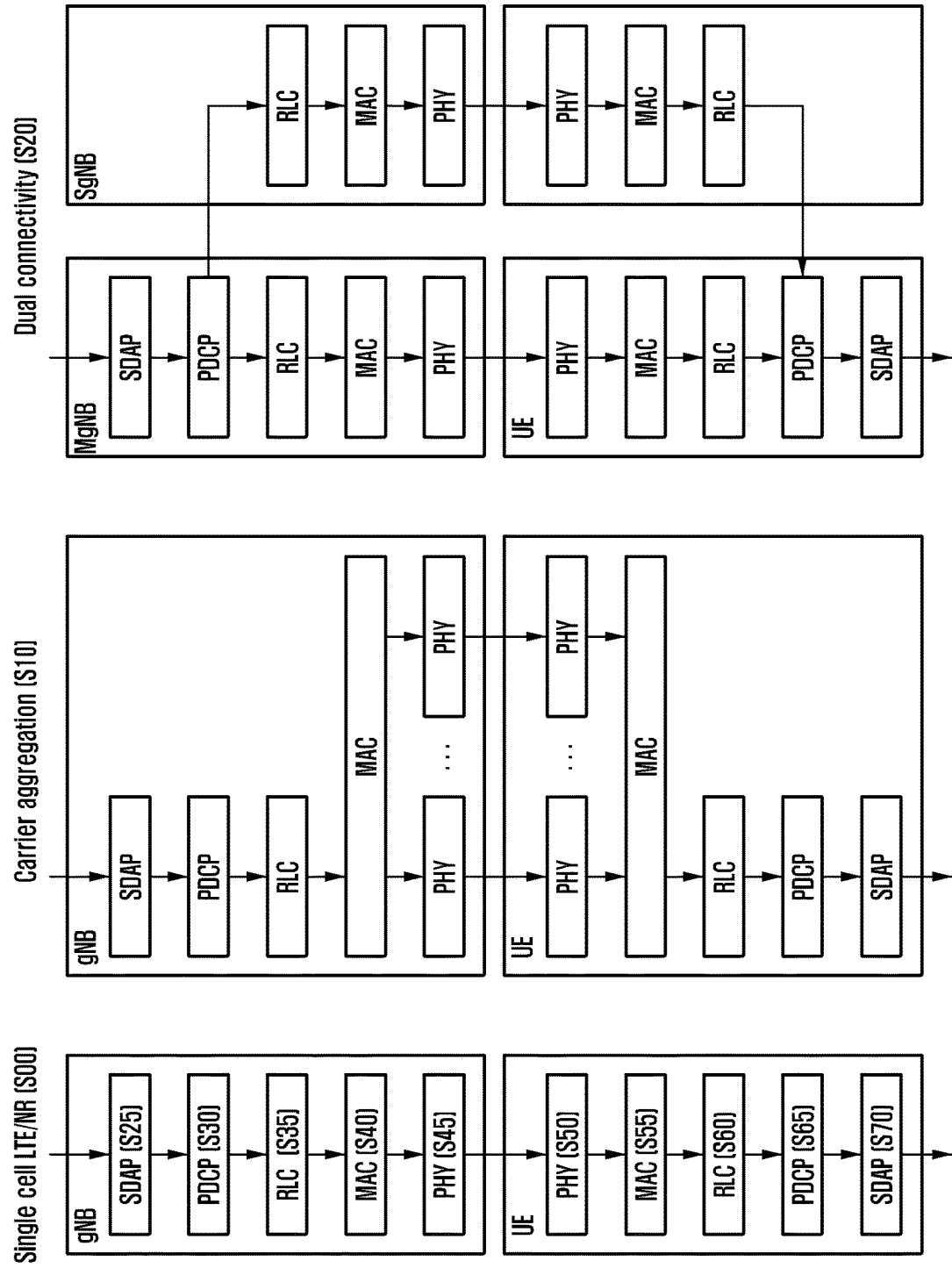
FIG. 18 illustrates a wireless protocol structure of a base station and a terminal in a single cell, carrier aggregation, and dual connectivity situation in a wireless communication system according to an embodiment.

FIG. 18 illustrates a wireless protocol structure of a base station and a terminal in a single cell, carrier aggregation, and dual connectivity situation in a wireless communication system according to an embodiment.

Referring to FIG. 18, in a terminal and an NR base station, the radio protocols of the next-generation mobile communication system is composed of NR service data adaptation protocol (SDAP) S25 and S70, NR packet data convergence protocol (PDCP) S30 and S65, NR radio link control (RLC) S35 and S60, and NR MAC S40 and S55.

The main functions of the NR SDAP S25 and S70 may include some of the following functions:
Transfer of user plane data
Mapping between a QoS flow and a DRB for both DL and UL
Marking QoS flow ID in both DL and UL packets
reflective QoS flow to DRB mapping for the UL SDAP PDUs Regarding the SDAP layer device, the terminal may receive configuration for each PDCP layer device, each bearer, or each logical channel in an RRC message whether to use a header of the SDAP layer device or whether to use a function of the SDAP layer device, and when the SDAP header is configured, the terminal may be instructed to update or reconfigure mapping information for quality of service (QoS) flows and data bearers of uplink and downlink to NAS QoS reflection configuration 1-bit indicator (NAS reflective QoS) and AS QoS reflection configuration 1-bit indicator (AS reflective QoS) in the SDAP header. The SDAP header may include QoS flow ID information indicating QoS. The QoS information may be used as data processing priority and scheduling information to support smooth service.

The main functions of the NR PDCP S30 and S65 may include some of the following functions:
Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above, the reordering function of the NR PDCP device refers to a function of rearranging PDCP PDUs received from a lower layer in order based on a PDCP sequence number (SN), and may include a function of delivering data to an upper layer in the rearranged order. Alternatively, the reordering function of the NR PDCP device may include a function of immediately forwarding without considering the order, may include a function of reordering and recording lost PDCP PDUs, may include a function of reporting the status of lost PDCP PDUs to the transmitting side, and may include a function of requesting retransmission of lost PDCP PDUs.

The main functions of the NR RLC S35 and S60 may include some of the following functions:
Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above, in-sequence delivery of the NR RLC device means a function of sequentially delivering RLC SDUs received from a lower layer to an upper layer. In-sequence delivery of the NR RLC device may include a function of reassembling and delivering an original RLC SDU when it is divided into several RLC SDUs and received, may include a function of rearranging received RLC PDUs based on an RLC SN or a PDCP SN, may include a function of reordering and recording lost RLC PDUs, may include a function of reporting the status of lost RLC PDUs to the transmitter, and may include a function of requesting retransmission of lost RLC PDUs. In-sequence delivery of the NR RLC device may include a function of sequentially delivering only RLC SDUs prior to the lost RLC SDU to the upper layer when there is a lost RLC SDU, or may include a function of sequentially delivering all RLC SDUs received before the timer starts if a predetermined timer expires even if there is a lost RLC SDU to the upper layer. Alternatively, the in-sequence delivery function of the NR RLC device may include a function of sequentially delivering all RLC SDUs received up to the present time to an upper layer if a predetermined timer expires even if there is a lost RLC SDU. In addition, RLC PDUs may be processed in the order in which they are received (regardless of the order of serial numbers and SNs, in the order of arrival) and delivered to the PDCP device regardless of order (out-of-sequence delivery), and in the case of segments, segments stored in a buffer or to be received later may be received, reconstructed into one complete RLC PDU, processed, and transmitted to the PDCP device. The NR RLC layer may not include a concatenation function, and the function may be performed in the NR MAC layer or replaced with a multiplexing function of the NR MAC layer.

In the above, the out-of-sequence delivery function of the NR RLC device refers to a function of immediately delivering RLC SDUs received from a lower layer to an upper layer regardless of order, may include a function of reassembling and forwarding, when originally one RLC SDU is divided into several RLC SDUs and received, and may include a function of storing RLC SNs or PDCP SNs of received RLC PDUs and arranging the order to record lost RLC PDUs.

The NR MACs S40 and S55 may be connected to several NR RLC layer devices configured in one terminal, and the main functions of the NR MAC may include some of the following functions:
Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers S45 and S50 may perform operations of channel coding and modulating upper layer data, making OFDM symbols and transmitting them through a wireless channel, or demodulating OFDM symbols received through a wireless channel, channel decoding, and transmitting them to an upper layer.

The detailed structure of the radio protocol structure may be variously changed according to a carrier (or cell) operation method. For example, when a base station transmits data to a terminal, based on a single carrier (or cell), the base station and the terminal use a protocol structure having a single structure for each layer, such as step S00. On the other hand, when the base station transmits data to the terminal, based on carrier aggregation (CA) using multiple carriers in a single TRP, the base station and the terminal have a single structure up to RLC as in step S10, but use a protocol structure that multiplexes the PHY layer through the MAC layer. As another example, when a base station transmits data to a terminal, based on dual connectivity (DC) using multiple carriers in multiple TRPs, the base station and the terminal have a single structure up to RLC as in step S20, but use a protocol structure that multiplexes the PHY layer through the MAC layer.

Referring to the descriptions related to the PDCCH and beam configuration described above, it is difficult to achieve the required reliability in scenarios requiring high reliability such as URLLC because repetitive PDCCH transmission is not currently supported in Rel-15 and Rel-16 NRs. The disclosure provides a method for repeatedly transmitting a PDCCH through multiple TRPs to improve PDCCH reception reliability of a terminal. Specific methods are specifically described in the following examples.

The disclosure is applicable to frequency division duplex (FDD) and time division duplex (TDD) systems. Herein, upper signaling (or upper layer signaling) is a method of transmitting a signal from a base station to a terminal using a downlink data channel of a physical layer, or from a terminal to a base station using an uplink data channel of the physical layer, and may be referred to as RRC signaling, PDCP signaling, or a MAC-CE.

Herein, in determining whether cooperative communication is applied, a terminal may use various methods such as having a specific format of PDCCH(s) allocated to a PDSCH to which cooperative communication is applied, including a specific indicator indicating whether the PDCCH(s) allocated to the PDSCH to which cooperative communication is applied, scrambling the PDCCH(s) allocated to the PDSCH to which cooperative communication is applied, with a specific RNTI, or assuming that cooperative communication is applied in a specific section indicated by an upper layer. For convenience of explanation, the terminal receiving the PDSCH to which cooperative communication is applied based on conditions similar to the above will be referred to as an NC-JT case.

Herein, determining the priority between A and B may be variously referred to as selecting an upper priority according to a predetermined priority rule and performing a corresponding operation, or omitting or dropping an operation with a lower priority.

The above examples are described through a plurality of embodiments, but they are not independent, and one or more embodiments may be applied simultaneously or in combination.

Related to NC-JT

According to an embodiment, NC-JT may be used for a UE to receive PDSCH from multiple TRPs.

The 5G wireless communication system can support not only services requiring high transmission rates, but also services with very short transmission delays and services requiring high connection density, unlike conventional ones. In a wireless communication network including multiple cells, TRPs, or beams, coordinated transmission between each cell, TRP and/or beams can satisfy various service requirements by increasing the strength of the signal received by the terminal or efficiently performing interference control between each cell, TRP and/or beams.

The JT is a transmission technique for the above-described cooperative communication, and is used for increasing the strength or throughput of a signal received by a terminal by transmitting a signal to one terminal through a plurality of different cells, TRPs, and/or beams. In this case, the characteristics of each cell, TRP and/or the channel between the beam and the terminal may be greatly different, and in particular, in the case of NC-JT supporting non-coherent precoding between each cell, TRP and/or beam, individual precoding, MCS, resource allocation, TCI indication, etc. may be required according to channel characteristics for each cell, TRP and/or link between beams and terminals.

The above-described NC-JT transmission may be applied to at least one of a PDSCH, a PDCCH, a PUSCH, and a PUCCH. During PDSCH transmission, transmission information such as precoding, MCS, resource allocation, and TCI is indicated as DL DCI, and for NC-JT transmission, the transmission information should be independently indicated for each cell, TRP and/or beam. This becomes a major factor in increasing a payload required for DL DCI transmission, which may adversely affect reception performance of a PDCCH transmitting DCI. Therefore, it is important to carefully design the tradeoff between DCI information amount and control information reception performance for JT support of PDSCH.

Figure 19:
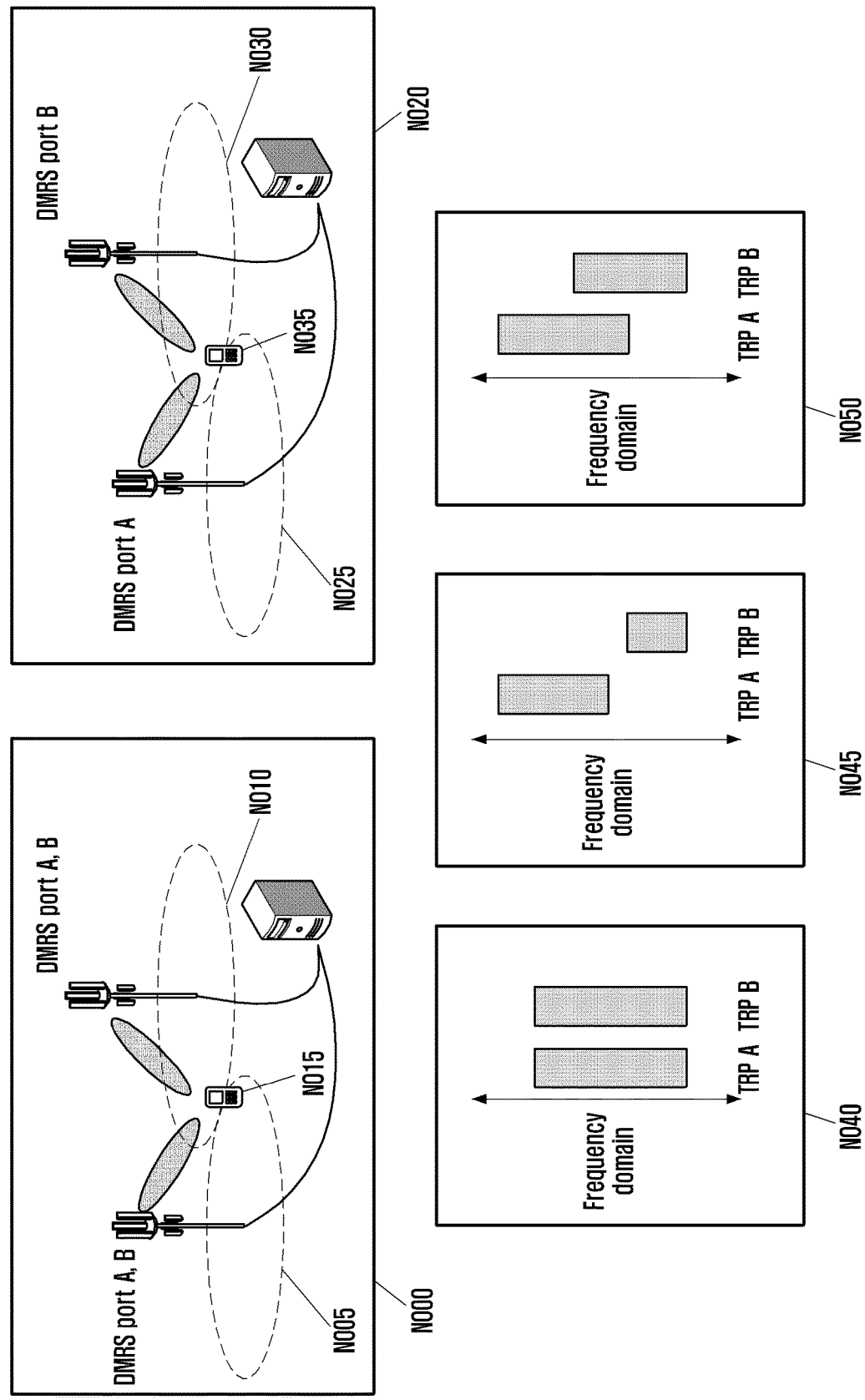
FIG. 19 illustrates an example of antenna port configuration and resource allocation for cooperative communication in a wireless communication system according to an embodiment.

FIG. 19 illustrates an example of antenna port configuration and resource allocation for cooperative communication in a wireless communication system according to an embodiment.

Referring to FIG. 19, examples for PDSCH transmission are described for each technique of JT, and examples for allocating radio resources for each TRP are shown.

Referring to FIG. 19, an example N000 for coherent JT (C-JT) supporting coherent precoding between each cell, TRP and/or beam is shown.

In the case of C-JT, TRP A N005 and TRP B N010 transmit single data (PDSCH) to UE N015, and joint precoding may be performed in multiple TRPs. This means that DMRS is transmitted through the same DMRS ports so that the TRP A N005 and TRP B N010 transmit the same PDSCH. For example, each of the TRP A N005 and TRP B N010 may transmit DMRS to the UE through DMRS port A and DMRS B. In this case, the terminal may receive one DCI information for receiving one PDSCH demodulated based on DMRS transmitted through the DMRS port A and DMRS B. Also, each of the TRP A N025 and TRP B N030 may transmit DMRS to the UE through DMRS port A and DMRS B, respectively.

FIG. 19 shows an example of NC-JT supporting non-coherent precoding between each cell, TRP and/or beam for PDSCH transmission N020.

In the case of NC-JT, a PDSCH is transmitted to the terminal N035 for each cell, TRP and/or beam, and individual precoding may be applied to each PDSCH. Each cell, TRP and/or beam may transmit different PDSCHs or different PDSCH layers to the UE to improve throughput compared to transmission of a single cell, TRP and/or beam. In addition, each cell, TRP or/and beam repeatedly transmits the same PDSCH to the UE, thereby improving reliability compared to single cell, TRP and/or beam transmission. Hereinafter, for convenience of description, a cell, a TRP, and/or a beam are collectively referred to as TRP.

Various radio resource allocations can be considered such as a case in which both frequency and time resources used by multiple TRPs for PDSCH transmission are the same N040, a case in which the frequency and time resources used by multiple TRPs do not overlap at all N045, and a case in which some of the frequency and time resources used by multiple TRPs overlap N050.

To support NC-JT, DCIs of various forms, structures, and relationships may be considered in order to simultaneously allocate a plurality of PDSCHs to one UE.

Figure 20:
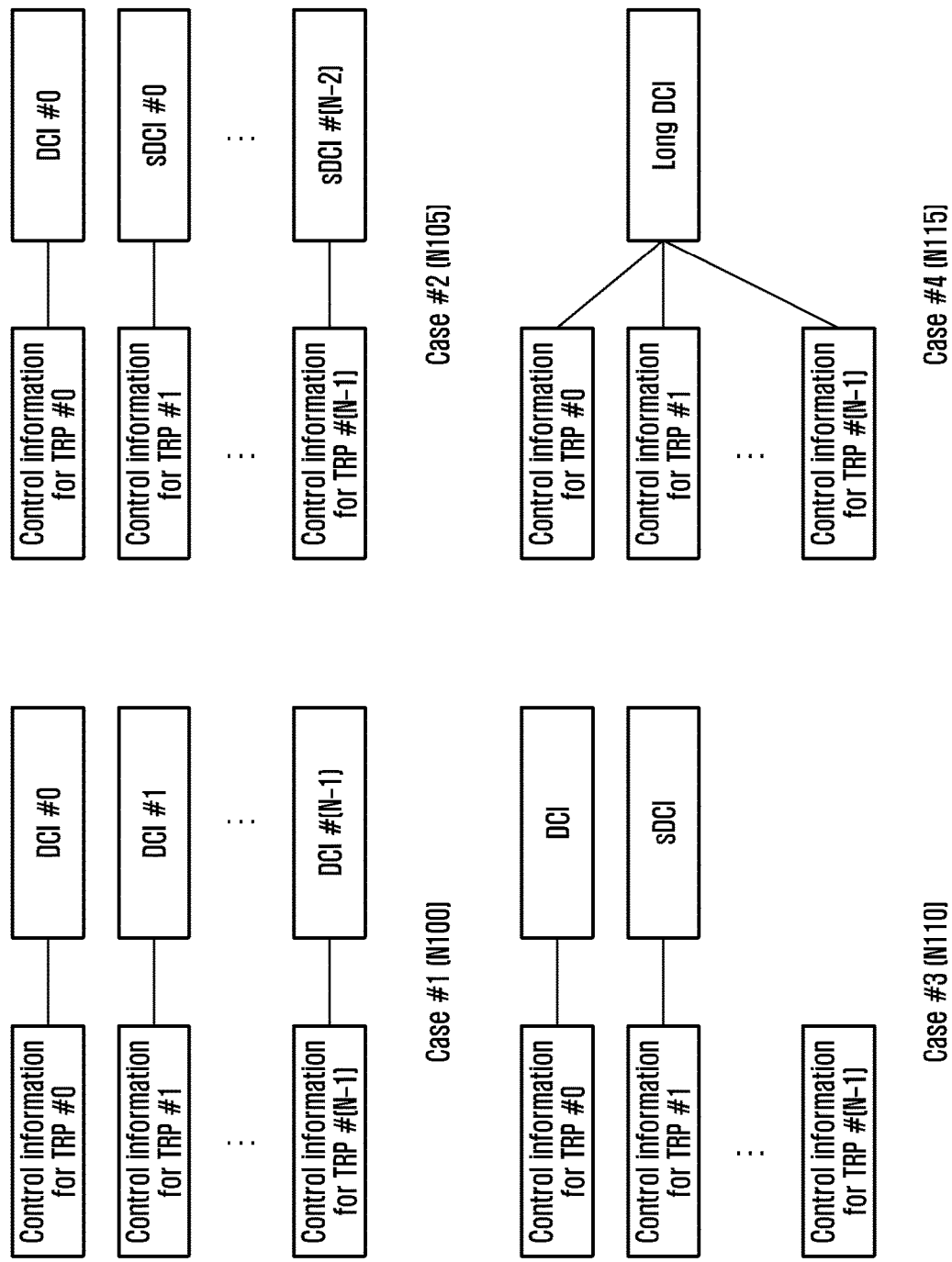
FIG. 20 illustrates an example of a configuration of downlink control information (DCI) for non-coherent joint transmission (NC-JT) in which each transmission and reception point (TRP) transmits a different PDSCH or a different PDSCH layer to a UE in a wireless communication system according to an embodiment.

FIG. 20 illustrates an example of a configuration of DCI for NC-JT in which each TRP transmits a different PDSCH or a different PDSCH layer to a UE in a wireless communication system according to an embodiment.

NC-JT in which each TRP transmits a different PDSCH or a different PDSCH layer to a UE in a wireless communication system according to an embodiment; Referring to FIG. 20, case #1 N100 is an example in which control information on PDSCHs transmitted in (N–1) additional TRPs is transmitted independently of control information about PDSCHs transmitted in a serving TRP when different (N–1) PDSCHs are transmitted from (N–1) additional TRPs (TRP #1 to TRP #(N–1)) in addition to the serving TRP (TRP #0) used when transmitting a single PDSCH. That is, the terminal can obtain control information on PDSCHs transmitted from different TRPs (TRP #0 to TRP #(N–1)) through independent DCIs (DCI #0 to DCI #(N–1)). Formats between the independent DCIs may be the same or different, and payloads between the DCIs may also be the same or different. In case #1 described above, each PDSCH control or allocation degree of freedom can be completely guaranteed, but when each DCI is transmitted in different TRPs, a coverage difference for each DCI may occur, resulting in deterioration of reception performance.

Case #2 N105 shows an example in which DCI for the PDSCH of (N–1) additional TRPs is transmitted, and each of these DCIs is dependent on the control information for the PDSCH transmitted from the serving TRP in a situation in which different (N–1) PDSCHs are transmitted from (N–1) additional TRPs (TRP #1 to TRP #(N–1)) in addition to the serving TRP (TRP #0) used when transmitting a single PDSCH.

For example, DCI #0, which is control information for PDSCH transmitted from serving TRP (TRP #0), includes all IEs of DCI format 1_0, DCI format 1_1, and DCI format 1_2, but the shortened DCI (hereinafter referred to as sDCI) (sDCI #0 to sDCI #(N–2)), which is control information for PDSCHs transmitted from cooperative TRPs (TRP #1 to TRP #(N–1)) may include only some of IEs of DCI format 1_0, DCI format 1_1, and DCI format 1_2. Therefore, in the case of sDCI that transmits control information for PDSCHs transmitted from cooperative TRPs, since the payload is smaller than normal DCI (nDCI) that transmits PDSCH-related control information transmitted from serving TRP, it is possible to include reserved bits compared to nDCI.

In case #2 described above, each PDSCH control or allocation degree of freedom may be limited according to the content of IEs included in sDCI, but the probability of occurrence of a difference in coverage for each DCI may be reduced because reception performance of sDCI is superior to that of nDCI.

Case #3 N110 shows an example in which one control information for the PDSCH of (N–1) additional TRPs is transmitted, and this DCI is dependent on the control information for the PDSCH transmitted from the serving TRP, in a situation in which different (N–1) PDSCHs are transmitted from (N–1) additional TRPs (TRP #1 to TRP #(N–1)) other than the serving TRP (TRP #0) used during single PDSCH transmission.

For example, DCI #0, which is control information for PDSCH transmitted from serving TRP (TRP #0), may include all IEs of DCI format 1_0, DCI format 1_1, and DCI format 1_2, and the control information for the PDSCHs transmitted from the cooperative TRPs (TRP #1 to TRP #(N–1)) may be transmitted by collecting only some of the IEs of DCI format 1_0, DCI format 1_1, and DCI format 1_2 into one secondary DCI (sDCI). For example, the sDCI may include at least one of HARQ-related information such as frequency domain resource assignment, time domain resource assignment, and MCS of cooperative TRPs. In addition, information not included in sDCI, such as a BWP indicator or a carrier indicator, may follow the DCI (DCI #0, normal DCI, nDCI) of the serving TRP.

In case #3 N110, each PDSCH control or allocation degree of freedom may be limited according to the content of IEs included in sDCI, but reception performance of sDCI can be adjusted, and complexity of DCI blind decoding of the UE may be reduced compared to case #1 N100 or case #2 N105.

Case #4 N115 is an example of transmitting control information on PDSCH transmitted from (N–1) additional TRPs in the same DCI (Long DCI) as control information on PDSCH transmitted from serving TRPs when different (N–1) PDSCHs are transmitted from (N–1) additional TRPs (TRP #1 to TRP #(N–1)) in addition to the serving TRP (TRP #0) used when transmitting a single PDSCH. That is, the terminal can obtain control information on PDSCHs transmitted from different TRPs (TRP #0 to TRP #(N–1)) through a single DCI. In case #4 N115, the complexity of DCI blind decoding of the UE may not increase, but the degree of freedom in PDSCH control or allocation may be low, such as the number of cooperative TRPs being limited according to the long DCI payload limit.

In the following description and embodiments, sDCI may refer to various auxiliary DCIs such as shortened DCI, secondary DCI, or normal DCI (DCI format 1_0 to 1_1 described above) including PDSCH control information transmitted in cooperative TRP. If no special restrictions are specified, the description is similarly applicable to the various auxiliary DCIs.

In the following descriptions and embodiments, case #1 N100, case #2 N105, and case #3 N110, in which one or more DCI (PDCCH) is used to support NC-JT, may be classified as multiple PDCCH-based NC-JT, and the aforementioned case #4 N115 in which a single DCI (PDCCH) is used to support NC-JT may be classified as a single PDCCH-based NC-JT. In multiple PDCCH-based PDSCH transmission, a CORESET in which DCI of serving TRP (TRP #0) is scheduled and a CORESET in which DCI of cooperative TRPs (TRP #1 to TRP #(N–1)) are scheduled can be distinguished. As a method for distinguishing CORESETs, there may be a method of distinguishing through an upper layer indicator for each CORESET, a method of distinguishing through beam setting for each CORESET, etc. In addition, in the single PDCCH-based NC-JT, a single DCI may schedule a single PDSCH having a plurality of layers instead of scheduling a plurality of PDSCHs, and the above-described plurality of layers may be transmitted from a plurality of TRPs. The connection relationship between the layer and the TRP transmitting the layer may be indicated through a TCI indication for the layer.

Herein, the cooperative TRP may be replaced with various terms such as cooperative panel or cooperative beam in actual application.

Herein, when NC-JT is applied can be interpreted in various ways according to circumstances, such as when the UE simultaneously receives one or more PDSCHs from one BWP, when the UE simultaneously receives two or more PDSCHs based on two or more TCI indications from one BWP, when the UE receives When PDSCH is associated with one or more DMRS port groups, etc., but is used as one expression for convenience of description.

The radio protocol structure for NC-JT may be used in various ways according to TRP deployment scenarios. For example, even when there is no or small backhaul delay between cooperative TRPs, a method using a structure based on MAC layer multiplexing (CA-like method) similar to S10 of FIG. 18 is possible. On the other hand, when the backhaul delay between cooperative TRPs is too large to be ignored (e.g., when information exchange between cooperative TRPs such as CSI, scheduling, HARQ-ACK, etc. requires more than 2 ms time), a method (DC-like method) for securing characteristics robust against delay using an independent structure for each TRP from the RLC layer is possible, similar to step S20 of FIG. 18.

The terminal supporting C-JT/NC-JT may receive parameters or setting values related to C-JT/NC-JT from upper layer configurations, and may configure RRC parameters of the UE based on this. For upper layer configuration, the UE may utilize a UE capability parameter, for example, tci-StatePDSCH. Here, the UE capability parameter, for example, tci-StatePDSCH, may define TCI states for the purpose of PDSCH transmission, the number of TCI states may be configured to 4, 8, 16, 32, 64, 128 in FR1 and 64, 128 in FR2, and up to 8 states that can be indicated by the TCI field 3 bits of the DCI through the MAC-CE message may be configured among the set number. The maximum value of 128 means a value indicated by maxNumberConfiguredTCIstatesPerCC in the tci-StatePDSCH parameter included in capability signaling of the UE. As such, a series of configuration processes from upper layer configuration to MAC-CE configuration may be applied to a beamforming instruction or a beamforming change command for at least one PDSCH in one TRP.

Multi-DCI Based Multi-TRP

A multi-DCI based multi-TRP transmission method is described. In the multi-DCI-based multi-TRP transmission method, a downlink control channel for NC-JT transmission may be configured based on the Multi-PDCCH.

In NC-JT based on multiple PDCCHs, when transmitting DCI for the PDSCH schedule of each TRP, it is possible to have a CORESET or search space differentiated for each TRP.

CORESET or search space for each TRP may be configured in at least one of the following cases.

Upper layer index configuration for each CORESET: The CORESET configuration information configured for the upper layer may include an index value, and the TRP transmitting the PDCCH in the corresponding CORESET may be distinguished by the index value for each configured CORESET. That is, in a set of CORESETs having the same upper layer index value, it may be considered that the same TRP transmits the PDCCH or the PDCCH scheduling the PDSCH of the same TRP is transmitted. The index for each CORESET described above may be named as CORESETPoolIndex, and it may be considered that the PDCCH is transmitted from the same TRP for CORESETs for which the same CORESETPoolIndex value is configured. In the case of a CORESET in which the value of CORESETPoolIndex is not configured, it can be considered that the default value of CORESETPoolIndex is configured, and the aforementioned default value may be 0.

When the type of CORESETPoolIndex each of a plurality of CORESETs included in PDCCH-Config, which is upper layer signaling, exceeds one, that is, when each CORESET has a different CORESETPoolIndex, the terminal may consider that the base station can use the multi-DCI based multi-TRP transmission method.

In contrast, when the type of CORESETPoolIndex each of a plurality of CORESETs included in PDCCH-Config, which is upper layer signaling, has one, that is, when all CORESETs have the same CORESETPoolIndex of 0 or 1, the terminal may consider that the base station transmits using single-TRP without using the multi-DCI-based multi-TRP transmission method.

Multiple PDCCH-Config configurations: Multiple PDCCH-Configs are configured in one BWP, and each PDCCH-Config may include PDCCH configurations for each TRP. That is, it may be considered that a list of CORESETs for each TRP and/or a list of search spaces for each TRP may be configured in one PDCCH-Config, and one or more CORESETs and one or more search spaces included in one PDCCH-Config correspond to a specific TRP.

CORESET beam/beam group configuration: TRPs corresponding to the CORESETs can be distinguished through beams or beam groups set for each CORESET. For example, when the same TCI state is set in a plurality of CORESETs, it may be considered that the CORESETs are transmitted through the same TRP or a PDCCH scheduling the PDSCH of the same TRP is transmitted in the corresponding CORESET.

Search space beam/beam group configuration: A beam or beam group is configured for each search space, and through this, TRPs for each search space can be distinguished. For example, when the same beam/beam group or TCI state is configured in multiple search spaces, it can be considered that the same TRP transmits the PDCCH in the search space, or the PDCCH scheduling the PDSCH of the same TRP is transmitted in the search space.

As described above, by dividing the CORESET or search space by TRP, it is possible to classify PDSCH and HARQ-ACK information for each TRP. Thus, independent HARQ-ACK codebook generation and independent PUCCH resource use for each TRP are possible.

The above configuration may be independent for each cell or each BWP. For example, while two different CORESET-PoolIndex values are configured for PCell, no CORESET-PoolIndex value may be configured for a specific SCell. In this case, it can be considered that NC-JT transmission is configured in the PCell, whereas NC-JT transmission is not configured in the SCell for which the CORESETPoolIndex value is not configured.

The PDSCH TCI state activation/deactivation MAC-CE applicable to the multi-DCI based multi-TRP transmission method may follow the process for configuring and activating a PDSCH beam of FIG. 16. If the UE does not set the CORESETPoolIndex for each of all CORESETs in the upper layer signaling PDCCH-Config, the UE may ignore the CORESET Pool ID field (16-55) in the corresponding MAC-CE (16-50). If the UE can support the multi-DCI based multi-TRP transmission method, that is, if each CORESET in the upper layer signaling PDCCH-Config has a different CORESETPoolIndex, the UE may activate the TCI state in the DCI included in the PDCCH transmitted in CORESETs having the same CORESETPoolIndex value as the value of the CORESET Pool ID field (16-55) in the corresponding MAC-CE (16-50). For example, if the value of the CORESET Pool ID field (16-55) in the corresponding MAC-CE (16-50) is 0, the TCI state in a DCI included in a PDCCH transmitted from CORESETs having a CORESET-PoolIndex of 0 may follow activation information of a corresponding MAC-CE.

When the terminal is configured to use the multi-DCI based multi-TRP transmission method from the base station, that is, when the type of CORESETPoolIndex each of the plurality of CORESETs included in PDCCH-Config, which is upper layer signaling, exceeds one, or when each CORESET has a different CORESETPoolIndex, the UE can know that the following restrictions exist for PDSCHs scheduled from PDCCHs in each CORESET having two different CORESETPoolIndexes.

1) When PDSCHs indicated from PDCCHs in each CORESET having two different CORESETPoolIndexes completely or partially overlap, the UE can apply the TCI states indicated from each PDCCH to different CDM groups, respectively. That is, two or more TCI states may not be applied to one CDM group.

2) When PDSCHs indicated from PDCCHs in each CORESET having two different CORESETPoolIndexes completely or partially overlap, the UE may expect that the actual number of front loaded DMRS symbols, the actual number of additional DMRS symbols, the location of the actual DMRS symbols, and the DMRS type of each PDSCH are not different from each other.

3) The UE may expect that the BWP indicated from the PDCCH in each CORESET having two different CORESETPoolIndex is the same and the subcarrier interval is also the same.

4) The UE may expect that each PDCCH fully includes information on PDSCHs scheduled from PDCCHs in each CORESET having two different CORESETPoolIndex.

Single-DCI-Based Multi-TRP

A single-DCI based multi-TRP transmission method is described. In the single-DCI-based multi-TRP transmission method, a downlink control channel for NC-JT transmission may be configured based on a single-PDCCH.

In the single DCI-based multi-TRP transmission method, PDSCHs transmitted by multiple TRPs can be scheduled with one DCI. In this case, the number of TCI states may be used as a method of indicating the number of TRPs transmitting the corresponding PDSCH. That is, if the number of TCI states indicated in the DCI scheduling the PDSCH is two, it may be regarded as single PDCCH-based NC-JT transmission, and if the number of TCI states is one, it may be regarded as single-TRP transmission. The TCI states indicated by the above DCI may correspond to one or two TCI states among the TCI states activated by MAC-CE. If the TCI states of DCI correspond to the two TCI states activated by MAC-CE, the correspondence relationship between the TCI codepoint indicated by DCI and the TCI states activated by MAC-CE may be established, and it may be when there are two TCI states activated by MAC-CE corresponding to the TCI codepoint.

As another example, if at least one codepoint among all codepoints of the TCI state field in DCI indicates two TCI states, the terminal may consider that the base station can transmit based on the single-DCI based multi-TRP method. At least one codepoint indicating two TCI states in the TCI state field may be activated through Enhanced PDSCH TCI state activation/deactivation MAC-CE.

Figure 21:
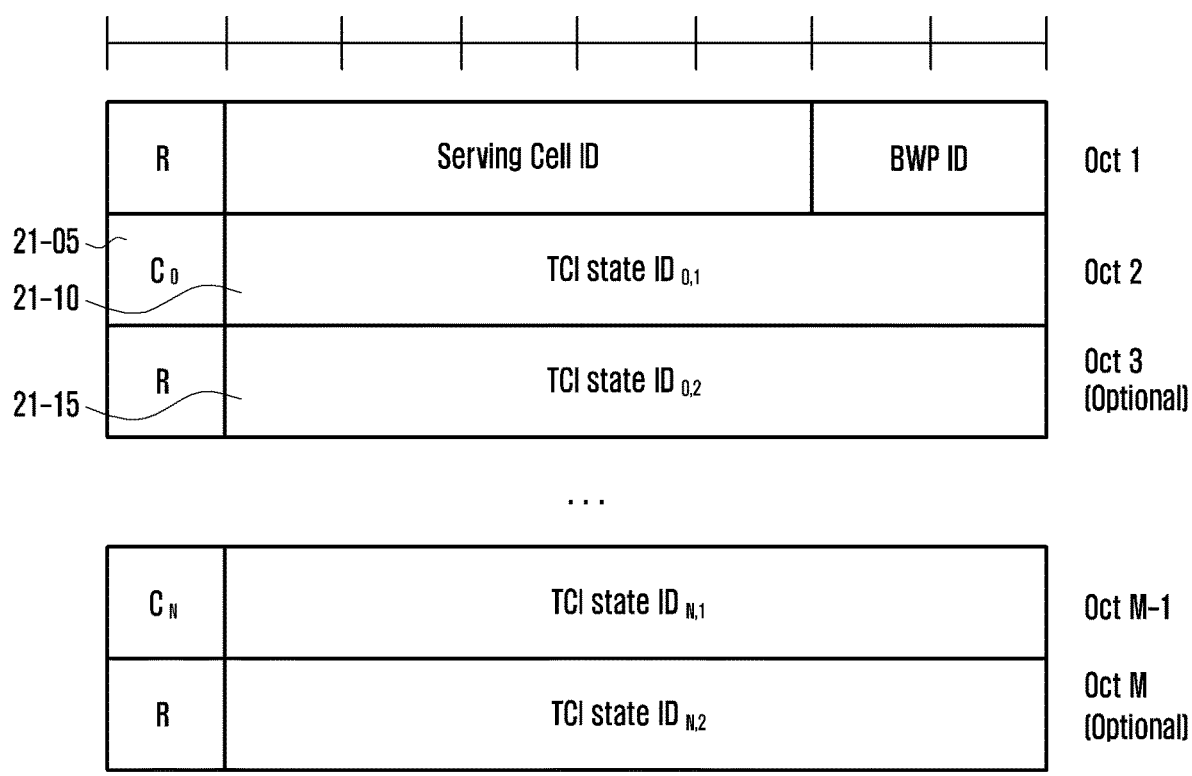
FIG. 21 illustrates an enhanced PDSCH TCI state activation/deactivation MAC CE structure.

FIG. 21 illustrates an enhanced PDSCH TCI state activation/deactivation MAC-CE structure. The meaning of each field in the corresponding MAC-CE and the values that can be configured for each field are as follows:

TABLE 41

| | |
|---|---|
| - | Serving Cell ID: This field indicates the identity of the Serving Cell for which the MAC CE applies. The length of the field is 5 bits. If the indicated Serving Cell is configured as part of a *simultaneousTCI-UpdateList1* or *simultaneousTCI-UpdateList2* as specified in TS 38.331 [5], this MAC-CE applies to all the Serving Cells configured in the set *simultaneousTCI-UpdateList1* or *simultaneousTCI-UpdateList2*, respectively; |
| - | BWP ID: This field indicates a DL BWP for which the MAC-CE applies as the codepoint of the DCI BWP indicator field as specified in TS 38.212 [9]. The length of the BWP ID field is 2 bits; |
| - | $C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present; |
| - | TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{i,2}$ is optional based on the indication of the Ci field. The maximum number of activated TCI codepoint is 8 and the maximum number of TCI states mapped to a TCI codepoint is 2. |
| - | R: Reserved bit, set to "0". |

In FIG. 21, if the value of the Co field 21-05 is 1, the MAC-CE may include the TCI state $ID_{0,2}$ field (21-15) in addition to the TCI state $ID_{0,1}$ field 21-10. This means that TCI state $ID_{0,1}$ and TCI state $ID_{0,2}$ are activated for the $0^{th}$ codepoint of the TCI state field included in DCI, and if the base station instructs the corresponding codepoint to the terminal, the UE may receive instructions for two TCI states. If the value of the Co field 21-05 is 0, the corresponding MAC-CE cannot include the TCI state $ID_{0,2}$ field 21-15, and this means that one TCI state corresponding to TCI state $ID_{0,1}$ is activated for the $0^{th}$ codepoint of the TCI state field included in DCI.

The above configuration may be independent for each cell or each BWP. For example, a PCell may have up to two activated TCI states corresponding to one TCI codepoint, whereas a specific SCell may have up to one activated TCI states corresponding to one TCI codepoint. In this case, it may be regarded that the NC-JT transmission is configured in the PCell, whereas the NC-JT transmission is not configured in the aforementioned SCell.

Single-DCI-Based Multi-TRP PDSCH Repeated Transmission Scheme (TDM/FDM/SDM) Identification Method Next, a method for distinguishing a single-DCI-based multi-TRP PDSCH repeated transmission scheme is described. The UE may be instructed to use different single-DCI based multi-TRP PDSCH repetition transmission schemes (e.g., TDM, FDM, SDM) according to the value indicated by the DCI field and upper layer signaling configuration from the base station. Table 41, below, shows a method of distinguishing between single or multiple TRP-based techniques indicated to the terminal according to the value of a specific DI field and upper layer signaling configuration.

Condition 2: When at least one of all TDRA entries that can be indicated by the TDRA field includes a setting for repetitionNumber, and the TDRA entry indicated by the TDRA field in DCI does not include the setting for repetitionNumber.

Condition 3: When all TDRA entries that can be indicated by the TDRA field do not include setting for repetitionNumber.

Related to repetitionScheme configuration (column 5): This means whether or not repetitionScheme, which is upper layer signaling, is configured. RepetitionScheme, which is upper layer signaling, may be configured to one of tdmSchemeA, fdmSchemeA, and fdmSchemeB.

Transmission scheme indicated to the UE (column 6): This means single or multiple TRP schemes indicated according to each combination (column 1) represented in Table 31, above.

Single-TRP: A single TRP-based PDSCH transmission. If the UE has configured the pdsch-AggegationFactor in upper layer signaling PDSCH-config, the UE may be scheduled for repeated single TRP-based PDSCH transmission as many times as configured. Otherwise, the UE may be scheduled for single TRP-based PDSCH transmission.

TABLE 41

| Combination | Number of TCI states | Number of CDM group | repetitionNumber configuration and instruction conditions | Related to repetitionScheme configuration | Transmission scheme instructed to terminal |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 2 | Condition 3 | Configured | Multi-TRP FDM scheme A/FDM scheme B/TDM scheme A |
| 9 | 2 | 2 | Condition 1 | Not configured | Multi-TRP TDM scheme B |

The columns of Table 41 can be explained as follows:

Number of TCI states (column 2): means the number of TCI states indicated by the TCI state field in DCI, and can be one or two.

Number of CDM groups (column 3): means the number of different CDM groups of DMRS ports indicated by the antenna port field in DCI. It can be 1, 2 or 3.

RepetitionNumber configuration and instruction conditions (column 4): Three conditions are configured depending on whether repetitionNumber is configured for all TDRA entries that can be indicated by the Time Domain Resource Allocation field in DCI and whether the actually indicated TDRA entry has repetitionNumber configuration.

Condition 1: When at least one of all TDRA entries that can be indicated by the Time Domain Resource Allocation (TDRA) field includes a setting for repetitionNumber, and the TDRA entry indicated by the TDRA field in the DCI includes a setting for repetitionNumber greater than 1.

Single-TRP TDM scheme B: A repeated PDSCH transmission based on time resource division between single TRP-based slots. According to Condition 1 related to repetitionNumber described above, the terminal repeatedly transmits the PDSCH in the time dimension as many times as the number of slots with the number of repetitionNumber greater than 1 configured in the TDRA entry indicated by the Time Domain Resource Allocation field. The same start symbol and symbol length of the PDSCH indicated by the TDRA entry are applied to each slot corresponding to the number of repetitionNumber times, and the same TCI state is applied to each repeated transmission of the PDSCH. This technique is similar to the slot aggregation method in that it performs repeated PDSCH transmission between slots on time resources, but is different from slot aggregation in that it can dynamically determine whether or not to indicate repeated transmission based on the Time Domain Resource Allocation field in the DCI.

Multi-TRP SDM: A multi-TRP based spatial resource division PDSCH transmission method. This is a method of dividing and receiving layers from each TRP. Although it is not a repetitive transmission method, reliability of PDSCH transmission can be increased in that it can be transmitted by lowering the coding rate by increasing the number of layers. The UE may receive the PDSCH by applying the two TCI states indicated through the TCI state field in the DCI to each of the two CDM groups indicated by the base station.

Multi-TRP FDM scheme A: A multiple TRP-based frequency resource division PDSCH transmission method. Although this is not a repeated transmission like multi-TRP SDM because it has one PDSCH transmission location, it is a technique that can transmit with high reliability by reducing the coding rate by increasing the amount of frequency resources. The Multi-TRP FDM scheme A may apply two TCI states indicated through the TCI state field in the DCI to frequency resources that do not overlap each other. If the PRB bundling size is determined to be wideband, when the number of RBs indicated by the frequency domain resource allocation field is N, the terminal receives the first ceil (N/2) RBs by applying the first TCI state and receives the remaining floor (N/2) RBs by applying the second TCI state. Here, ceil(.) and floor(.) are operators that mean rounding up and rounding down to the first decimal place. If the PRB bundling size is determined to be 2 or 4, the terminal receives the even-numbered PRGs by applying the first TCI state, and receives the odd-numbered PRGs by applying the second TCI state.

Multi-TRP FDM scheme B: A multiple TRP-based frequency resource division PDSCH repeated transmission scheme, and has two PDSCH transmission locations so that PDSCHs can be repeatedly transmitted to each location. Similar to A, the Multi-TRP FDM scheme B may also apply two TCI states indicated through the TCI state field in DCI to non-overlapping frequency resources, respectively. If the PRB bundling size is determined to be wideband, when the number of RBs indicated by the Frequency Domain Resource Allocation field is N, the UE receives the first ceil (N/2) RBs by applying the first TCI state and receives the remaining floor (N/2) RBs by applying the second TCI state. Here, ceil(.) and floor(.) are operators that mean rounding up and rounding down to the first decimal place. If the PRB bundling size is determined to be 2 or 4, the terminal receives the even-numbered PRGs by applying the first TCI state, and receives the odd-numbered PRGs by applying the second TCI state.

Multi-TRP TDM scheme A: A repeated PDSCH transmission scheme within a multi-TRP based time resource division slot. The terminal has two PDSCH transmission locations in one slot, and the first reception location may be determined based on the start symbol and symbol length of the PDSCH indicated through the Time Domain Resource Allocation field in DCI. The start symbol of the second reception position of the PDSCH may be a position obtained by applying a symbol offset as much as StartingSymbolOffsetK, which is upper layer signaling, from the last symbol of the first transmission position, and the transmission position may be determined by the indicated symbol length. If the upper layer signaling, StartingSymbolOffsetK, is not set, the symbol offset may be regarded as 0.

Multi-TRP TDM scheme B: A repeated PDSCH transmission scheme between multiple TRP-based time resource division slots. The UE has one PDSCH transmission location within one slot, and receives repeated transmission based on the start symbol and symbol length of the same PDSCH during slots as many times as the repetitionNumber times indicated through the Time Domain Resource Allocation field in DCI. If repetitionNumber is 2, the UE may receive repeated PDSCH transmissions of the first and second slots by applying the first and second TCI states, respectively. If repetitionNumber is greater than 2, the terminal may use different TCI state application methods according to which tciMapping, which is upper layer signaling, is configured. If tciMapping is set to cyclicMapping, the first and second TCI states are applied to the first and second PDSCH transmission positions, respectively, and the same TCI state application method is applied to the remaining PDSCH transmission positions. If tciMapping is set to sequentialMapping, the first TCI state is applied to the first and second PDSCH transmission positions, the second TCI state is applied to the third and fourth PDSCH transmission positions, and the same TCI state application method is applied to the remaining PDSCH transmission positions.

RLM RS Related

Next, the RLM RS selection or determination method when radio link monitoring reference signal (RLM RS) is configured or not configured is described. The terminal may receive a set of RLM RSs from the base station through RadioLinkMonitoringRS in RadioLinkMonitoringConfig, which is upper layer signaling for each downlink BWP of SpCell, and a specific upper layer signaling structure may follow Table 42 below.

TABLE 42

```
RadioLinkMonitoringConfig ::= SEQUENCE {
    failureDetectionResourcesToAddModList    SEQUENCE
(SIZE(1..maxNrofFailureDetectionResources)) OF RadioLinkMonitoringRS
OPTIONAL, -- Need N
    failureDetectionResourcesToReleaseList SEQUENCE
(SIZE(1..maxNrofFailureDetectionResources)) OF RadioLinkMonitoringRS-Id
OPTIONAL, -- Need N
    beamFailureInstanceMaxCount ENUMERATED {n1, n2, n3, n4, n5, n6,
n8, n10}                                              OPTIONAL, -- Need R
    beamFailureDetectionTimer ENUMERATED {pbfd1, pbfd2, pbfd3, pbfd4,
pbfd5, pbfd6, pbfd8, pbfd10}                          OPTIONAL, -- Need R
    ...
}
```

TABLE 42-continued

```
RadioLinkMonitoringRS ::= SEQUENCE {
  radioLinkMonitoringRS-Id  RadioLinkMonitoringRS-Id,
  purpose                   ENUMERATED {beamFailure, rlf, both},
  detectionResource         CHOICE {
    ssb-Index               SSB-Index,
    csi-RS-Index            NZP-CSI-RS-ResourceId
  },
  ...
}
```

Table 43, below, may indicate the set or selectable number of RLM RSs for each specific purpose according to the maximum number of SSBs ($L_{max}$) per half frame. As shown in Table 43, below, $N_{LR-RLM}$ RSs may be used for link recovery or RLM according to the $L_{max}$, value, and $N_{RLMS}$ among the $N_{LR-RLM}$ RSs may be used for RLM.

TABLE 43

| $L_{max}$ | $N_{LR-RLM}$ | $N_{RLM}$ |
|---|---|---|
| 4 | 2 | 2 |
| 8 | 6 | 4 |
| 64 | 8 | 8 |

$N_{LR-RLM}$ and $N_{RLM}$ as a function of maximum number $L_{max}$ of SS/PBCH blocks per half frame.

If the UE does not receive upper layer signaling, RadioLinkMonitoringRS, and the UE receives the TCI state for receiving the PDCCH in the control resource set, and at least one CSI-RS is included in the corresponding TCI state, the RLM RS can be selected according to the following RLM RS selection methods.

RLM RS selection method 1) If the activated TCI state to be used for PDCCH reception has one reference RS (i.e., one activated TCI state has only one of QCL-TypeA, B, or C), the UE may select an RLM RS as a reference RS of an activated TCI state to be used for PDCCH reception.

RLM RS selection method 2) If the activated TCI state to be used for PDCCH reception has two reference RSs (i.e., when one activated TCI state has one of QCL-TypeA, B, or C and additionally has QCL-TypeD), the UE may select the RLM-RS as the reference RS of QCL-TypeD. The terminal does not expect two QCL-Type Ds to be set in one activated TCI state.

RLM RS selection method 3) The UE does not expect an aperiodic or semi-persistent RS to be selected as the RLM RS.

RLM RS selection method 4) When $L_{max}$=4, the UE may select $N_{RLM}$ (since $L_{max}$ is 4, two may be selected) RSs. Selection of the RLM RS is performed from reference RSs of TCI state set in the control resource set for PDCCH reception based on the RLM RS selection methods 1 to 3, and a short period of the search space to which the control resource set is connected is determined to be of high priority, and RLM RS selection is performed from the reference RS of the TCI state set in the control resource set connected to the search space of the shortest period. If there are a plurality of control resource sets connected to a plurality of search spaces having the same period, RLM RS selection is performed from the reference RS of the TCI state set to the upper control resource set index.

Figure 22:
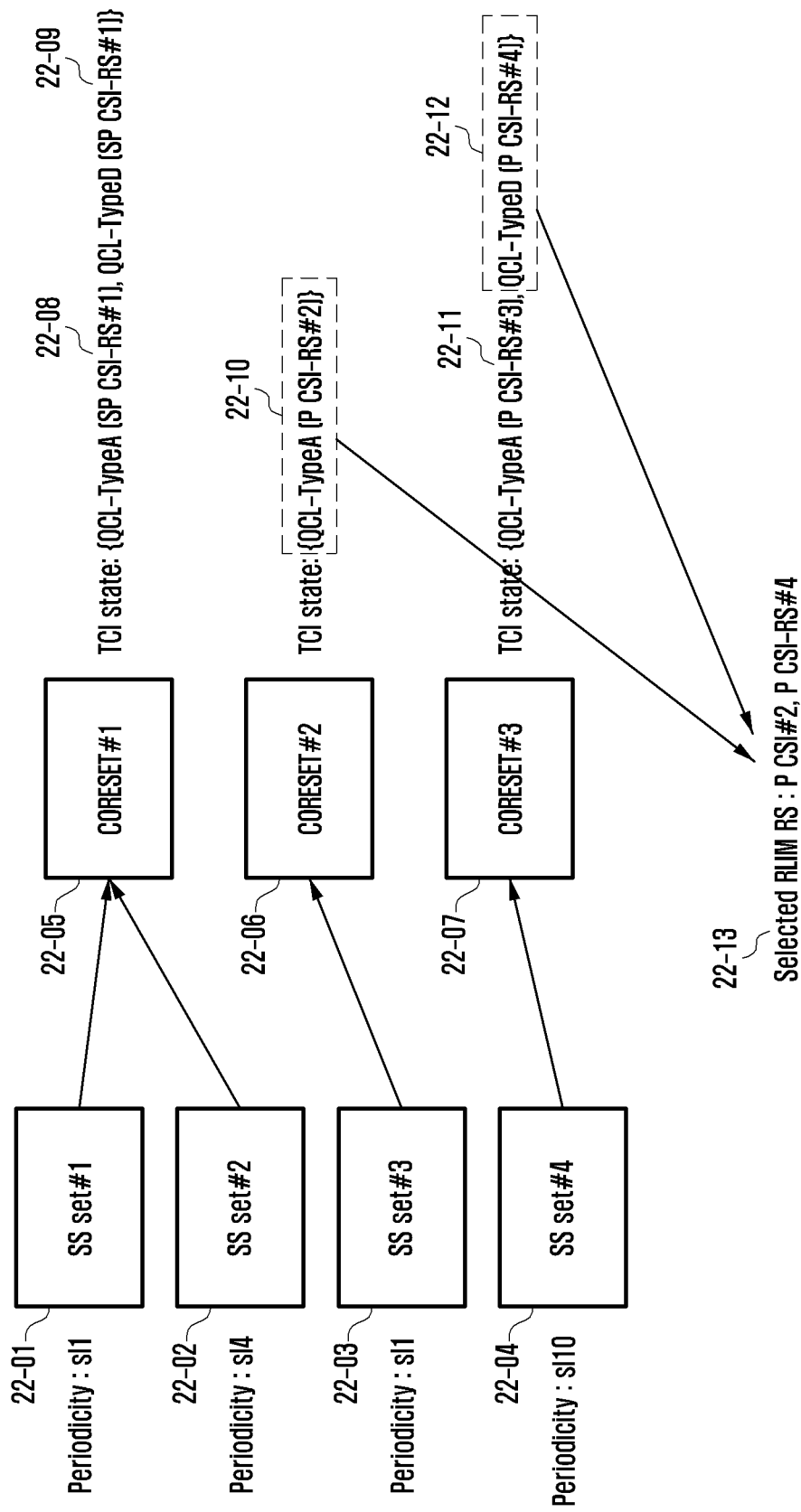
FIG. 22 illustrates an RLM RS selection process according to an embodiment.

FIG. 22 illustrates an RLM RS selection process according to an embodiment. FIG. 22 shows control resource set #1 to control resource set #3 (22-05 to 22-07) connected to search space #1 to search space #4 (22-01, 22-02, 22-03, 22-04) having different cycles within an activated downlink BWP, and reference RS of the TCI state configured in each control resource set. The RLM RS selection uses the TCI state configured in the control resource set connected to the search space of the shortest period, based on the RLM RS selection method 4, but since the periods of search space #1 (22-01) and search space #3 (22-03) are the same, a reference RS of TCI state configured in control resource set #2 having a high index may be used as the highest priority in RLM RS selection among control resource set #1 (22-05) and control resource set #2 (22-06) connected to each search space. In addition, since the TCI state configured in control resource set #2 has only QCL-TypeA and the corresponding reference RS is a periodic RS, P CSI-RS #2 (22-10) may be selected as the first RLM RS according to the above RLM RS selection methods 1 and 3. Among the reference RSs of the TCI state configured in the control resource set #1 having the next priority, the reference RS of QCL-TypeD may be a selection candidate by the RLM RS selection method 2, but since the corresponding RS is a semi-persistent RS (22-09), it is not selected as the RLM RS by the RLM RS selection method 3. Therefore, reference RSs of TCI state set in control resource set #3 may be considered as the next priority, and the reference RS of QCL-TypeD may be selected as a candidate by the RLM RS selection method 2. Since the corresponding reference RS is a periodic RS, P CSI-RS #4 (22-12) can be selected as the second RLM RS by the RLM RS selection method 3. Accordingly, the finally selected RLM RS may be P CSI-RS #2 or P CSI-RS #4 (22-13).

Related to Channel Status Measurement and Reporting Method

Next, a method for measuring and reporting channel conditions in a 5G communication system is described.

CSI may include channel quality information (CQI), precoding matrix index (PMI), CSI-RS resource indicator (CRI), SS/PBCH block resource indicator (SSBRI), layer indicator (LI), rank indicator (RI), and/or L1-reference signal received power (L1-RSRP), etc. The base station may control time and frequency resources for the aforementioned CSI measurement and reporting of the terminal.

For the aforementioned CSI measurement and reporting, the UE may receive configuration information (CSI-ReportConfig) for N (≥1) CSI reports and configuration information (CSI-ResourceConfig) for M (≥1) RS transmission resources, and list information of one or two trigger states (CSI-AperiodicTriggerStateList, CSI-SemiPersistentOnPUSCH-TriggerStateList) through upper layer signaling.

The configuration information for the aforementioned CSI measurement and reporting may be as follows described in Tables 44 to 50, below, in more detail.

Table 44, below, shows an example of CSI-ReportConfig IE and related parameter descriptions.

TABLE 44

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

*CSI-ReportConfig* information element
-- ASN1START
-- TAG-CSI-REPORTCONFIG-START
CSI-ReportConfig ::=                              SEQUENCE {
    reportConfigId                                CSI-ReportConfigId,
    carrier                                       ServCellIndex                   OPTIONAL,  -- Need S
    resourcesForChannelMeasurement                CSI-ResourceConfigId,
    csi-IM-ResourcesForInterference               CSI-ResourceConfigId            OPTIONAL,  -- Need R
    nzp-CSI-RS-ResourcesForInterference           CSI-ResourceConfigId            OPTIONAL,  -- Need R
    reportConfigType                              CHOICE {
        periodic                                  SEQUENCE {
            reportSlotConfig                      CSI-ReportPeriodicityAndOffset,
            pucch-CSI-ResourceList                SEQUENCE (SIZE (1..maxNrofBWPs)) OF PUCCH-CSI-Resource
        },
        semiPersistentOnPUCCH                     SEQUENCE {
            reportSlotConfig                      CSI-ReportPeriodicityAndOffset,
            pucch-CSI-ResourceList                SEQUENCE (SIZE (1..maxNrofBWPs)) OF PUCCH-CSI-Resource
        },
        semiPersistentOnPUSCH                     SEQUENCE {
            reportSlotConfig                      ENUMERATED {sl5, sl10, sl20, sl40, sl80, sl160, sl320},
            reportSlotOffsetList                  SEQUENCE (SIZE (1..maxNrofUL-Allocations)) OF INTEGER(0..32),
            p0alpha                               P0-PUSCH-AlphaSetId
        },
        aperiodic                                 SEQUENCE {
            reportSlotOffsetList                  SEQUENCE (SIZE (1..maxNrofUL-Allocations)) OF INTEGER(0..32)
        }
    },
    reportQuantity                                CHOICE {
        none                                      NULL,
        cri-RI-PMI-CQI                            NULL,
        cri-RI-i1                                 NULL,
        cri-RI-i1-CQI                             SEQUENCE {
            pdsch-BundleSizeForCSI                ENUMERATED {n2, n4}             OPTIONAL  -- Need S
        },
        cri-RI-CQI                                NULL,
        cri-RSRP                                  NULL,
        ssb-Index-RSRP                            NULL,
        cri-RI-LI-PMI-CQI                         NULL
    },
    reportFreqConfiguration                       SEQUENCE {
        cqi-FormatIndicator                       ENUMERATED { widebandCQI, subbandCQI }             OPTIONAL,  -- Need R
        pmi-FormatIndicator                       ENUMERATED { widebandPMI, subbandPMI }             OPTIONAL,  -- Need R
        csi-ReportingBand                         CHOICE {
            subbands3                             BIT STRING(SIZE(3)),
            subbands4                             BIT STRING(SIZE(4)),
            subbands5                             BIT STRING(SIZE(5)),
            subbands6                             BIT STRING(SIZE(6)),
            subbands7                             BIT STRING(SIZE(7)),
            subbands8                             BIT STRING(SIZE(8)),
            subbands9                             BIT STRING(SIZE(9)),
            subbands10                            BIT STRING(SIZE(10)),
            subbands11                            BIT STRING(SIZE(11)),
            subbands12                            BIT STRING(SIZE(12)),
            subbands13                            BIT STRING(SIZE(13)),
            subbands14                            BIT STRING(SIZE(14)),
            subbands15                            BIT STRING(SIZE(15)),
            subbands16                            BIT STRING(SIZE(16)), TABLE 44-continued

```
                                subbands17              BIT STRING(SIZE(17)),
                                subbands18              BIT STRING(SIZE(18)),
                                ...,
                                subbands19-v1530        BIT STRING(SIZE(19))
                        }                       OPTIONAL    -- Need S
        }
OPTIONAL,    -- Need R
    timeRestrictionForChannelMeasurements               ENUMERATED {configured,
notConfigured},
    timeRestrictionForInterferenceMeasurements          ENUMERATED {configured,
notConfigured},
    codebookConfig                                              CodebookConfig
OPTIONAL,    -- Need R
    dummy                                                       ENUMERATED {n1,
n2}                                     OPTIONAL,           -- Need R
    groupBasedBeamReporting                         CHOICE {
                enabled                             NULL,
                disabled                            SEQUENCE {
                        nrofReportedRS              ENUMERATED {n1, n2,
n3, n4}                                 OPTIONAL    -- Need S
                }
    },
    cqi-Table                                       ENUMERATED {table1, table2, table3,
spare1}                                 OPTIONAL,       -- Need R
    subbandSize                                     ENUMERATED {value1, value2},
    non-PMI-PortIndication                          SEQUENCE (SIZE (1..maxNrofNZP-CSI-
RS-ResourcesPerConfig)) OF PortIndexFor8Ranks OPTIONAL,         -- Need R
    ...,
    [[
    semiPersistentOnPUSCH-v1530                     SEQUENCE {
                reportSlotConfig-v1530              ENUMERATED {sl4, sl8, sl16}
    }
OPTIONAL            -- Need R
    ]]
}
CSI-ReportPeriodicityAndOffset ::=   CHOICE {
    slots4                                  INTEGER(0..3),
    slots5                                  INTEGER(0..4),
    slots8                                  INTEGER(0..7),
    slots10                                 INTEGER(0..9),
    slots16                                 INTEGER(0..15),
    slots20                                 INTEGER(0..19),
    slots40                                 INTEGER(0..39),
    slots80                                 INTEGER(0..79),
    slots160                                INTEGER(0..159),
    slots320                                INTEGER(0..319)
}
PUCCH-CSI-Resource ::=              SEQUENCE {
    uplinkBandwidthPartId               BWP-Id,
    pucch-Resource                      PUCCH-ResourceId
}
PortIndexFor8Ranks ::=              CHOICE {
    portIndex8                              SEQUENCE{
                rank1-8                                         PortIndex8
OPTIONAL,    -- Need R
                rank2-8                                 SEQUENCE(SIZE(2)) OF
PortIndex8                          OPTIONAL,       -- Need R
                rank3-8                                 SEQUENCE(SIZE(3)) OF
PortIndex8                          OPTIONAL,       -- Need R
                rank4-8                                 SEQUENCE(SIZE(4)) OF
PortIndex8                          OPTIONAL,       -- Need R
                rank5-8                                 SEQUENCE(SIZE(5)) OF
PortIndex8                          OPTIONAL,       -- Need R
                rank6-8                                 SEQUENCE(SIZE(6)) OF
PortIndex8                          OPTIONAL,       -- Need R
                rank7-8                                 SEQUENCE(SIZE(7)) OF
PortIndex8                          OPTIONAL,       -- Need R
                rank8-8                                 SEQUENCE(SIZE(8)) OF
PortIndex8                          OPTIONAL        -- Need R
    },
    portIndex4                              SEQUENCE{
                rank1-4                                         PortIndex4
OPTIONAL,    -- Need R
                rank2-4                                 SEQUENCE(SIZE(2)) OF
PortIndex4                          OPTIONAL,       -- Need R
                rank3-4                                 SEQUENCE(SIZE(3)) OF
PortIndex4                          OPTIONAL,       -- Need R
                rank4-4                                 SEQUENCE(SIZE(4)) OF
PortIndex4                          OPTIONAL        -- Need R
    },
```

TABLE 44-continued

```
        portIndex2                          SEQUENCE{
                     rank1-2                                      PortIndex2
OPTIONAL,   -- Need R
                     rank2-2                               SEQUENCE(SIZE(2)) OF
PortIndex2                            OPTIONAL       -- Need R
      },
      portIndex1                         NULL
   }
   PortIndex8::=                          INTEGER (0..7)
   PortIndex4::=                          INTEGER (0..3)
   PortIndex2::=                          INTEGER (0..1)
   -- TAG-CSI-REPORTCONFIG-STOP
   -- ASN1STOP
```

CSI-ReportConfigfield descriptions

*carrier*
  Indicates in which serving cell the CSI-ResourceConfig indicated below are to be found. If the field is absent, the resources are on the same serving cell as this report configuration.

*codebookConfig*
  Codebook configuration for Type-1 or Type-II including codebook subset restriction.

*cqi-FormatIndicator*
  Indicates whether the UE shall report a single (wideband) or multiple (subband) CQI. (see TS 38.214 [19], clause 5.2.1.4).

*cqi-Table*
  Which CQI table to use for CQI calculation (see TS 38.214 [19], clause 5.2.2.1).

*csi-IM-ResourcesForInterference*
  CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.

*csi-ReportingBand*
  Indicates a contiguous or non-contiguous subset of subbands in the bandwidth part which CSI shall be reported for. Each bit in the bit-string represents one subband. The right-most bit in the bit string represents the lowest sub-band in the BWR The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4).

*dummy*
  This field is not used. If received it shall be ignored by the UE.

*groupBasedBeamReporting*
  Turning on/off group beam based reporting (see TS 38.214 [19], clause 5.2.1.4)

*non-PMI-PortIndication*
  Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2).
  The first entry in non-PMI-PortIndication corresponds to die NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.

*nrofReportedRS*
  The number (N) of measured RS resources to be reported per report setting in a non-group-based report. N <= N_max, where N_max is either 2 or 4 depending on UE capability.
  (see TS 38.214 [19], clause 5.2.1.4) When the field is absent the UE applies the value 1

*nzp-CSI-RS-ResourcesForInterference*
  NZP CSI RS resources for interference measurement. csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.

*p0alpha*
  Index of the p0-alpha set determining the power control for this CSI report transmission (see TS 38.214 [19], clause 6.2.1.2).

*pdsch-BundleSizeForCSI*
  PRB bundling size to assume for CQI calculation when reportQuantity is CRI/RI/i1/CQI. If the field is absent, the UE assumes that no PRB bundling is applied (see TS 38.214 [19], clause 5.2.1.4.2).

TABLE 44-continued

*pmi-FormatIndicator*
  Indicates whether the UE shall report a single (wideband) or multiple (subband) PMI.
(see TS 38.214 [19], clause 5.2.1.4).
*pucch-CSI-ResourceList*
  Indicates which PUCCH resource to use for reporting on PUCCH.
*reportConfigType*
  Time domain behavior of reporting configuration
*reportFreqConfiguration*
  Reporting configuration in the frequency domain, (see TS 38.214 [19], clause 5.2.1.4).
*reportQuantity*
  The CSI related quantities to report. Corresponds to L1 parameter 'ReportQuantity'
(see TS 38.214 [19], clause 5.2.1).
*reportSlotConfig*
  Periodicity and slot offset (see TS 38.214 [19], clause 5.2.1.4) .
*reportSlotConfig-v1530*
  Extended value range for reportSlotConfig for semi-persistent CSI on PUSCH. If the
field is present, the UE shall ignore the value provided in the legacy field
(semiPersistentOnPUSCH.reportSlotConfig).
*reportSlotOffsetList*
  Timing offset Y for semi persistent reporting using PUSCH. This field lists the allowed
offset values. This list must have the same number of entries as the *pusch-
TimeDomainAllocationList* in *PUSCH-Config*. A particular value is indicated in DCI. The
network indicates in the DCI field of the UL grant, which of the configured report slot offsets
the UE shall apply. The DCI value 0 corresponds to the first report slot offset in this list, the
DCI value 1 corresponds to the second report slot offset in this list, and so on. The first report
is transmitted in slot n+Y, second report in n+Y+P, where P is the configured periodicity.
  Timing offset Y for aperiodic reporting using PUSCH. This field lists the allowed
offset values. This list must have the same number of entries as the *pusch-
TimeDomainAllocationList* in *PUSCH-Config*. A particular value is indicated in DCI. The
network indicates in the DCI field of the UL grant, which of the configured report slot offsets
the UE shall apply. The DCI value 0 corresponds to the first report slot offset in this list, the
DCI value 1 corresponds to the second report slot offset in this list, and so on (see TS 38.214
[19], clause 5.2.3).
*resourcesForChannelMeasurement*
  Resources for channel measurement. csi-ResourceConfigId of a CSI-ResourceConfig
included in the configuration of the serving cell indicated with the field "carrier" above. The
CSI-ResourceConfig indicated here contains only NZP-CSI-RS resources and/or SSB
resources. This CSI-ReportConfig is associated with the DL BWP indicated by bwp-Id in that
CSI-ResourceConfig.
*subbandSize*
  Indicates one out of two possible BWP-dependent values for the sub-band size as
indicated in TS 38.214 [19], table 5.2.1.4-2 . If csi-ReportingBand is absent, the UE shall
ignore this field.
*timeRestrictionForChannelMeasurements*
  Time domain measurement restriction for the channel (signal) measurements (see TS
38.214 [19], clause 5.2.1.1)
*timeRestrictionForInterferenceMeasurements*
  Time domain measurement restriction for interference measurements (see TS 38.214
[19], clause 5.2.1.1)

Table 45, below, shows an example of CSI-ResourceConfig IE and related parameter descriptions.

TABLE 45

The IE CSI-ResourceConfig defines a group of one or more NZP-CSI-RS-
ResourceSet, CSI-IM-ResourceSet and/or CSI-SSB-ResourceSet.
  *CSI-ResourceConfig* information element
  -- ASN1START
  -- TAG-CSI-RESOURCECONFIG-START
  CSI-ResourceConfig ::=           SEQUENCE {
      csi-ResourceConfigId             CSI-ResourceConfigId,
      csi-RS-ResourceSetList           CHOICE {
        nzp-CSI-RS-SSB                 SEQUENCE {
          nzp-CSI-RS-ResourceSetList           SEQUENCE (SIZE (1..maxNrofNZP-
CSI-RS-ResourceSetsPerConfig)) OF NZP-CSI-RS-ResourceSetId
OPTIONAL, -- Need R
          csi-SSB-ResourceSetList              SEQUENCE (SIZE (1..maxNrofCSI-
SSB-ResourceSetsPerConfig)) OF CSI-SSB-ResourceSetId
OPTIONAL -- Need R
        },
        csi-IM-ResourceSetList               SEQUENCE (SIZE (1..maxNrofCSI-IM-
ResourceSetsPerConfig)) OF CSI-IM-ResourceSetId
      },

TABLE 45-continued

```
        bwp-Id                          BWP-Id,
        resourceType                    ENUMERATED { aperiodic, semiPersistent,
periodic },
        ...
    }
-- TAG-CSI-RESOURCECONFIG-STOP
-- ASN1STOP
```
*CSI-ResourceConfig field descriptions*
bwp-Id
    The DL BWP which the CSI-RS associated with this CSI-ResourceConfig are located in (see TS 38.214 [19], clause 5.2.1.2
    csi-ResourceConfigId
        Used in CSI-ReportConfig to refer to an instance of CSI-ResourceConfig
    csi-RS-ResourceSetList
        Contains up to maxNrofNZP-CSI-RS-ResourceSetsPerConfig resource sets if ResourceConfigType is 'aperiodic' and 1 otherwise (see TS 38.214 [19], clause 5.2.1.2)
    csi-SSB-ResourceSetList
        List of SSB resources used for beam measurement and reporting in a resource set (see TS 38.214 [19], section FFS_Section)
    resourceType
        Time domain behavior of resource configuration (see TS 38.214 [19], clause 5.2.1.2). It does not apply to resources provided in the csi-SSB-ResourceSetList.

Table 46, below, shows an example of NZP-CSI-RS-ResourceSet IE and related parameter descriptions.

TABLE 46

The IE NZP-CSI-RS-ResourceSet is a set of Non-Zero-Power (NZP) CSI-RS resources (their IDs) and set-specific parameters.
*NZP-CSI-RS-ResourceSet* information element
```
-- ASN1START
-- TAG-NZP-CSI-RS-RESOURCESET-START
NZP-CSI-RS-ResourceSet ::=       SEQUENCE {
    nzp-CSI-ResourceSetId        NZP-CSI-RS-ResourceSetId,
    nzp-CSI-RS-Resources         SEQUENCE (SIZE
(1..maxNrofNZP-CSI-RS-ResourcesPerSet)) OF NZP-CSI-RS-ResourceId,
    repetition                   ENUMERATED { on, off }
OPTIONAL, -- Need S
    aperiodicTriggeringOffset    INTEGER(0..6)
OPTIONAL, -- Need S
    trs-Info                     ENUMERATED {true}
OPTIONAL, -- Need R
    ...
}
-- TAG-NZP-CSI-RS-RESOURCESET-STOP
-- ASN1STOP
```
*NZP-CSI-RS-ResourceSet field descriptions*
    aperiodic TriggeringOffset
    Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0.
    nzp-CSI-RS-Resources
        NZP-CSI-RS-Resources associated with this NZP-CSI-RS resource set (see TS 38.214 [19], clause 5.2). For CSI, there are at most 8 NZP CSI RS resources per resource set
    repetition
        Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see TS 38.214 [19], clauses 5.2.2.3.1 and 5.1.6.1.2). Can only be configured for CSI-RS resource sets which are associated with CSI-ReportConfig with report of L1 RSRP or "no report"
    trs-Info
        Indicates that the antenna port for all NZP-CSI-RS resources in the CSI-RS resource set is same. If the field is absent or released the UE applies the value "false" (see TS 38.214 [19], clause 5.2.2.3.1).

Table 47, below, shows an example of the CSI-SSB-ResourceSet IE.

TABLE 47

The IE CSI-SSB-ResourceSet is used to configure one SS/PBCH block resource set which refers to SS/PBCH as indicated in ServingCellConfigCommon.
CSI-SSB-ResourceSet information element
-- ASN1START
-- TAG-CSI-SSB-RESOURCESET-START
CSI-SSB-ResourceSet ::=                SEQUENCE {
  csi-SSB-ResourceSetId             CSI-SSB-ResourceSetId,
  csi-SSB-ResourceList              SEQUENCE
(SIZE(1..maxNrofCSI-SSB-ResourcePerSet)) OF SSB-Index,
  ...
}
-- TAG-CSI-SSB-RESOURCESET-STOP
-- ASN1STOP Table 48, below, shows an example of CSI-IM-ResourceSet IE.

TABLE 48

The IE CSI-IM-ResourceSet is used to configure a set of one or more CSI Interference Management (IM) resources (their IDs) and set-specific parameters.
CSI-IM-ResourceSet information element
-- ASN1START
-- TAG-CSI-IM-RESOURCESET-START
CSI-IM-ResourceSet ::=                 SEQUENCE {
  csi-IM-ResourceSetId              CSI-IM-ResourceSetId,
  csi-IM-Resources                  SEQUENCE
(SIZE(1..maxNrofCSI-IM-ResourcesPerSet)) OF CSI-IM-ResourceId,
  ...
}
-- TAG-CSI-IM-RESOURCESET-STOP
-- ASN1STOP
CSI-IM-ResourceSet field descriptions
csi-IM-Resources
  CSI-IM-Resources associated with this CSI-IM-ResourceSet (see TS 38.214 [19], clause 5.2)

Table 49, below, shows an example of CSI-Aperiodic-TriggerStateList IE and related parameter descriptions.

TABLE 49

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.
CSI-AperiodicTriggerStateList information element
-- ASN1START
-- TAG-CSI-APERIODICTRIGGERSTATELIST-START
CSI-AperiodicTriggerStateList ::=       SEQUENCE (SIZE (1..maxNrOfCSI-AperiodicTriggers)) OF CSI-AperiodicTriggerState
CSI-AperiodicTriggerState ::=           SEQUENCE {
  associatedReportConfigInfoList                 SEQUENCE
(SIZE(1..maxNrofReportConfigPerAperiodicTrigger))        OF       CSI-AssociatedReportConfigInfo,
  ...
}
CSI-AssociatedReportConfigInfo ::=      SEQUENCE {
  reportConfigId                    CSI-ReportConfigId,
  resourcesForChannel               CHOICE {
    nzp-CSI-RS                      SEQUENCE {
      resourceSet                   INTEGER
(1..maxNrofNZP-CSI-RS-ResourceSetsPerConfig),
      qcl-info                      SEQUENCE
(SIZE(1..maxNrofAP-CSI-RS-ResourcesPerSet)) OF TCI-StateId OPTIONAL -- Cond Aperiodic
    },
    csi-SSB-ResourceSet              INTEGER (1..maxNrofCSI-SSB-ResourceSetsPerConfig)
    }, TABLE 49-continued

```
        csi-IM-ResourcesForInterference                    INTEGER(1..maxNrofCSI-IM-
ResourceSetsPerConfig)     OPTIONAL, -- Cond CSI-IM-ForInterference
        nzp-CSI-RS-ResourcesForInterference INTEGER (1..maxNrofNZP-CSI-RS-
ResourceSetsPerConfig)   OPTIONAL, -- Cond NZP-CSI-RS-ForInterference
        ...
}
-- TAG-CSI-APERIODICTRIGGERSTATELIST-STOP
-- ASN1STOP
```

*CSI-AssociatedReportConfigInfo field descriptions*
*csi-IM-ResourcesForInterference*

CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.

*csi-SSB-ResourceSet*

CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).

*nzp-CSI-RS-ResourcesForInterference*

NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).

*qcl-info*

List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)

*reportConfigId*

The reportConfigId of one of the CSI-ReportConfigToAddMod configured in CSI-MeasConfig

*resourceSet*

NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to thesecond entry, and so on).

| Conditional Presence | Explanation |
|---|---|
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

Table 50, below, shows an example of CSI-SemiPersistentOnPUSCH-TriggerStateList IE and related parameter descriptions.

TABLE 50

The CSI-SemiPersistentOnPUSCH-TriggerStateList IE is used to configure the UE with list of trigger states for semi-persistent reporting of channel state information on L1. See also TS 38.214 [19], clause 5.2.
    *CSI-SemiPersistentOnPUSCH-TriggerStateList* information element
    -- ASN1START
    -- TAG-CSI-SEMIPERSISTENTONPUSCHTRIGGERSTATELIST-START
    CSI-SemiPersistentOnPUSCH-TriggerStateList ::=    SEQUENCE(SIZE (1..maxNrOfSemiPersistentPUSCH-Triggers)) OF CSI-SemiPersistentOnPUSCH-TriggerState
    CSI-SemiPersistentOnPUSCH-TriggerState ::=    SEQUENCE {
        associatedReportConfigInfo    CSI-ReportConfigId,
        ...
    }
    -- TAG-CSI-SEMIPERSISTENTONPUSCHTRIGGERSTATELIST-STOP
-- ASN1STOP Regarding the aforementioned CSI report configuration (CSI-ReportConfig), each report configuration CSI-ReportConfig may be associated with one or more CSI resource configurations, that is, CSI-ResourceConfig. The association between CSI report configuration and CSI resource configuration may be indicated by the following parameters in CSI-ReportConfig.
    carrier: This indicates a cell/component carrier (CC) to which the CSI resource configuration associated with the CSI reporting configuration belongs.
    resourcesForChannelMeasurement: indicates CSI resource configurations for channel measurement associated with CSI reporting configurations.
    csi-IM-ResourcesForInterference: indicates CSI resource configuration composed of CSI-IM resources for interference measurement associated with CSI reporting configuration.
    nzp-CSI-RS-ResourcesForInterference: indicates CSI resource configuration composed of CSI-RS resources for interference measurement associated with CSI reporting configuration. Each port of the CSI-RS resource belonging to this CSI resource configuration may be pre-coded or beamformed to point to a separate interference transmission layer.

The terminal may perform CSI reporting, based on the channel state information measured by the CSI-RS or CSI-IM resource in the associated CSI resource configuration according to the above relationship.

As a time domain reporting operation for each report setting CSI-ReportConfig, Aperiodic, Semi-Persistent', and 'Periodic' methods are supported, and this may be configured from the base station to the terminal by the reportConfigType parameter configured from the upper layer. Depending on the time domain reporting operation, the type of uplink resource to which the CSI report is to be transmitted may be determined. The aperiodic CSI reporting of the UE may be performed using PUSCH, the periodic CSI reporting may be performed using PUCCH, and for semi-persistent CSI reporting, 'PUCCH-based semi-persistent (semi-PersistentOnPUCCH)' or 'PUSCH-based semi-persistent (semi-PersistentOnPUSCH)' reporting may be supported. When the semi-permanent CSI report is triggered or activated by DCI, the report may be performed using PUSCH, and when activated by a MAC-CE, the reporting may be performed using PUCCH. In the case of a periodic or semi-permanent CSI reporting method, a UE may receive a PUCCH or PUSCH resource to transmit CSI from a base station through upper layer signaling. The period and slot offset of the PUCCH or PUSCH resource to transmit CSI may be given based on the numerology of the UL partial bandwidth configured to transmit the CSI report. In the case of the aperiodic CSI reporting method, the UE may receive scheduling of PUSCH resources to transmit CSI from the base station through L1 signaling (DCI, for example, DCI format 0_1 described above).

Regarding the aforementioned CSI resource configuration (CSI-ResourceConfig), each CSI resource configuration CSI-ReportConfig may include S (≥1) CSI resource sets (configured by upper layer parameter csi-RS-ResourceSetList). The CSI resource set list may consist of an NZP CSI-RS resource set and an SS/PBCH block set or may be composed of CSI-interference measurement (CSI-IM) resource sets. Each CSI resource setting may be located in a DL partial bandwidth identified by an upper layer parameter bwp-id. The time domain operation of the CSI-RS resource in the CSI resource setting may be configured to one of aperiodic, periodic or semi-permanent from the upper layer parameter resourceType. For periodic or semi-permanent CSI resource setting, the number of CSI-RS resource sets may be limited to S=1, and the configured period and slot offset may be given based on the numerology of the downlink partial bandwidth identified by bwp-id.

There is a restriction on mutual time domain operation between the CSI reporting configuration and the CSI resource configuration associated therewith. For example, it is not possible to associate a CSI resource setting configured aperiodically with a CSI reporting configuration configured periodically. The combination of supported CSI reporting configurations and CSI resource configurations may be based on Table 51, below.

TABLE 51

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI reporting can be triggered by the CSI request indicator field of the aforementioned DCI format 0_1 or 0_2 corresponding to the scheduling DOI for the PUSCH. The UE can monitor the PDCCH, obtain control information conforming to DCI format 0_1 or 0_2, and obtain scheduling information for PUSCH and a CSI request indicator from the corresponding control information. The CSI request indicator may be set to NTS (=0, 1, 2, 3, 4, 5, or 6) bits, and the number of bits of the CSI request indicator may be determined by upper layer signaling (reportTriggerSize). The CSI request indicator field may be mapped to one trigger state, and the mapping between the indicator field and the trigger state may be indicated by an upper layer parameter CSI-AperiodicTriggerStateList. Each trigger state may indicate one aperiodic CSI reporting configuration and one CSI resource set within the associated CSI resource configuration. The purpose of indicating the CSI resource set is to indicate which CSI resource set to perform CSI reporting on, if the number of two or more CSI resource sets belongs to the CSI resource configuration.

A case in which the number of fields of the CSI request indicator and the number of trigger states of the upper layer parameter CSI-AperiodicTriggerStateList may not match may occur, with interpretation of the CSI request indicator as follows:

If the CSI request indicator indicates 0 (all bit values are 0), CSI reporting is not requested.

If the number (M) of CSI trigger states in the configured CSI-AperiodicTriggerStateList is greater than $2^{N_{Ts}}-1$, M CSI trigger states may be mapped to $2^{N_{Ts}}-1$ according to a predefined mapping relationship, and one of the trigger states of $2^{N_{Ts}}-1$ may be indicated by the CSI request field.

If the number (M) of CSI trigger states in the configured CSI-AperiodicTriggerStateList is less than or equal to $2^{N_{Ts}}-1$, one of the M CSI trigger states may be indicated in the CSI request field.

Table 52, below, shows an example of a relationship between a CSI request indicator and a CSI trigger state that may be indicated by the corresponding indicator.

TABLE 52

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

The UE may perform measurement on the CSI resource in the CSI trigger state triggered by the CSI request field, and may generate CSI (including at least one or more of the aforementioned CQI, PMI, CRI, SSBRI, LI, RI, or L1-RSRP) therefrom. The UE may transmit the acquired CSI using the PUSCH scheduled by the corresponding DCI format 0_1. When 1 bit corresponding to the uplink data indicator (UL-SCH indicator) in DCI format 0_1 indicates "1", the uplink data (UL-SCH) and obtained CSI may be multiplexed and transmitted on a PUSCH resource scheduled by DCI format 0_1. When 1 bit corresponding to the UL-SCH indicator in DCI format 0_1 indicates "0", only CSI without the UL-SCH may be mapped and transmitted to a PUSCH resource scheduled by DCI format 0_1.

Through the above-described downlink reception operation of NR, the terminal may receive upper layer signaling related to the TCI state for PDSCH reception from the base station for each BWP, may activate some of them for each codepoint of the TCI state field in the DCI through the MAC-CE, and may be instructed to receive beam-related information to be used for PDSCH reception through the TCI state field in the DCI. In addition, the terminal may use some of the beam-related information to be used for PDSCH reception from the base station as a TCI state for PDCCH reception, may receive corresponding upper layer signaling for each BWP, and may use a method of activating one of the TCI states as the TCI state of the control resource set through the MAC-CE. In addition, the UE may be instructed to transmit beam-related information to be used during PUSCH transmission through the SRI field in the DCI, may be identified through SRS spatial relation info set as upper layer signaling in the SRS resource indicated through the SRI field, and may be instructed to transmit beam-related information to be used during PUCCH transmission through MAC-CE that activates a connection between PUCCH spatial relation and PUCCH resource configured by upper layer signaling.

As such, in a 5G NR system, information on a plurality of transmission and reception beams configured by upper layer signaling to the UE and a method of quasi-statically or dynamically activating and instructing the UE are defined. Although these defined methods support very sophisticated units of transmission and reception beam indication, when information exchange on transmission/reception beams is not often required due to a situation in which the terminal moves little, when the base station and the terminal have the same understanding of information on the change of the transmission/reception beam of the terminal, when the base station and the terminal know in advance information about transmission/reception beams to be used at all times during the route due to a situation in which the terminal proceeds on a predetermined path from a specific start point to a destination point, or when prediction of transmission and reception beams is possible by implementing the base station and the terminal, the terminal may not have to exchange information with the base station on such a dynamic transmission/reception beam. For example, when a terminal is located on a high-speed railway running on a fixed main road, information on transmission/reception beams of the terminal may be determined according to the speed of the railway and the type of beam used by base stations located near the track. As another example, when a terminal is located in a drone taxi or in an autonomous vehicle moving along a very fixed path, there is a high possibility of using a fixed transmission/reception beam change pattern. In addition, in the case of a terminal that exists in a fixed location and does not have mobility, such as customer premise equipment (CPE), it is possible to change the type of transmission and reception beams according to a specific pattern with a plurality of communicable base stations. For such a case, the terminal may be able to operate based on relatively simple transmission/reception beam configuration and instruction rather than highly sophisticated and dynamic signaling defined in the above-described NR for transmission/reception beam application/instruction/activation operations.

Based on such an example, the disclosure relates to a method and apparatus for transmitting/receiving data and control information, based on predicted TCI in a wireless communication system. As a conventional method of receiving downlink data information, the UE may be instructed to perform down-selection using the MAC-CE and the downlink control channel from transmission configuration information configured by upper layer signaling, and may receive downlink data information using this. In this case, the possibility of being indicated using the downlink control channel compared to the number of configured information may be limited to a maximum of eight. In a scenario in which a terminal having an advanced transceiver performs a very fixed route, it may be assumed that the base station and the terminal can predict TCI information received from the base station in advance according to time. For such a terminal, the base station may apply a plurality of preset TCI information for each time period to use for downlink data information reception instead of a dynamic TCI indication each time. In addition to TCI information, other configuration or indication information (e.g., MCS, TDRA, FDRA, TPC, etc.) may be predicted in advance and a preconfigured value may be generalized and considered for each time zone.

For convenience, cell, transmission point, panel, beam, and/or transmission direction that can be distinguished through upper layer/L1 parameters such as TCI state or spatial relation information, or indicators such as cell ID, TRP ID, panel ID, etc. are unified and described as a TRP. Therefore, in actual application, TRP can be appropriately replaced with one of the above terms.

In determining whether cooperative communication is applied, a terminal may use various methods such as having a specific format of PDCCH(s) allocated to a PDSCH to which cooperative communication is applied, including a specific indicator indicating whether or not cooperative communication is applied to PDCCH(s) allocated to a PDSCH to which cooperative communication is applied, scrambling the PDCCH(s) allocated to the PDSCH to which cooperative communication is applied with a specific RNTI, or assuming that cooperative communication is applied in a specific section indicated by an upper layer. For convenience of description, the terminal receiving the PDSCH to which cooperative communication is applied based on conditions similar to the above will be referred to as an NC-JT case.

Herein, upper layer signaling may be signaling corresponding to at least one or a combination of one or more of the following signaling:
MIB
SIB or SIB X (X=1, 2, . . . )
RRC
MAC CE In addition, L1 signaling may be signaling corresponding to at least one or a combination of one or more of signaling methods using the following physical layer channels or signaling:
PDCCH
DCI
UE-specific DCI
Group common DCI
Common DCI
Scheduling DCI (e.g., DCI used for the purpose of scheduling downlink or uplink data)
Non-scheduling DCI (e.g., DCI that is not for the purpose of scheduling downlink or uplink data)
PUCCH
UCI Herein, determining the priority between A and B may be variously referred to as selecting a higher priority according to a predetermined priority rule and performing a corresponding operation, or omitting or dropping an operation for a lower priority.

The above examples are described through a plurality of embodiments, but they are not independent, and one or more embodiments may be applied simultaneously or in combination.

First Embodiment: Control Method Based on Presetting of Transmission/Reception Beam to be Applied to Specific Transmission/Reception Channel/Signal As a first embodiment, a preset-based control scheme of a transmission/reception beam to be applied to a specific transmission/reception channel/signal is described. In 5G NR, a terminal may receive information on up to 128 TCI states through upper layer signaling, may activate up to 8 of these TCI states for each codepoint of the TCI state field in DCI, based on MAC-CE, and may finally indicate one TCI state out of up to eight based on the DCI. Based on such two-step adjustment and selection of the number of candidates, overhead can be reduced in the case of DCI-based dynamic TCI state indication. However, when using this method, the terminal may have a disadvantage in that it cannot fully use the defined 128 TCI states due to reduced overhead. In addition, if the base station and the terminal can predict and know the change of the TCI state over time, the dynamic TCI state indication may force the UE to perform unnecessary PDCCH decoding, and overhead for the TCI state field in DCI may be wasted. Therefore, unlike the two-step candidate number adjustment and selection method based on upper layer signaling, MAC-CE, and DCI described above, a method of automatically applying the transmission/reception beam of the UE according to the order of preset TCI states may be considered. For convenience, when referring to each disclosed method, the two-step candidate number adjustment and selection method based on the above-described upper layer signaling, MAC-CE, and DCI may be named method 1, and the preset-based control method of a transmission/reception beam to be applied to a specific transmission/reception channel/signal may be named method 2.

For method 2, the terminal may receive a list of a plurality of TCI states from the base station and a time to apply each TCI state. The corresponding upper layer signaling may have the following configuration information structure:

```
Pre-configured-TCI-state-list ::= SEQUENCE {
    pre-configured-TCI-state-list SEQUENCE (SIZE (1, ...,
maxNrofPreConfiguredTCIState)) OF TCI-StateId,
    appliedTime-list SEQUENCE (SIZE (1, ...,
maxNrofPreConfiguredTCIState)) OF appliedTime
}
```

In the upper layer signaling structure, the pre-configured-TCI-state-list may be upper layer signaling meaning the order of the plurality of TCI states described above, the appliedTime-list may be upper layer signaling that means the application time (period) of each TCI state set in the pre-configured-TCI-state-list, and the maxNrofPreConfiguredTCIState may be upper layer signaling meaning the maximum number of multiple TCI states that can be configured in this way. That is, the terminal may receive a downlink signal using the first TCI-StateId in the pre-configured-TCI-state-list during the first appliedTime in the appliedTime-list, and may receive a downlink signal using the second TCI-StateId in the pre-configured-TCI-state-list during the second appliedTime in the appliedTime-list according to a similar method after the first appliedTime has elapsed.

If the terminal is configured for the upper layer signaling, the UE may receive a downlink signal, based on the TCI state defined by TCI-StateId for a specific time defined by appliedTime according to the configuration instead of using method 1. If the downlink signal is received using the last TCI-StateId in the pre-configured-TCI-state-list during the last appliedTime in the appliedTime-list, the same method may be repeated again from the first appliedTime and TCI-StateId.

If the UE is configured for the upper layer signaling, the UE can select between the method 1 and the method 2, based on a specific MAC-CE. If the UE is configured for the upper layer signaling, the UE may check the method selected by the base station among the method 1 and the method 2, based on a specific MAC-CE. If the UE receives the MAC-CE that activates method 2, the UE may use method 2 from a point of time 3 ms after the last symbol of PUCCH transmission including HARQ-ACK information indicating whether reception of a PDSCH including a corresponding MAC-CE is successful. After receiving the downlink signal using the last TCI-StateId in the pre-configured-TCI-state-list during the last appliedTime in the appliedTime-list, the terminal may perform transmission/reception beam control, based on the method 1 without using the method 2. Alternatively, until the terminal receives the MAC-CE indicating deactivation for the method 2, if the downlink signal is received using the last TCI-StateId in the pre-configured-TCI-state-list during the last appliedTime in the appliedTime-list, the same method may be repeated again from the first appliedTime and TCI-StateId.

The activation method for the above-described MAC-CE based method 2 may also be possible through DCI, and when specific fields in DCI using DCI format 1_1 or 1_2 have the following specific values, activation or deactivation of method 2 may be meant:

Using DCI format 1_1 or 1_2 scrambled CRC as CS-RNTI or new RNTI
All bits allocated to the redundancy version (RV) field and the MCS field are 1.
Related to an FDRA field
When the frequency resource allocation method is configured to Type 0 or dynamicSwitch, all bits allocated to the FDRA field have 0.
When the frequency resource allocation method is configured to Type 1, all bits allocated to the FDRA field have 1
All bits assigned to the HARQ Process Number field have 0
If all bits assigned to the NDI (New Data Indicator) field have 0, they are activated, and if they are 1, they are inactive.

Upper layer signaling for the method 2 may exist in various forms, as follows:

There is one upper layer signaling for method 2, and the upper layer signaling for method 2 may be applied only to transmission/reception beam control for the PDSCH. The remaining downlink channels/signals such as PDCCH or CSI-RS may operate according to existing methods. That is, a MAC-CE based TCI state activation method may be used for the PDCCH, and a TCI state configured by upper layer signaling may be used for the CSI-RS. In addition, the same upper layer signaling configuration and MAC-CE based activation method may be used for spatial relation info applied to uplink signals.

There is one upper layer signaling for method 2, and the upper layer signaling for method 2 may be applied only to transmission/reception beam control for PDCCH and PDSCH. That is, the same Rx beams may be used for downlink control and data channels, and in the case of a PDCCH, it may be applied to all control resource sets connected to a common search space and a UE-specific search space. The TCI state configured by upper layer signaling may be used in the CSI-RS as in the conventional method. In addition, the same upper layer signaling configuration and MAC-CE based activation method may be used for spatial relation info applied to uplink signals.

There is one upper layer signaling for method 2, and the upper layer signaling for method 2 may be applied only to transmission/reception beam control for PDCCH and PDSCH. That is, the same Rx beams for downlink control and data channels may be used. In particular, in the case of PDCCH, unlike the above, the PDCCH may be applied only to a control resource set connected only to a UE-specific search space. If a certain control resource set is connected to both the common search space and the terminal-specific search space, transmission/reception beam control may be performed based on method 1. The TCI state configured by upper layer signaling may be used in the CSI-RS as in the conventional method. In addition, the same upper layer signaling configuration and MAC-CE based activation method may be used for spatial relation info applied to uplink signals.

There is one upper layer signaling for method 2, and upper layer signaling for method 2 may be applied to PDCCH, PDSCH, and CSI-RS excluding SSB and TRS. In addition, the same upper layer signaling configuration and MAC-CE based activation method may be used for spatial relation info applied to uplink signals.

There is one upper layer signaling for method 2, upper layer signaling for method 2 may be applied to PDCCH and PDSCH excluding SSB and TRS, the CSI-RS may be applied only when upper layer signaling, which has meaning about whether method 2 is applied to a specific CSI-RS resource, is configured, or method 2 may be applied only to aperiodic CSI-RS resources without upper layer signaling, which means whether to apply. In addition, the same upper layer signaling configuration and MAC-CE based activation method may be used for spatial relation info applied to uplink signals. As another method for the uplink transmission/reception beam, the terminal may apply one set upper layer signaling to the uplink transmission/reception beam as well. In this case, applying the TCI-State to the Tx beam of the UE means that the UE determines the uplink Tx beam based on the QCL-TypeD reference RS set in the TCI-State.

There are two upper layer signaling for method 2, and each may be used for downlink and uplink transmission/reception beam control. Similar to the various methods applied to downlink channels/signals as described above for upper layer signaling to be used for downlink transmission/reception beam control, even for upper layer signaling to be used for uplink transmission/reception beam control, whether to apply to some or all of PUSCH, PUCCH, SRS, and PRACH may be standardized. The terminal may operate based on upper layer signaling configuration having meaning of whether to apply method 2 in resource configuration for each uplink channel/signal. For example, method 2 is applicable to all PUSCH transmissions and UE-specific PUCCH resources, and an existing method may be used for SRS and PRACH.

When defining a UE capability report for method 2, the UE may consider at least one of the following:

When method 2 is supported, the number of upper layer signaling that can be configured in the terminal When method 2 is supported, the range of applied downlink channels/signals When method 2 is supported, range of applied uplink channels/signals Method of selecting between method 1 and method 2: A supported method among RRC, MAC-CE, and DCI based methods When method 2 is supported, the maximum number of configurable transmission/reception beams (maxNrofPreConfiguredTCIState above)

Figure 23:
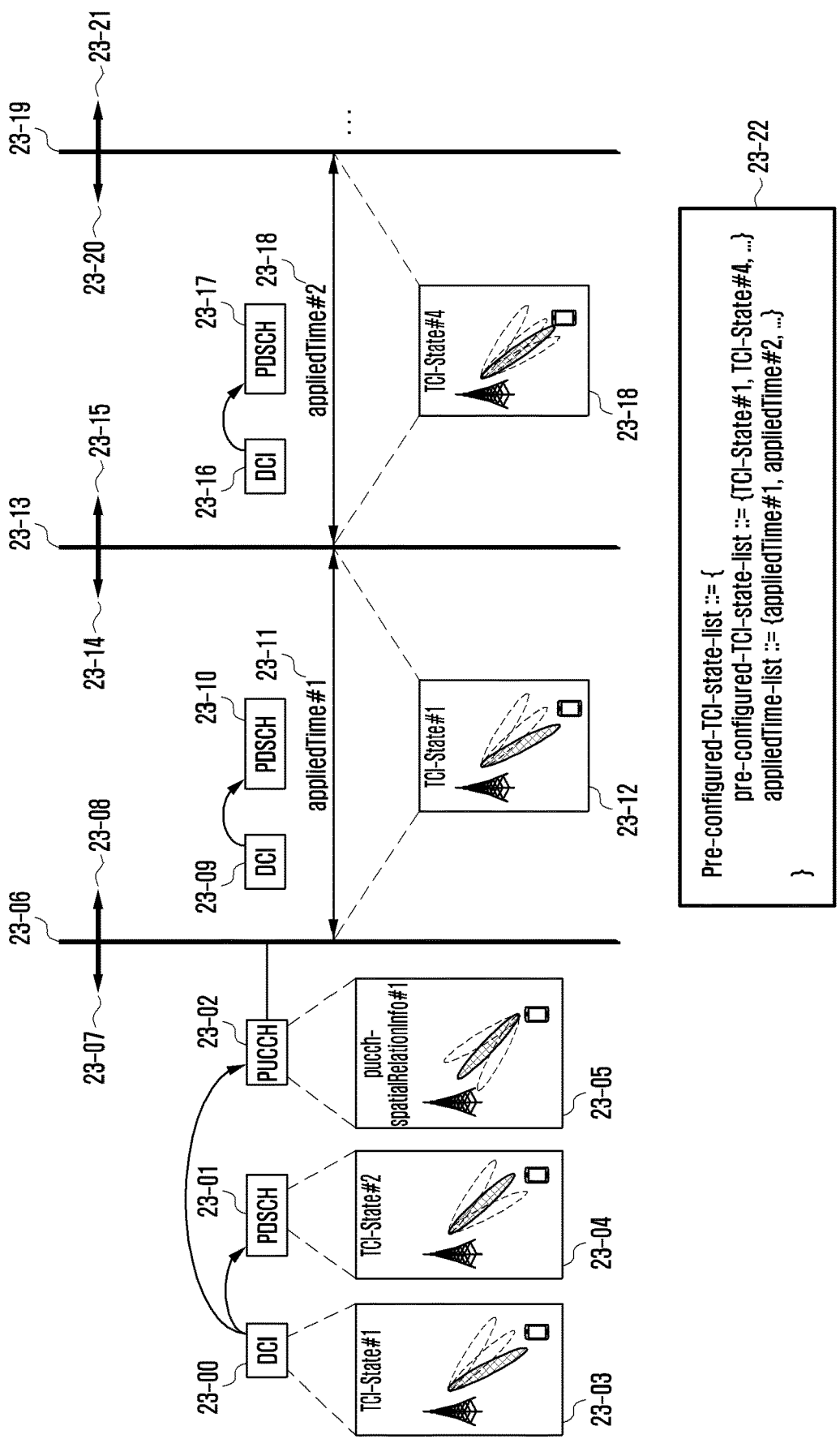
FIG. 23 illustrates a pre-configuration-based control scheme of a transmission/reception beam to be applied to a specific transmission/reception channel/signal according to an embodiment.

FIG. 23 illustrates a pre-configuration-based control scheme of a transmission/reception beam to be applied to a specific transmission/reception channel/signal according to an embodiment.

In FIG. 23, it may be assumed that the terminal operates based on MAC-CE for the selection method among method 1 and method 2. In addition, in the figure, it may be assumed that the terminal receives one upper layer signaling for the method 2 and applies the upper layer signaling to all downlink and uplink channels/signals except SSB and TRS. In addition, in FIG. 23, it may be assumed that the terminal receives settings for upper layer signaling from the base station as in (23-22).

It may be assumed that the terminal may receive a DCI for scheduling a PDSCH including a MAC-CE indicating activation of method 2 from the base station (23-00), and TCI-State #1 is activated for the control resource set in which the corresponding DCI is received based on method 1 when DCI is received (23-03). For example, it may be assumed that TCI-state #1 is activated by PDCCH TCI state activation MAC-CE received 3 ms before DCI (23-00) reception. It may be assumed that the terminal may receive a PDSCH including a MAC-CE indicating activation of method 2 based on the corresponding DCI from the base station (23-01), and upon receiving the PDSCH, TCI-State #2 is indicated based on method 1 (23-04). For example, it may be assumed that TCI-State #2 is indicated by DCI (23-00). Thereafter, it may be assumed that the terminal may transmit a PUCCH including HARQ-ACK information indicating whether reception of a PDSCH including a MAC-CE indicating activation of method 2 is successful to the base station (23-02), and pucch-spatialRelationInfo #1 connected to the corresponding PUCCH resource is used based on method 1 during PUCCH transmission (23-05). If the UE succeeds in receiving the PDSCH including the MAC-CE and transmits ACK information through the PUCCH, the transmission/reception beam control method of the UE (23-07) may be operated based on method 1 until the point (23-06) after 3 ms after the UE transmits the PUCCH, and the transmission/reception beam control method of the UE may be operated based on method 2 from the point in time (23-06) after 3 ms after PUCCH transmission (23-08).

As described above, the UE may use TCI-State #1 as a transmission/reception beam for all downlink and uplink channels/signals except SSB and TRS (23-12) from the time point (23-06) after 3 ms after PUCCH transmission (23-08) during appliedTime #1, which is upper layer signaling (23-11). That is, the reception beam for the DCI (23-09) received by the UE during appliedTime #1 and the PDSCH (23-10) scheduled by the corresponding DCI may be determined as TCI-State #1. As described above, the UE may use TCI-State #4 as a transmission/reception beam for all downlink and uplink channels/signals except SSB and TRS (23-18) after appliedTime #1 ends (23-13) and during (23-15) appliedTime #2 (23-18). That is, the reception beam for the DCI (23-16) received by the UE during appliedTime #2 and the PDSCH (23-17) scheduled by the corresponding DCI may be determined as TCI-State #4. Similarly, from the point at which appliedTime #2 ends (23-19), the terminal may perform transmission/reception beam control using the set TCI-State for a set time, similar to the above (23-21).

Figure 24:
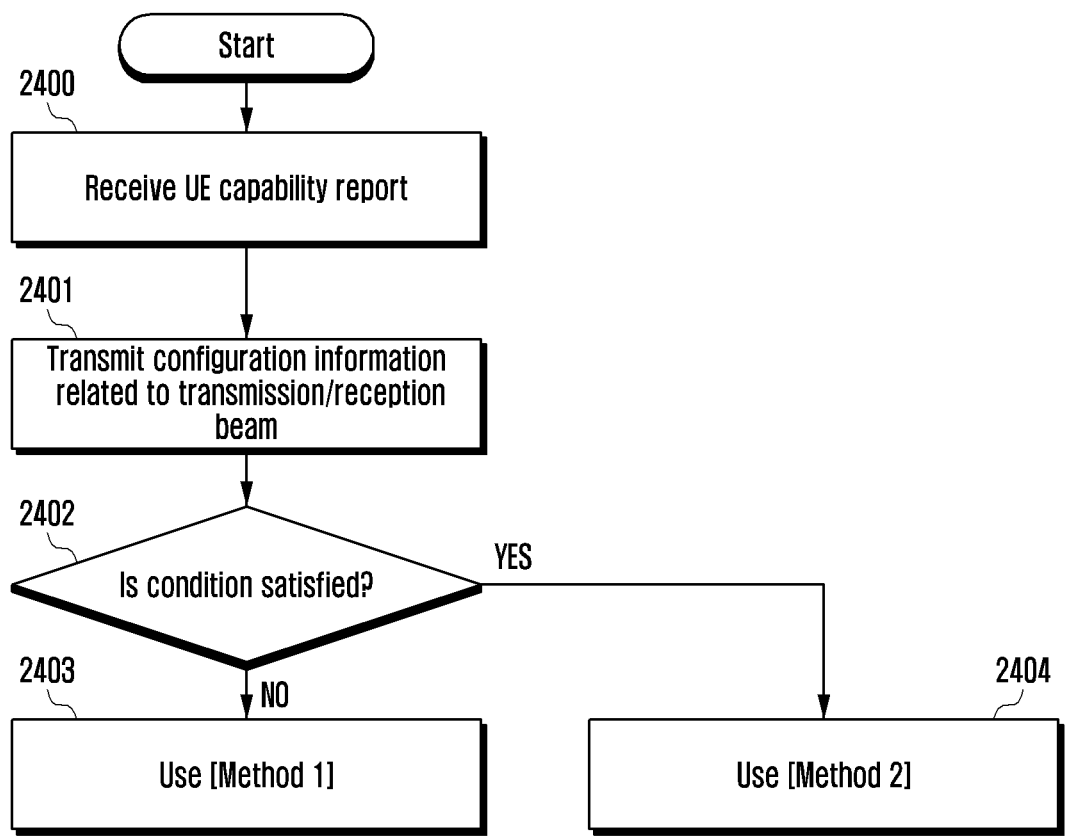
FIG. 24 illustrates an operation of a base station for a pre-configuration-based control method of a transmission/reception beam to be applied to a specific transmission/reception channel/signal according to an embodiment.

FIG. 24 illustrates an operation of a base station for a pre-configuration-based control method of a transmission/reception beam to be applied to a specific transmission/reception channel/signal according to an embodiment. The base station may receive a terminal capability report from the terminal in step 2400. The information that the base station may receive may include at least one of the terminal capability reports. Thereafter, the base station may transmit configuration information related to transmission/reception beams to the terminal by referring to the terminal capability report in step 2401. Then, the base station may check whether a specific condition is satisfied in step 2402. When a specific condition is determined to be satisfied in step 2402, the base station performs a transmission/reception beam control operation of the terminal using method 2 in step 2404. When a specific condition is determined not to be satisfied in step 2402, the base station performs a transmission/reception beam control operation of the terminal using method 1 in step 2403. Possible conditions may be a case in which upper layer signaling for method 2 is configured as described above, a case in which MAC-CE indicating activation for using method 2 is received, or a case in which DCI is received.

Figure 25:
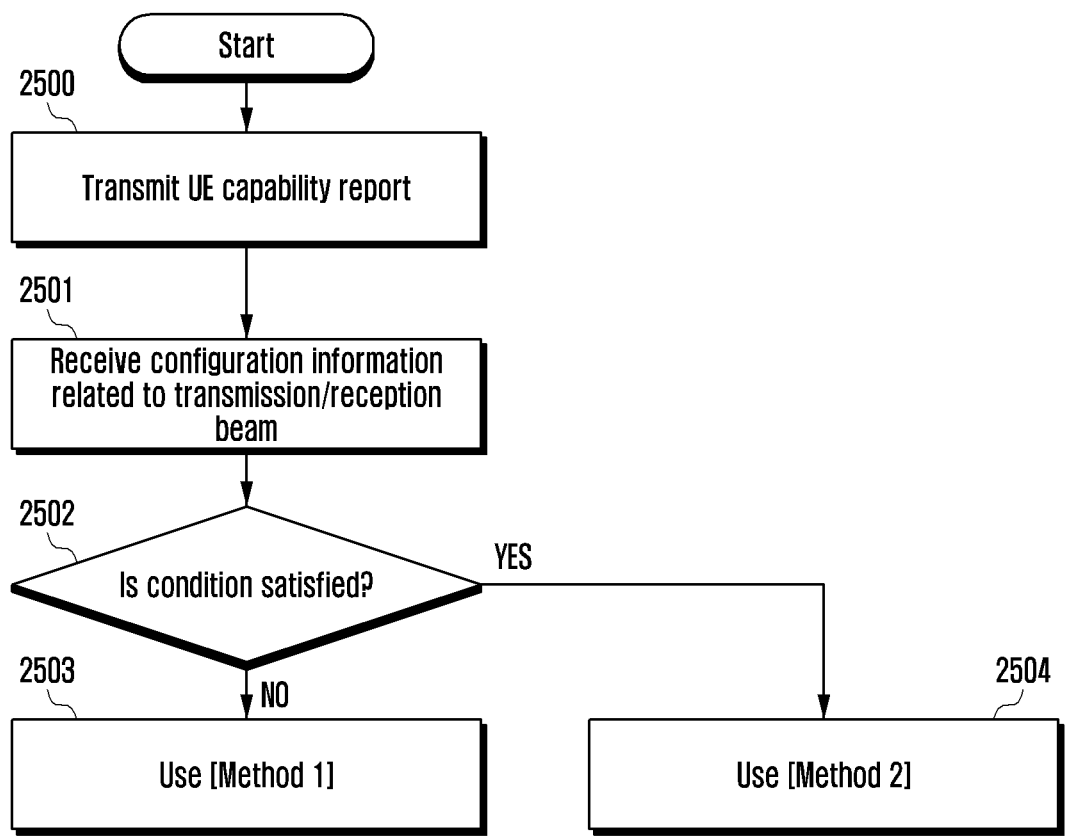
FIG. 25 illustrates an operation of a terminal in relation to a pre-configuration-based control method of a transmission/reception beam to be applied to a specific transmission/reception channel/signal according to an embodiment.

FIG. 25 illustrates an operation of a terminal in relation to a pre-configuration-based control method of a transmission/reception beam to be applied to a specific transmission/reception channel/signal according to an embodiment. The terminal may transmit a terminal capability report to the base station in step 2500. The information that the base station can receive may include at least one of the terminal capability reports. Thereafter, the terminal may receive configuration information related to transmission/reception beams from the base station in step 2501. Thereafter, the terminal may check whether a specific condition is satisfied in step 2502. When a specific condition is determined in step 2502 to be satisfied, the terminal may perform a transmission/reception beam control operation when receiving downlink from the base station and transmitting uplink to the base station using method 2 in step 2504. When a specific condition is determined in step 2502 not to be satisfied, the terminal may use method 1 in step 2503. Possible conditions may be a case in which upper layer signaling is configured for method 2 as described above, a case in which MAC-CE indicating activation for using method 2 is received, or a case in which DCI is received.

Second Embodiment: TCI Candidate Presetting and Indication-Based Transmission/Reception Beam Control Method A TCI candidate presetting method and an indication-based transmission/reception beam control method is described. The problem of method 2 described above in the first embodiment, above, may be that even though the terminal and the base station can predict and know the change of the TCI state over time, the terminal and the base station must unconditionally use one pre-set TCI state for a specific time. In addition, in the case of method 1 described above, if the base station and the terminal want to change up to 8 currently activated TCI state codepoints, the base station may perform the PDSCH TCI state activation MAC-CE based on the UE, but this may be inflexible when changing to a desired TCI state codepoint due to a process from PDCCH transmission to PUCCH transmission including HARQ-ACK for PDSCH and a time delay occurring from an additional 3 ms. For example, in the case of method 1, the TCI state may be changed every MAC-CE transmission period, but it may be difficult to change the TCI state more frequently than that. If the terminal and the base station can predict the change of the TCI state over time and know in advance when the candidate groups of the TCI state codepoint change, it may be advantageous for the terminal to automatically change the TCI state codepoint according to the time defined by the base station and the terminal without changing to a new codepoint based on the MAC-CE. Therefore, in this embodiment, a method for predicting a change in TCI state over time by a terminal and a base station and configuring TCI state candidates having a very high possibility of use during a specific time, that is, a method of setting codepoints of a TCI state field in advance is described. In the following description, the aforementioned TCI candidate presetting and indication-based transmission/reception beam control method may be named method 3.

For method 3, the terminal may receive a list of a plurality of TCI state codepoint sets from the base station and a time to apply each TCI state codepoint set. The corresponding upper layer signaling may have the following configuration information structure:

```
Pre-configured-TCI-state-codepoint-list ::= SEQUENCE {
    pre-configured-TCI-state-candidate-set-list SEQUENCE (SIZE (1, ...,
maxNrofPreConfiguredTCIStateCandidateSet)) OF pre-configured-TCI-state-candidate-set,
    appliedTime-list SEQUENCE (SIZE (1, ...,
maxNrofPreConfiguredTCIStateCandidateSet)) OF appliedTime
}
pre-configured-TCI-state-candidate-set ::= SEQUENCE (SIZE (1, ..., 8)) OF TCI-StateId
```

In the upper layer signaling structure, the pre-configured-TCI-state-candidate-set-list may be upper layer signaling meaning the order of the above-described plurality of TCI state codepoint sets, the appliedTime-list may be upper layer signaling that means the application time (period) of each TCI state codepoint set configured in the pre-configured-TCI-state-candidate-set-list, and the maxNrofPreConfiguredTCIStateCandidateSet may be upper layer signaling meaning the maximum number of sets of multiple TCI state codepoints that can be configured in this way. That is, each TCI state set in the first pre-configured-TCI-state-candidate-set in the pre-configured-TCI-state-candidate-set-list may be applied to each codepoint of the TCI state field in DCI during the first appliedTime in the appliedTime-list, a downlink signal may be received by instructing one TCI state of the pre-configured-TCI-state-candidate-set. After the first appliedTime has elapsed, during the second appliedTime in the appliedTime-list according to a similar method, each TCI state set in the second pre-configured-TCI-state-candidate-set in the pre-configured-TCI-state-candidate-set-list may be applied to each code point of the TCI state field in DCI, and a downlink signal may be received by indicating one TCI state of the second pre-configured-TCI-state-candidate-set as DCI. Up to 8 TCI-StateIds may be configured in each pre-configured-TCI-state-candidate-set, and each TCI-StateId may correspond to each code point of the TCI state field in DCI.

If the UE is configured for the upper layer signaling, instead of using the method 1, instead of using method 1, the terminal may receive a downlink signal based on the TCI states defined by the corresponding pre-configured-TCI-state-candidate-set for a specific time defined by applied-Time according to the configuration. After the terminal receives the downlink signal using the last pre-configured-TCI-state-candidate-set in the pre-configured-TCI-state-candidate-set-list during the last appliedTime in the applied-Time-list, the terminal may repeat the same method using the first appliedTime and the first pre-configured-TCI-state-candidate-set.

If the UE is configured for the upper layer signaling, the UE may select between the method 1 and the method 3 based on a specific MAC-CE. If the UE is configured for the upper layer signaling, the UE may check the method selected by the base station among the method 1 and the method 3 based on a specific MAC-CE. If the UE receives the MAC-CE that activates method 3, the UE may use method 3 from a point of time 3 ms after the last symbol of PUCCH transmission including HARQ-ACK information indicating whether reception of the PDSCH including the corresponding MAC-CE is successful. After receiving the downlink signal using the last pre-configured-TCI-state-candidate-set in the pre-configured-TCI-state-candidate-set-list during the last appliedTime in the appliedTime-list, the terminal may perform transmission/reception of beam control, based on method 1 without using method 3. Alternatively, until the terminal receives the MAC-CE indicating deactivation for the method 3, after the terminal receives the downlink signal using the last pre-configured-TCI-state-candidate-set in the pre-configured-TCI-state-candidate-set-list during the last appliedTime in the appliedTime-list, the terminal may repeat the same method again using the first appliedTime and pre-configured-TCI-state-candidate-set. The activation method for the MAC-CE-based method 3 described above may also be possible through DCI. When specific fields in DCI using DCI format 1_1 or 1_2 have specific values as follows, activation or inactivation is based on method 3:

Using DCI format 1_1 or 1_2 scrambled CRC as CS-RNTI or new RNTI.
  All bits allocated to RV field and MCS field have 0.
  Related to frequency domain resource allocation (FDRA) field.
    When the frequency resource allocation method is configured to Type 0 or dynamicSwitch, all bits allocated to the FDRA field have 1
    When the frequency resource allocation method is configured to Type 1, all bits allocated to the FDRA field have 0
  All bits assigned to the HARQ Process Number field have 1
  If all bits assigned to the NDI (New Data Indicator) field have 0, they are activated, and if they are 1, they are inactive.

Upper layer signaling for method 3 may exist in various forms, as follows:

There is one upper layer signaling for method 3, and the upper layer signaling for method 3 may be applied only to transmission/reception beam control for the PDSCH. The remaining downlink channels/signals such as PDCCH or CSI-RS may be operated according to existing methods. That is, a MAC-CE based TCI state activation method may be used for the PDCCH, and a TCI state configured by upper layer signaling may be used for the CSI-RS. In addition, the same upper layer signaling configuration and MAC-CE based activation method may be used for spatial relation info applied to uplink signals.

There is one upper layer signaling for method 3, and the upper layer signaling for method 3 may be applied only to transmission/reception beam control for PDCCH and PDSCH. That is, the same Rx beams may be used for downlink control and data channels, and in the case of PDCCH, the same Rx beams may be applied to all control resource sets connected to a common search space and a UE-specific search space. When applied to the PDCCH, the UE may identify the PDCCH reception beam using the first TCI state corresponding to the first code point of the TCI state field in the DCI among the TCI-States configured in the pre-configured-TCI-state-candidate-set. The TCI state configured by upper layer signaling may be used in the CSI-RS as in the conventional method. In addition, the same upper layer signaling configuration and MAC-CE based activation method may be used for spatial relation info applied to uplink signals.

There is one upper layer signaling for method 3, and the upper layer signaling for method 3 may be applied only to transmission/reception beam control for PDCCH and PDSCH. That is, the same Rx beams for downlink control and data channels may be used. In particular, in the case of PDCCH, unlike the above, the Rx beam may be applied only to a control resource set connected only to a UE-specific search space. If a certain control resource set is connected to both the common search space and the terminal-specific search space, transmission/reception beam control may be performed based on method 1. When applied to the PDCCH, the UE may identify the PDCCH reception beam using the first TCI state corresponding to the first code point of the TCI state field in the DCI among the TCI-States configured in the pre-configured-TCI-state-candidate-set. The TCI state configured by upper layer signaling may be used in the CSI-RS as in the conventional method. In addition, the same upper layer signaling configuration and MAC-CE based activation method may be used for spatial relation info applied to uplink signals.

There is one upper layer signaling for method 3, and upper layer signaling for method 3 may be applied to PDCCH, PDSCH, and CSI-RS excluding SSB and TRS. When applied to PDCCH and CSI-RS, the UE may identify the PDCCH reception beam using the first TCI state corresponding to the first code point of the TCI state field in the DCI among the TCI-States configured in the pre-configured-TCI-state-candidate-set. In addition, the same upper layer signaling configuration and MAC-CE based activation method may be used for spatial relation info applied to uplink signals.

There is one upper layer signaling for method 3, and upper layer signaling for method 3 may be applied to PDCCH, PDSCH, and CSI-RS excluding SSB and TRS. When applied to PDCCH and CSI-RS, the UE may identify the PDCCH reception beam using the first TCI state corresponding to the first code point of the TCI state field in the DCI among the TCI-States configured in the pre-configured-TCI-state-candidate-set. In the case of CSI-RS, method 3 may be applied only when upper layer signaling, which has meaning about whether to apply method 3 to a specific CSI-RS resource, is configured, or method 3 may be applied only to the aperiodic CSI-RS resource without upper layer signaling that has meaning about whether method 3 is applied. In addition, the same upper layer signaling configuration and MAC-CE based activation method may be used for spatial relation info applied to uplink signals. As another method for the uplink transmission/reception beam, the terminal may apply one configured upper layer signaling to the uplink transmission/reception beam as well. In this case, applying the TCI-State to the Tx beam of the UE means that the UE determines the uplink Tx beam, based on the QCL-TypeD reference RS set in the TCI-State.

There is one upper layer signaling for method 3, upper layer signaling for method 3 may be applied to PDCCH, PDSCH, and CSI-RS excluding SSB and TRS, and whether to apply to some or all of PUSCH, PUCCH, SRS, and PRACH may be defined in a standard way. The terminal may operate based on an upper layer signaling configuration having a meaning of whether to apply method 3 in resource configuration for each uplink channel/signal. When applied to PDCCH, CSI-RS, PUSCH, PUCCH, SRS, and PRACH, the UE may identify the PDCCH reception beam using the first TCI state corresponding to the first code point of the TCI state field in the DCI among the TCI-States configured in the pre-configured-TCI-state-candidate-set. In this case, applying the TCI-State to the Tx beam of the UE means that the UE determines the uplink Tx beam, based on the QCL-TypeD reference RS set in the TCI-State. For example, method 3 is applicable to PUSCH transmission and UE-specific PUCCH resources, and an existing method may be used for SRS and PRACH.

According to an embodiment, when defining a UE capability report for method 3, the UE may consider at least one of the following.

When method 3 is supported, the range of applied downlink channels/signals
When method 3 is supported, the range of applied uplink channels/signals
A method of selecting between method 1 and method 3:
A method that can be supported among RRC, MAC-CE, and DCI-based methods
When method 3 is supported, the maximum number of configurable transmission/reception beams (maxNrofPreConfiguredTCIStateCandidateSetabove)

Figure 26:
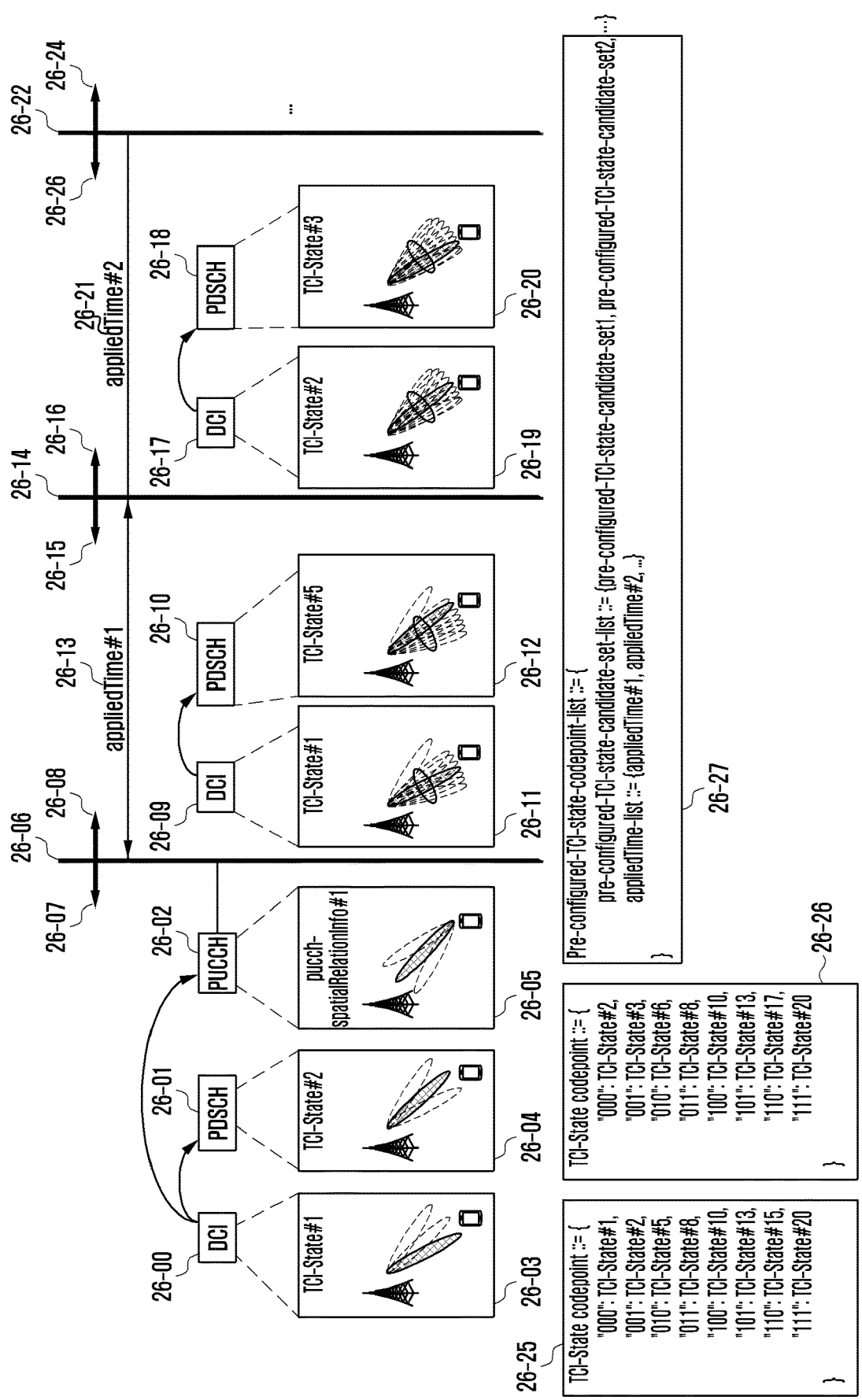
FIG. 26 illustrates a TCI candidate pre-configuration and instruction-based transmission/reception beam control scheme according to an embodiment.

FIG. 26 illustrates a TCI candidate pre-configuration and instruction-based transmission/reception beam control scheme according to an embodiment.

In FIG. 26, it can be assumed that the terminal operates based on MAC-CE for the selection method among method 1 and method 3. In addition, in FIG. 26, it may be assumed that the terminal receives one upper layer signaling for the method 3 and applies the upper layer signaling to all downlink and uplink channels/signals except SSB and TRS. In addition, in FIG. 26, it may be assumed that the terminal receives configurations for upper layer signaling from the base station as in (26-27).

It may be assumed that the terminal may receive a DCI for scheduling a PDSCH including a MAC-CE indicating activation of method 3 from the base station (26-00), and when DCI is received, TCI-State #1 is activated for the control resource set in which the corresponding DCI is received (26-03), based on method 1. For example, it may be assumed that TCI-state #1 is activated by PDCCH TCI state activation MAC-CE received 3 ms before DCI (26-00) reception. It may be assumed that the terminal may receive a PDSCH including a MAC-CE indicating activation of method 3 based on the corresponding DCI from the base station (26-01), and TCI-State #2 is instructed based on method 1 when receiving the PDSCH (26-04). For example, it may be assumed that TCI-state #2 is indicated by DCI (26-00). Thereafter, it may be assumed that the terminal may transmit to the base station a PUCCH including HARQ-ACK information indicating whether reception of the PDSCH including the MAC-CE indicating activation of method 3 is successful (26-02), and pucch-spatialRelationInfo #1 connected to the corresponding PUCCH resource is used based on method 1 when transmitting PUCCH (26-05). If the UE succeeds in receiving the PDSCH including the MAC-CE and transmits the ACK information through the PUCCH, the transmission/reception beam control method of the UE may be operated based on method 1 until before (26-06) after 3 ms after the UE transmits the PUCCH, and the transmission/reception beam control method of the UE may be operated based on method 3 from the point of time (26-06) after 3 ms after PUCCH transmission (26-08). As described above, from the time point (26-06) after 3 ms after PUCCH transmission (26-08) during appliedTime #1, which is upper layer signaling (26-13), the UE may identify the Rx beam of the UE through the TCI state field in DCI by corresponding each TCI-State configured in pre-configured-TCI-state-candidate-set1 (26-25) to each code point of TCI state field in DCI for the PDSCH, and may use TCI-State #1, which is the first TCI state set in pre-configured-TCI-state-candidate-set1 (26-25), as a transmission/reception beam for all downlink and uplink channels/signals except for PDSCH, SSB, and TRS. That is, the DCI (26-09) received by the UE during appliedTime #1 may be received based on TCI-State #1 (26-11), and the reception beam for the PDSCH (26-10) scheduled by the corresponding DCI may be determined as TCI-State #5 indicated through the TCI state field in the DCI (26-12). As described above, from the point at which appliedTime #1 ends (26-14) to (26-16) and during appliedTime #2 (26-21), for the PDSCH, the UE may identify the Rx beam of the UE through the TCI state field in the DCI by corresponding each TCI-State set in pre-configured-TCI-state-candidate-set2 (26-26) to each code point of the TCI state field in the DCI, and may use TCI-State #2, which is the first TCI state set in pre-configured-TCI-state-candidate-set2 (26-26), as a transmission/reception beam for all downlink and uplink channels/signals except for PDSCH, SSB, and TRS. That is, DCI (26-17) received by the terminal during appliedTime #2 can be received based on TCI-State #2 (26-19), and the reception beam for the PDSCH (26-18) scheduled by the corresponding DCI may be determined as TCI-State #3 indicated through the TCI state field in the DCI (26-20). Similarly, from the time appliedTime #2 ends (26-22), the terminal may perform transmission/reception beam control using the configured TCI-State for a configured time similar to the above (26-24).

Figure 27:
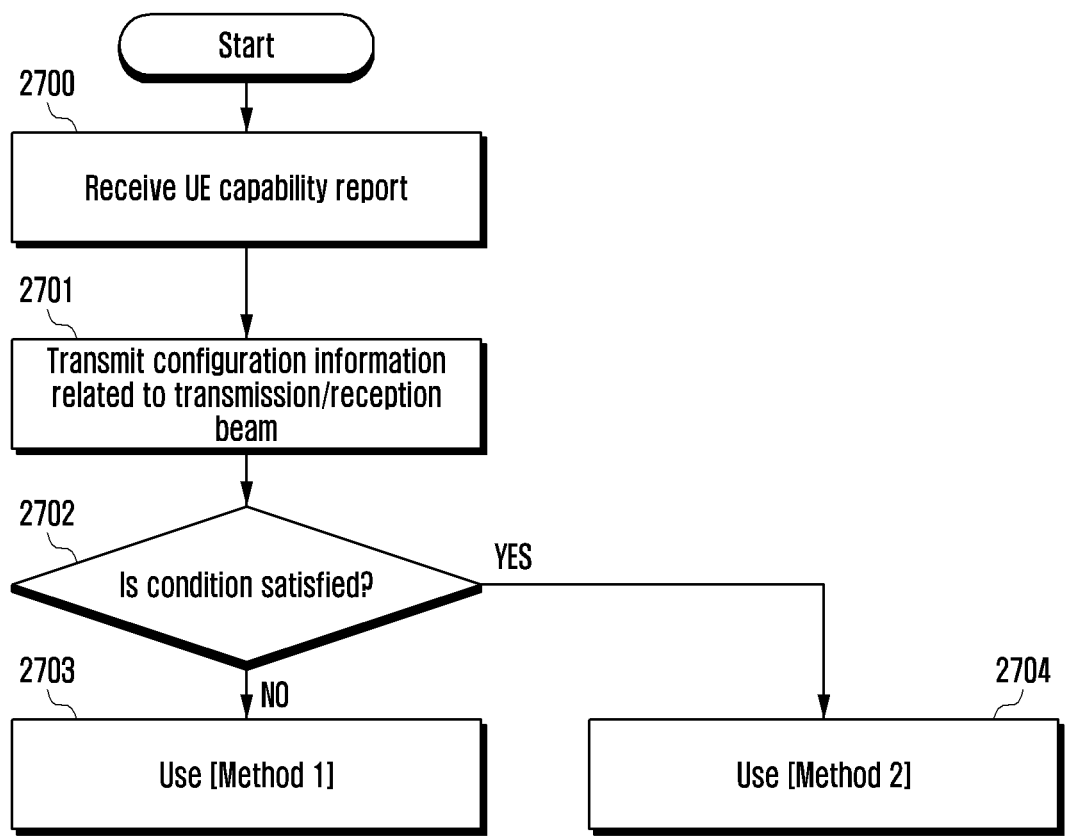
FIG. 27 illustrates operations of a base station for a TCI candidate pre-configuration and indication-based transmission/reception beam control scheme according to an embodiment.

FIG. 27 illustrates operations of a base station for a TCI candidate pre-configuration and indication-based transmission/reception beam control scheme according to an embodiment. Similar to the operation in FIG. 24, the base station may receive a terminal capability report from the terminal in step 2700. The information that the base station can receive may include at least one of the terminal capability reports. Thereafter, the base station may transmit configuration information related to transmission/reception beams to the terminal by referring to the terminal capability report in step 2701. Then, the base station may check whether a specific condition is satisfied in step 2702. When a specific condition is determined in step 2702 to be satisfied, in step 2704 the base station may perform transmission/reception beam control operation of the terminal using method 3. When a specific condition is determined in step 2702 not to be satisfied, method 1 is used in step 2702. Possible conditions may be a case in which upper layer signaling for method 3 is configured, a case in which MAC-CE indicating activation for method 3 is received, or a case in which DCI is received.

Figure 28:
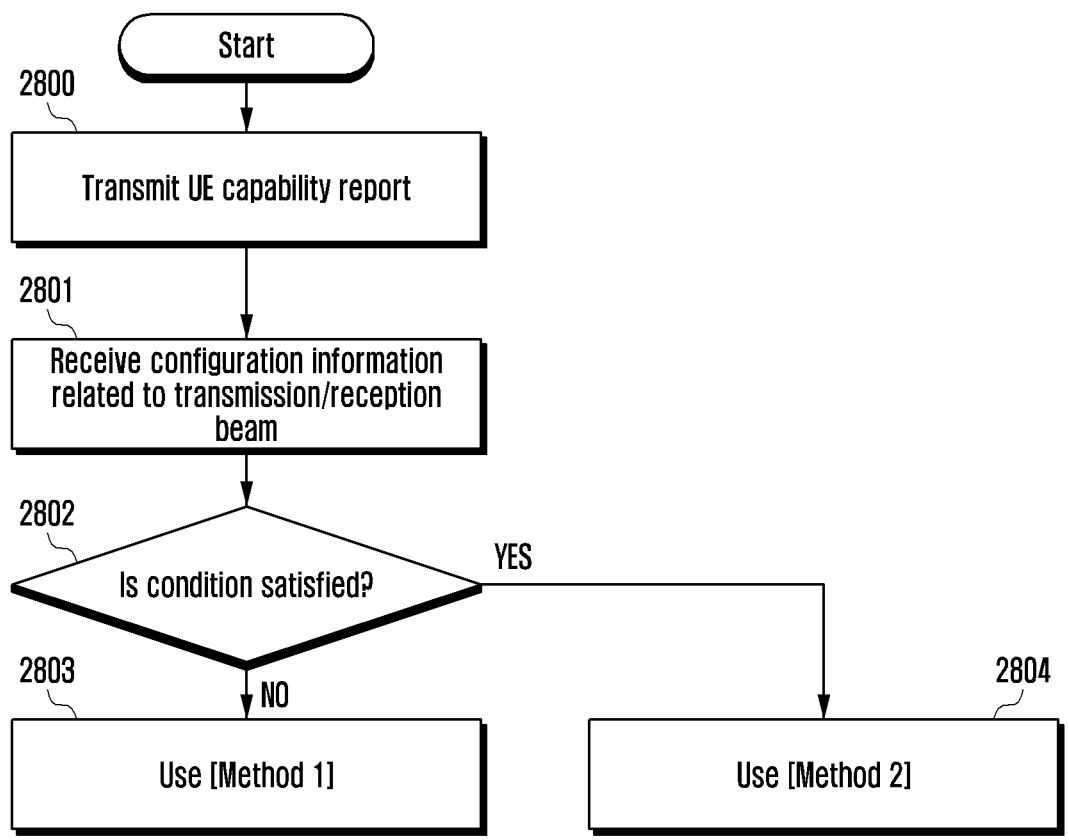
FIG. 28 illustrates operations of a terminal in relation to TCI candidate pre-configuration and indication-based transmission/reception beam control method according to an embodiment.

FIG. 28 illustrates operations of a terminal in relation to TCI candidate pre-configuration and indication-based transmission/reception beam control method according to an embodiment. Similar to the operation in FIG. 25, the terminal may transmit a terminal capability report to the base station in step 2800. The information that the base station can receive may include at least one of the terminal capability reports. Thereafter, the terminal may receive configuration information related to transmission/reception beams from the base station in step 2801. Then, the terminal may check whether a specific condition is satisfied in step 2802. When a specific condition is determined to be satisfied in step 2802, in step 2804 the terminal performs transmission and reception beam control operations when receiving downlink from the base station and transmitting uplink to the base station using method 3. When a specific condition is determined not to be satisfied in step 2802, in step 2803 the UE may use method 1. Possible conditions may be a case in which upper layer signaling is configured for method 3 as described above, a case I which MAC-CE indicating activation for using method 3 is received, or a case in which DCI is received.

Third Embodiment: Channel State Information Feedback Method Based on Channel State Information Prediction A CSI feedback method based on channel state information prediction in a terminal is described. The terminal may receive the CSI-RS from the base station, generate CSI considering a plurality of viewpoints on the time axis through a channel state information prediction function, and report it to the base station. A single or a plurality of CSI-RS resources that the terminal can receive to use for CSI generation may express one or more combinations among SI-RS for tracking (when trs-info, which is upper layer signaling, is set), CSI-RS for CSI (when both upper layer signaling, trs-info and repetition are not set), CSI-RS for beam management (when upper layer signaling, repetition is set), or CSI-RS for mobility. Among the reported CSI, at least one of CRI, CQI, PMI, RI, and LI may be channel state information that may vary for each view among a plurality of views on the time axis. If the terminal generates CSI considering N (N is a natural number of 2 or more) views on the time axis through the channel state information prediction function and reports it to the base station, the terminal may generate CQIs corresponding to N views by combining at least one of the following methods according to upper layer signaling configuration received from the base station and include them in the CSI report.

For example, the UE may generate independent CQIs for each N views. The CQI for each time point may be reported according to a CQI reporting unit on a frequency resource according to upper layer signaling configuration at that time point, or wideband CQI and sub-band CQI may be reported together. For example, the UE may quantize and report the wideband CQI to a specific number of bits (e.g., 4 bits), and if the UE reports the sub-band CQI, the differential CQI calculated from the wideband CQI value is a specific number of bits (e.g., 2 bits) may be quantized and reported.

The meaning of generating an independent CQI for each view means that quantization is not performed by using the value of each view as a reference when performing quantization for each view. That is, it means that the CQI value of the first time point does not affect (irrelevant to) the quantization of the CQI value of the second time point.

CQI reporting units on frequency resources are different for each time point, so they may be based on independent upper layer signaling or have the same value through single upper layer signaling. For example, the base station may transmit upper layer signaling to report only the wideband CQI for all viewpoints considered for CSI reporting to the terminal. As another example, the base station may transmit upper layer signaling configuration to allow the terminal to report the wideband CQI at a specific time point among the time points considered for CSI reporting, and the wideband CQI and sub-band CQI at another time point. As another example, the base station may transmit upper layer signaling so that the UE reports on the wideband CQI and sub-band CQI up to a specific point in time, and reports only the wideband CQI for all points in time after the specific point in time.

For example, the terminal may generate dependent CQIs for each N views. For the first time point, the UE may report only the wideband CQI or report both the wideband CQI and the sub-band CQI according to the CQI reporting unit on the frequency resource according to the upper layer signaling configuration at that time point. For all time points after the first time point, the UE may calculate a differential CQI, based on the CQI value calculated at the first time point and include it in the CSI report. For wideband CQI reports for all time points after the first time point, differential CQI may be calculated based on the wideband CQI value calculated at the first time point, and the number of bits used may be, for example, 2 bits or the number of bits of another value. In addition, for sub-band CQIs for all time points after the first time point, differential CQI may be calculated based on the wideband CQI value calculated at the first time point, differential CQI may be calculated based on the sub-band CQI value of the same frequency resource location at the first time point, or differential CQI may be calculated based on the wideband CQI value at that time, and the number of bits used in this case can be, for example, 2 bits or the number of bits of another value.

When calculating the wideband CQI or sub-band CQI for all views after the first view, as described above, regarding which value to calculate the differential CQI value for, it may be considered that the base station calculates the wideband or sub-band CQI using an independent method by transmitting independent upper layer signaling settings for each time point after the first time point to the terminal. Alternatively, the base station may transmit upper layer signaling to the UE to have the same CQI calculation method for all views after the first view considered for CSI reporting (e.g., the wideband and sub-band CQIs calculated for all time points after the first time point allow a differential CQI value to be calculated based on the wideband CQI at the first time point, or for the wideband CQI calculated for all time points after the first time point, a differential CQI value is calculated based on the wideband CQI at the first time point and for the sub-band CQI calculated for all time points after the first time point, a differential CQI value is calculated based on the wideband CQI at each time point).

CQI reporting units on frequency resources are different for each time point, so they may be based on independent upper layer signaling or have the same value through single upper layer signaling. For example, the base station may transmit upper layer signaling to the terminal to have a CQI reporting unit on the same frequency resource for all views considered for CSI reporting (e.g., only wideband CQI may be reported for all views, or wideband CQI and sub-band CQI can be reported for all views). As another example, the base station may transmit upper layer signaling configuration so that the UE reports the wideband CQI at a specific time point and the wideband CQI and sub-band CQI at another time point for each time point considered for CSI reporting. As another example, the base station may transmit upper layer signaling so that the UE reports on the wideband CQI and sub-band CQI up to a specific point in time, and reports only the wideband CQI for all points in time after the specific point in time.

In addition, the terminal may include information on the N viewpoints considered when generating the CSI when reporting the CSI and report the information to the base station.

The terminal may report the terminal capability for the channel state information feedback method, based on the channel state information prediction to the base station. In this case, the channel state information feedback method based on the above-described channel state information prediction may include at least one of methods described below.

A CSI reporting method that includes a plurality of time points on the time axis and is calculated based on each time point.
A method of generating independent CQI for each of a plurality of time points.
  A method of independently configuring the CQI reporting unit on frequency resources for each time point.
  A method of configuring the CQI reporting unit to a single value on frequency resources for each time point.
  A method of using both wideband and sub-band as CQI reporting units on frequency resources until a specific point in time, and then using only wideband for all points in time.
A method of generating a dependent CQI for each of a plurality of viewpoints.
  A method of calculating differential CQI based on X-bit based on the wideband CQI of the first time point when calculating wideband and sub-band CQI for all time points after the first time point (X can be 2 bits as an example).
  A method of calculating differential CQI based on X-bit based on the wideband CQI at the first time point (X can be 2 bits as an example) when calculating wideband CQI for all time points after the first time point, and calculating differential CQI based on X-bit based on the wideband CQI at each time point after the first time point when sub-band CQI is calculated for all time points after the first time point (X can be 2 bits as an example).
  A method of calculating differential CQI based on X-bit based on the wideband CQI at the first time point (X can be 2 bits as an example) when calculating wideband CQI for all time points after the first time point, and calculating the differential CQI at each time point based on the X-bit based on the sub-band CQI for each sub-band at the same location at the first time point when calculating the sub-band CQI for each sub-band for all time points after the first time point (X may be 2 bits, for example).

Figure 29:
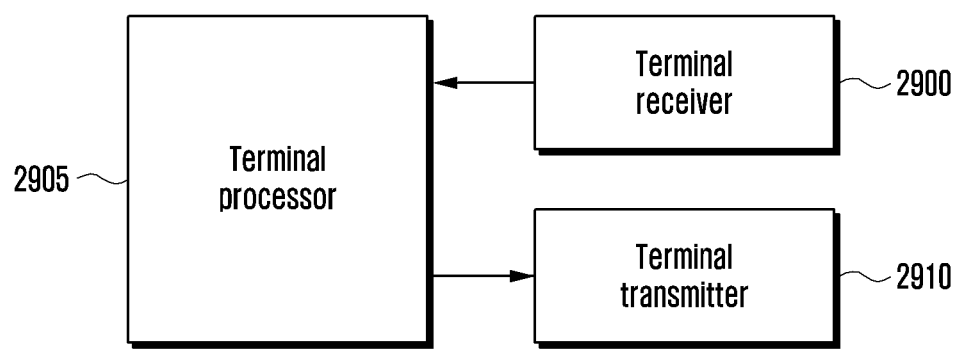
FIG. 29 illustrates a structure of a terminal in a wireless communication system according to an embodiment.

FIG. 29 illustrates a structure of a terminal in a wireless communication system according to an embodiment.

Referring to FIG. 29, the terminal is provided that includes a transceiver, i.e. a receiver 2900 and a transmitter 2910, a memory, and a terminal processing unit 2905 (or a terminal control unit or processor). According to the communication method of the terminal described above, the transceiver, i.e., the receiver 2900 and transmitter 2910, the memory, and the processor 2905 of the terminal may operate. However, the components of the terminal are not limited to the above-described examples. For example, a terminal may include more or fewer components than the aforementioned components. In addition, the transceiver, memory, and processor may be implemented in a single chip form.

The transceiver may transmit and receive signals to and from a base station. Here, the signal may include control information and data. To this end, the transceiver may include an RF transmitter for up-converting and amplifying the frequency of a transmitted signal, and an RF receiver for low-noise amplifying a received signal and down-converting the frequency. However, this is only one embodiment of the transceiver, and components of the transceiver are not limited to the RF transmitter and the RF receiver.

In addition, the transceiver may receive a signal through a wireless channel, output the signal to the processor, and transmit the signal output from the processor through the wireless channel.

The memory may store programs and data required for operation of the terminal. In addition, the memory may store control information or data included in signals transmitted and received by the terminal. The memory may include a storage medium such as a ROM, a RAM, a hard disk, a compact disc-read only memory (CD-ROM), and a digital versatile disc (DVD), or a combination of storage media. In addition, there may be a plurality of memories.

The processor may control a series of processes so that the terminal can operate according to the above-described embodiment. For example, the processor may control components of the terminal to simultaneously receive a plurality of PDSCHs by receiving DCI composed of two layers. There may be a plurality of processors, and the processor may perform a component control operation of the terminal by executing a program stored in a memory.

Figure 30:
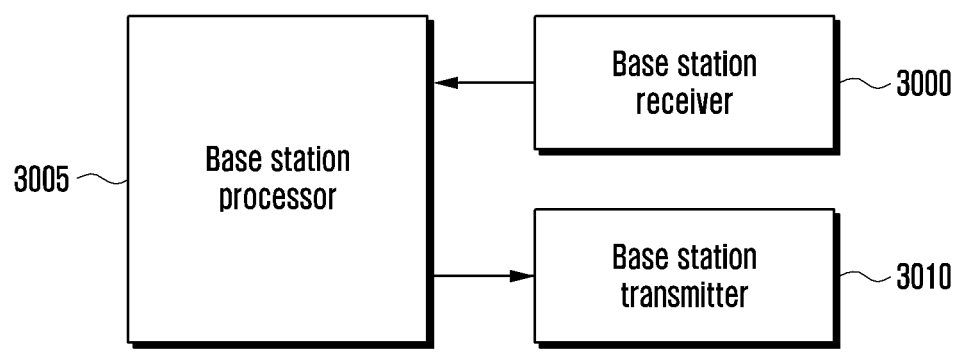
FIG. 30 illustrates a structure of a base station in a wireless communication system according to an embodiment.

FIG. 30 illustrates a structure of a base station in a wireless communication system according to an embodiment.

Referring to FIG. 30, the base station is provided that includes a transceiver, i.e., a receiver 3000 and a 3010, a memory and a processor 3005 (or a base station controller). According to the communication method of the base station described above, the transceiver, the memory, and the base station processor 3005 may operate. However, components of the base station are not limited to the above-described examples. For example, a base station may include more or fewer components than those described above. In addition, the transceiver, memory, and processor may be implemented in a single chip form.

The transceiver may transmission/reception signals with the terminal. Here, the signal may include control information and data. To this end, the transceiver unit may include an RF transmitter for up-converting and amplifying the frequency of a transmitted signal, and an RF receiver for low-noise amplifying a received signal and down-converting the frequency. However, this is only one embodiment of the transceiver, and components of the transceiver are not limited to the RF transmitter and the RF receiver.

In addition, the transceiver may receive a signal through a wireless channel, output the signal to the processor, and transmit the signal output from the processor through the wireless channel.

The memory may store programs and data for the operation of the base station. In addition, the memory may store control information or data included in signals transmitted and received by the base station. The memory may include a storage medium such as a ROM, a RAM, a hard disk, a CD-ROM, and a DVD, or a combination of storage media. In addition, there may be a plurality of memories.

The processor may control a series of processes so that the base station operates according to the above-described embodiment. For example, the processor may configure and transmit two layers of DCIs including allocation information for a plurality of PDSCHs and may control each element of the base station. There may be a plurality of processors, and the processors may perform a component control operation of the base station by executing a program stored in a memory.

The methods according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a CD-ROM, DVDs, or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described embodiments, an element is expressed in the singular or the plural according to presented detailed embodiment(s). However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments described herein provide examples that have been presented to easily explain the technical contents and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Further, although the above embodiments have been described based on the FDD LTE system, the embodiments may be applied to other communication systems, and other variants based on the technical idea of the embodiments may also be implemented in other systems such as TDD LTE, 5G, or NR systems.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a first device in a communication system, the method comprising:
   receiving first higher layer parameters indicating time periods corresponding to time resources for transmissions or receptions, respectively, wherein each of the time resources corresponds to each of beam identifiers and each of the beam identifiers indicates a beam to be applied over a corresponding time resource with a certain time period;
   identifying the time resources and the beam identifiers; and
   performing the transmissions or the receptions over the time resources by applying a corresponding beam indicated by a corresponding beam identifier over each of the time resources.

2. The method of claim 1, wherein performing the transmissions or the receptions comprises:
   performing a first transmission or a first reception on a first time resource among the time resources by applying a first beam indicated by a first beam identifier among the beam identifiers that corresponds to the first time resource over the first time resource; and
   performing a second transmission or a second reception on a second time resource among the time resources by applying a second beam indicated by a second beam identifier among the beam identifiers that corresponds to the second time resource over the second time resource.

3. The method of claim 1, wherein the beam identifiers are indicated by received second higher layer parameters respectively, and
   wherein a number of the received first higher layer parameters is identical to a number of the received second higher layer parameters.

4. The method of claim 1, wherein at least one of the time periods corresponds to more than 14 symbols.

5. The method of claim 1, wherein the transmissions or the receptions correspond to downlink data channels or uplink data channels.

6. A first device in a communication system, the first device comprising:
a transceiver; and
a processor coupled with the transceiver and configured to:
receive first higher layer parameters indicating time periods corresponding to time resources for transmissions or receptions, respectively, wherein each of the time resources corresponds to each of beam identifiers and each of the beam identifiers indicates a beam to be applied over a corresponding time resource with a certain time period,
identify the time resources and the beam identifiers, and
perform the transmissions or the receptions over the time resources by applying a corresponding beam indicated by a corresponding beam identifier over each of the time resources.

7. The first device of claim 6, wherein for performing the transmissions or the receptions, the processor is further configured to:
perform a first transmission or a first reception on a first time resource among the time resources by applying a first beam indicated by a first beam identifier among the beam identifiers that corresponds to the first time resource over the first time resource; and
perform a second transmission or a second reception on a second time resource among the time resources by applying a second beam indicated by a second beam identifier among the beam identifiers that corresponds to the second time resource over the second time resource.

8. The first device of claim 6, wherein the beam identifiers are indicated by received second higher layer parameters respectively, and
wherein a number of the received first higher layer parameters is identical to a number of the received second higher layer parameters.

9. The first device of claim 6, wherein at least one of the time periods corresponds to more than 14 symbols.

10. The first device of claim 6, wherein the transmissions or the receptions correspond to downlink data channels or uplink data channels.

11. A method performed by a second device in a communication system, the method comprising:
identifying time periods corresponding to time resources for transmissions or receptions associated with a first device, wherein each of the time resources corresponds to each of beam identifiers and each of the beam identifiers indicates a beam to be applied over a corresponding time resource with a certain time period;
obtaining first higher layer parameters indicating the time periods respectively; and
transmitting, to the first device the first higher layer parameters.

12. The method of claim 11, wherein the beam identifiers are indicated by transmitted second higher layer parameters respectively, and
wherein a number of the received first higher layer parameters is identical to a number of the received second higher layer parameters.

13. The method of claim 11, wherein at least one of the time periods corresponds to more than 14 symbols.

14. The method of claim 11, wherein the transmissions or the receptions correspond to downlink data channels or uplink data channels.

15. A second device in a communication system, the second device comprising:
a transceiver; and
a processor coupled with the transceiver and configured to:
identify time periods corresponding to time resources for transmissions or receptions associated with a first device, wherein each of the time resources corresponds to each of beam identifiers and each of the beam identifiers indicates a beam to be applied over a corresponding time resource with a certain time period,
obtain first higher layer parameters indicating the time periods respectively, and
transmit, to the first device, the first higher layer parameters.

16. The second device of claim 15, wherein the beam identifiers are indicated by transmitted second higher layer parameters respectively, and
wherein a number of the received first higher layer parameters is identical to a number of the received second higher layer parameters.

17. The second device of claim 15, wherein at least one of the time periods corresponds to more than 14 symbols.

18. The second device of claim 15, wherein the transmissions or the receptions correspond to downlink data channels or uplink data channels.

* * * * *